[12] United States Patent  
Sambonsugi

(10) Patent No.: US 11,438,537 B2  
(45) Date of Patent: Sep. 6, 2022

(54) IMAGE PICKUP APPARATUS, CONTROL METHOD, AND COMPUTER PROGRAM STORAGE MEDIUM

(71) Applicant: CANON KABUSHIKI KAISHA, Tokyo (JP)

(72) Inventor: Hideaki Sambonsugi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/149,318

(22) Filed: Jan. 14, 2021

(65) Prior Publication Data

US 2021/0227159 A1 Jul. 22, 2021

(30) Foreign Application Priority Data

Jan. 17, 2020 (JP) .............................. JP2020-005905

(51) Int. Cl.
*H04N 5/369* (2011.01)
*H04N 5/3745* (2011.01)
*H04N 5/357* (2011.01)
*H04N 5/345* (2011.01)

(52) U.S. Cl.
CPC ......... *H04N 5/3698* (2013.01); *H04N 5/3452* (2013.01); *H04N 5/357* (2013.01); *H04N 5/37455* (2013.01)

(58) Field of Classification Search
CPC .. H04N 5/3698; H04N 5/37455; H04N 5/357; H04N 5/3452; H04N 5/378; H04N 5/341; H04N 5/37457
USPC ...................................................... 348/222.1
See application file for complete search history.

(56) References Cited

U.S. PATENT DOCUMENTS

| 8,928,791 | B2 | 1/2015 | Okita et al. |
| 2009/0262213 | A1* | 10/2009 | Watanabe .......... H04N 5/23219 348/222.1 |
| 2013/0120624 | A1* | 5/2013 | Okita .................... H04N 5/3745 348/300 |
| 2013/0188090 | A1* | 7/2013 | Saito ................. H04N 5/232935 348/345 |
| 2013/0329095 | A1* | 12/2013 | Aoki ........................ G02B 7/34 348/241 |
| 2015/0062394 | A1* | 3/2015 | Ikeda ...................... H04N 5/347 348/301 |

(Continued)

FOREIGN PATENT DOCUMENTS

JP 2013-106194 A 5/2013

*Primary Examiner* — Lin Ye
*Assistant Examiner* — Chan T Nguyen
(74) *Attorney, Agent, or Firm* — Cowan, Liebowitz & Latman, P.C.

(57) ABSTRACT

An image pickup apparatus has a plurality of pixels each of which includes first and second photoelectric converters and is arranged in a matrix and connected to a column output line, a reading unit configured to perform a first reading operation that reads a signal of the first photoelectric converter to the column output line and a second reading operation that reads a signal obtained by mixing the signals of the first and second photoelectric converters to the column output line, a column circuit configured to be connected to the column output line, and a control unit configured to save power in at least some of the column (Continued)

circuits not used during the first reading operation from among the column circuits used in the second reading operation, during the first reading operation.

18 Claims, 39 Drawing Sheets

(56) References Cited

U.S. PATENT DOCUMENTS

2016/0219237 A1* 7/2016 Kobayashi ........... H04N 5/3742

* cited by examiner

IMAGE PICKUP APPARATUS, CONTROL METHOD, AND COMPUTER PROGRAM STORAGE MEDIUM

BACKGROUND OF THE INVENTION

Field of the Invention

The present invention relates to an image pickup apparatus, and more particularly to an image pickup apparatus having a focus detection pixel.

Description of the Related Art

In recent years, there has been proposed a focus detection method in which focus is detected by using the image pickup plane phase difference detection method that uses an image pickup element including a pixel having an in-pixel pupil division function performed by a plurality of photoelectric conversion units. Examples of the image pickup element that outputs a signal usable for such a focus detection method includes an image pickup element having a pixel provided with a pair of photoelectric conversion units for each micro lens of a two-dimensionally arranged micro lens array.

For example, Japanese Patent Laid-Open No. 2013-106194 discloses control to be described below by using the above image pickup element. First, an A-image signal that is an output signal of a photoelectric conversion unit A and an A+B image signal that is an addition signal of the photoelectric conversion unit A and a photoelectric conversion unit B are read from a pixel having the photoelectric conversion unit A and the photoelectric conversion unit B that is pupil-divided by a micro lens. Subsequently, a B-image signal is calculated by (A+B image signal)−(A-image signal), and focus detection by using the phase difference detection method is performed by using the obtained A-image signal and B-image signal, and an object image is generated by using the A+B-image signal.

However, in the prior art disclosed in the above Japanese Patent Laid-Open No. 2013-106194, an amount of read data is doubled due to the reading of the A-image signal and the A+B image signal, thereby to cause the drawback that the number of wires and terminals for transmission, the circuit scale, and the power consumption are increased.

SUMMARY OF THE INVENTION

An image pickup apparatus of the present invention comprises: a plurality of pixels each of which includes first and second photoelectric converters and is arranged in a matrix and connected to a column output line; a column circuit configured to be connected to the column output line; at least one processor and at least one memory functioning as: a reading unit configured to perform a first reading operation that reads a signal of the first photoelectric converter to the column output line and a second reading operation that reads a signal obtained by mixing the signals of the first and second photoelectric converters to the column output line; and a control unit configured to save power in at least some of the column circuits not used during the first reading operation from among the column circuits used in the second reading operation, during the first reading operation.

Further features of the present invention will become apparent from the following description of exemplary frameworks with reference to the attached drawings.

DESCRIPTION OF THE EMBODIMENTS

Figure 1:
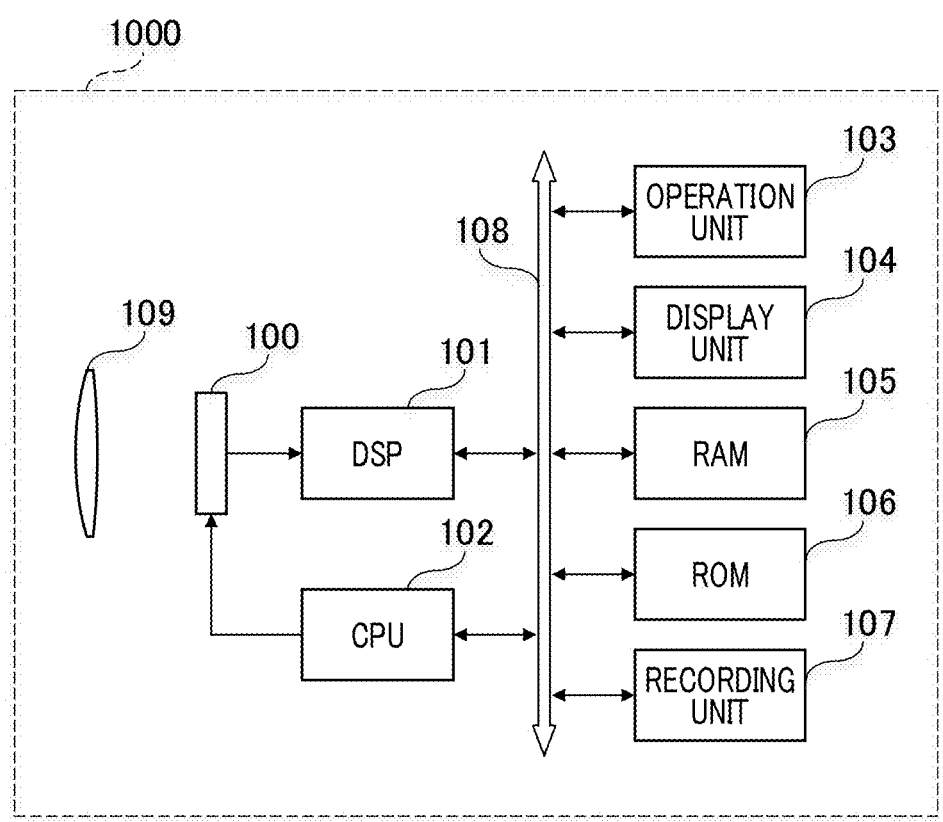
FIG. 1 is a block diagram illustrating a configuration of an image pickup apparatus according to an embodiment of the present invention.

Hereinafter, preferred embodiments of the present invention will be described with reference to the accompanying drawings. In each drawing, the same reference numerals are provided for parts and elements that are the same, and redundant description will be omitted. Additionally, in the embodiments, an example applied to a digital camera serving as an image pickup apparatus will be described. However, the image pickup apparatus includes electronic devices having an image pickup function such as a smartphone with a camera, a tablet computer with a camera, an on-vehicle camera, and a network camera.

Embodiment 1

FIG. 1 is a block diagram illustrating a configuration of an image pickup apparatus according to Embodiment 1 of the present invention. An image pickup apparatus 1000 of Embodiment 1 is, for example, a digital camera, and has a still image shooting function and a moving image shooting function. The image pickup apparatus 1000 has a CPU (Central Processing Unit) 102 serving as a computer that integrally controls the entire image pickup apparatus 1000, and an image pickup element 100 in which an optical image that has passed through an imaging lens 109 is formed.

The image pickup element 100 converts the optical image into an electric signal (analog pixel signal), converts the electric signal into digital image data according to a predetermined number of quantized bits, and outputs the digital image data. A DSP (Digital Signal Processor) 101 receives the data from the image pickup element 100 and performs, for example, various types of correction processing for still images and moving images, and compression processing for images.

A RAM (Random Access Memory) 105 is an image memory for temporarily storing the image data output from the image pickup element 100 and the image data processed by the DSP 101. The RAM 105 is also used as a work memory of the CPU 102. In the present embodiment, although the RAM 105 is used as an image memory and a work memory, another memory may be used if it has a sufficient access speed.

A ROM (Read Only Memory) 106 stores a computer program for operating the CPU 102. In the present embodiment, although a flash ROM is used as the ROM 106, another memory may be used if it has a sufficient access speed.

An operation unit 103 includes a main switch that starts the image pickup apparatus 1000 and a shooting switch that provides an instruction from a user to the image pickup apparatus 1000 to shoot a still image or a moving image, and is also used in the settings of imaging conditions and the like. A display unit 104 displays a still image or a moving image according to the image data under the control of the CPU 102, and displays, for example, a menu.

A recording unit 107 is, for example, a non-volatile memory or a hard disk and records image data and the like. In the present embodiment, although the recording unit 107 is described as being built in the apparatus, it may be an external recording medium such as a memory card, which is attachable and detachable via a connector or the like. A bus 108 is connected to the CPU 102 and the like.

Figure 2:
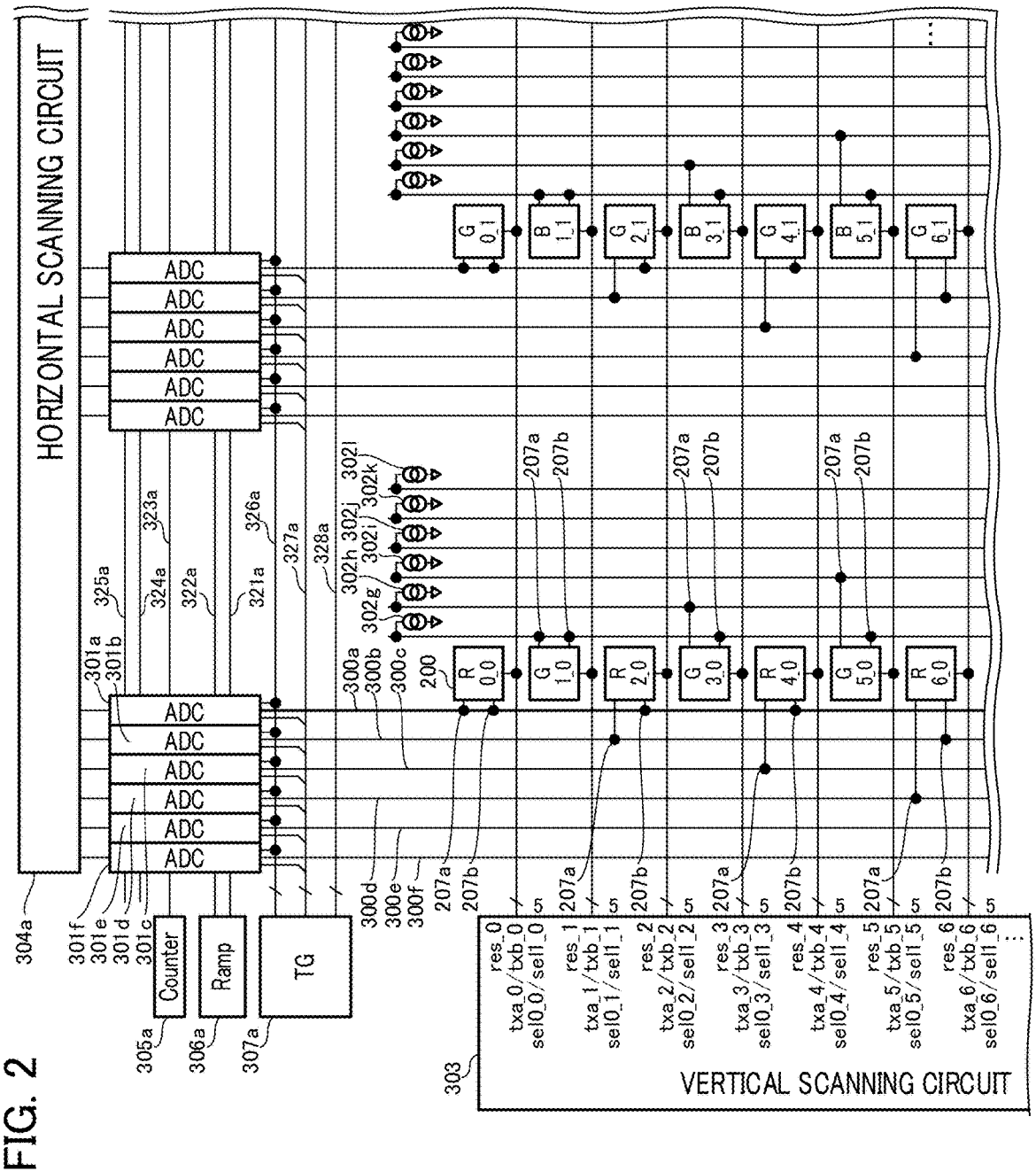
FIG. 2 illustrates a configuration of the upper left portion of an image pickup element of Embodiment 1.
Figure 3:
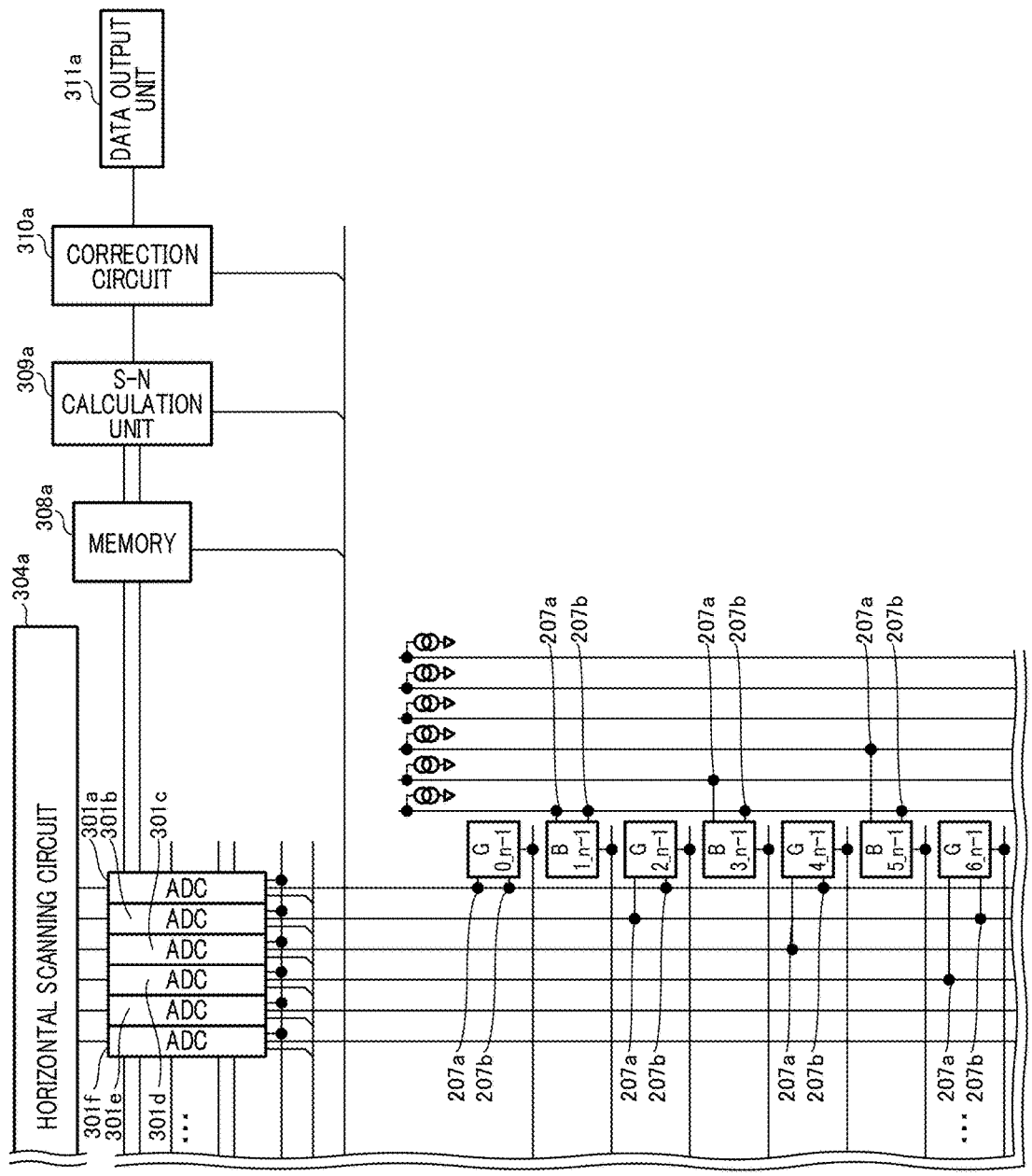
FIG. 3 illustrates a configuration of the upper right portion of the image pickup element of Embodiment 1.
Figure 4:
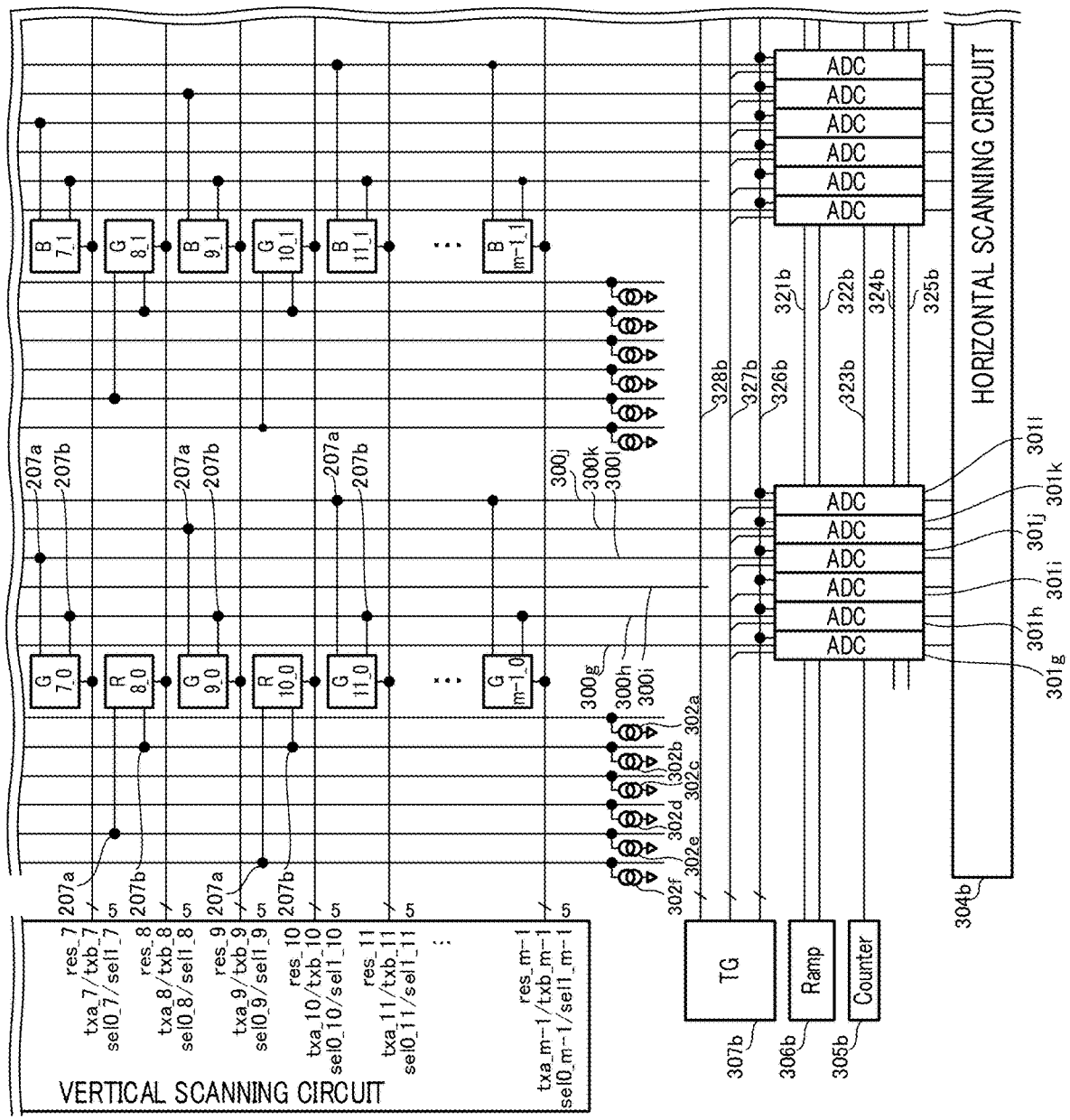
FIG. 4 illustrates a configuration of the lower left portion of the image pickup element of Embodiment 1.
Figure 5:
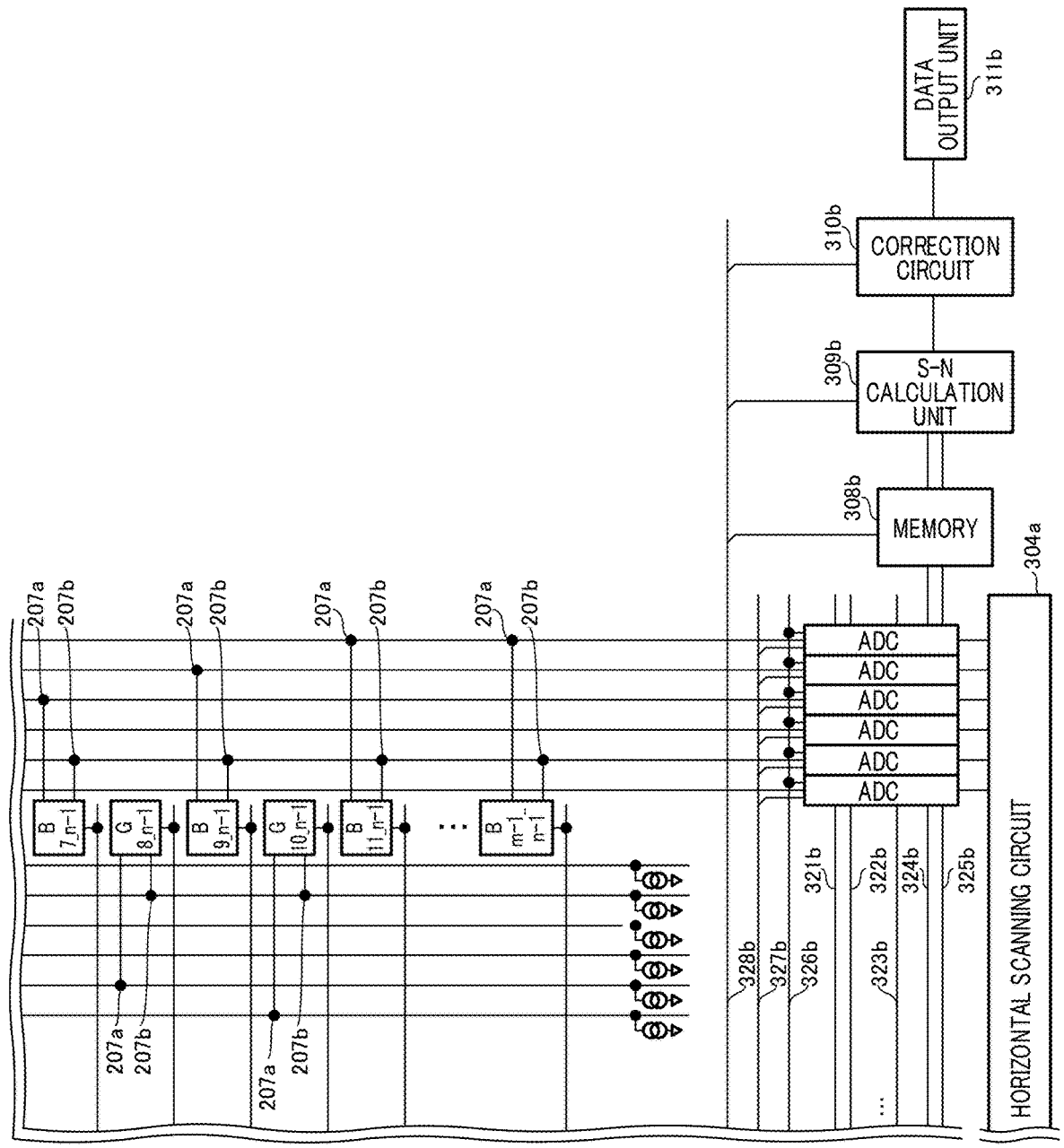
FIG. 5 illustrates a configuration of the lower right portion of the image pickup element of Embodiment 1.

FIG. 2 to FIG. 5 illustrate the overall configuration of the image pickup element 100 in Embodiment 1, which is divided into four portions, in which FIG. 2 illustrates the configuration of the upper left portion of the overall configuration of the image pickup element, FIG. 3 illustrates the configuration of the upper right portion, FIG. 4 illustrates the configuration of the lower left portion, and FIG. 5 illustrates the configuration of the lower right portion.

As shown in FIG. 2 to FIG. 5, a plurality of pixels 200 each having a photoelectric conversion element are arranged in a matrix as shown in the uppermost left pixel R0_0 to the lowermost right pixel Bm−1_n−1 (where "m" and "n" are any integers). In each display R (G, B) p_q of the pixel 200, "R" indicates a red color filter, "G" indicates a green color filter, and "B" indicates a blue color filter arranged in each pixel. As shown in FIG. 2 to FIG. 5, the color filters are arranged in a Bayer arrangement.

Figure 6:
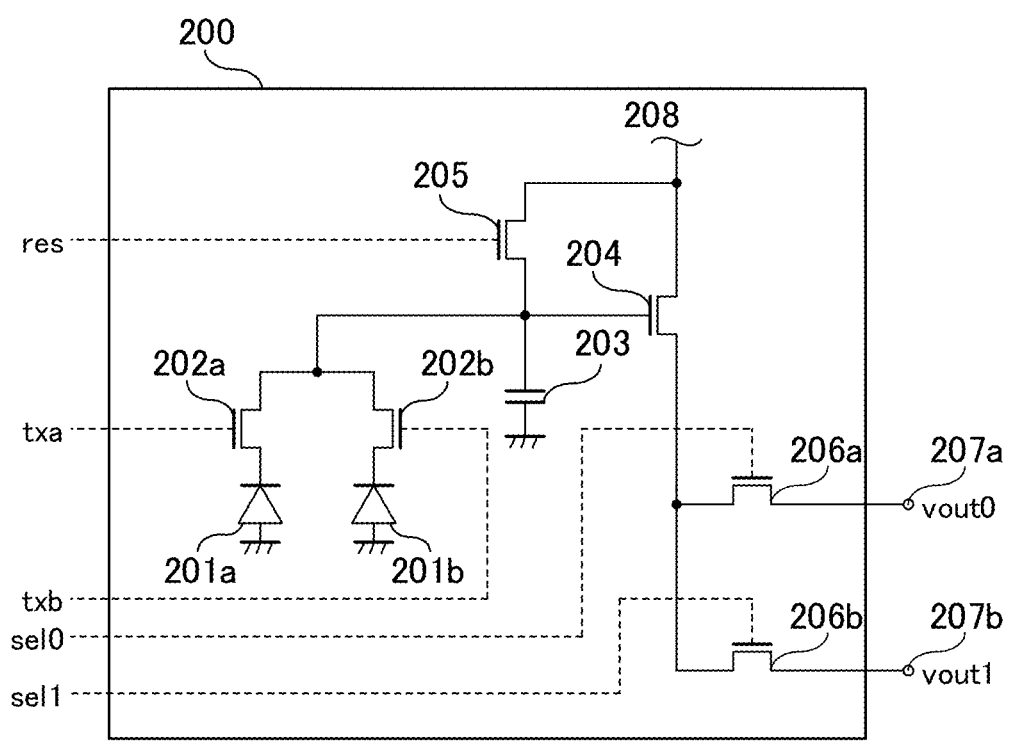
FIG. 6 illustrates a configuration of pixels of the image pickup element of Embodiment 1.

In the display R (G, B) p_q of each pixel 200, p_q indicates a pixel in the p-th row and the q-th column. The configuration of the pixel 200 will now be described with reference to FIG. 6. FIG. 6 is a circuit diagram illustrating a configuration example of the pixel 200 in the image pickup element 100. The pixel 200 has photodiodes 201*a* and 201*b*, transfer switches 202*a* and 202*b*, a floating diffusion region 203, an amplification unit 204, a reset switch 205, and selection switches 206*a* and 206*b*.

Each switch is configured by a MOS transistor or the like.

In the following description, although each switch is an N-type MOS transistor as an example, each switch may be a P-type MOS transistor or another switching element. As described above, the image pickup element 100 of the present embodiment has two photodiodes 201*a* (first photoelectric converter) and 201*b* (second photoelectric converter) in the pixel 200, which is one unit.

However, the number of photodiodes provided in each unit pixel 200 is not limited to two as shown in FIG. 6, and may be three or more (for example, four.). In the present embodiment, the photodiodes 201*a* and 201*b* function as focus detection pixels, and also function as imaging pixels, as will be described below. The photodiodes 201*a* and 201*b* are photoelectric converters that receive light from different exit pupils on the right and left that have passed through the same micro lens, and generate signal charges in accordance with the amount of received light by photoelectric conversion.

A signal obtained by the photodiode 201*a* is referred to as an "A" image signal, and a signal obtained by the photodiode 201*b* is referred to as a "B" image signal. The transfer switch 202*a* is connected between the photodiode 201*a* and the floating diffusion region 203, and the transfer switch 202*b* is connected between the photodiode 201*b* and the floating diffusion region 203.

The transfer switches 202*a* and 202*b* are elements that respectively transfer charges generated in the photodiodes 201*a* and 201*b* to the shared floating diffusion region 203. The transfer switches 202*a* and 202*b* are respectively controlled by control signals txa and txb.

The floating diffusion region 203 is a charge-voltage converter that temporarily holds the charges transferred from the photodiodes 201*a* and 201*b* and converts the held charges into voltage signals. The amplification unit 204 is a source follower type MOS transistor. The gate of the amplification unit 204 is connected to the floating diffusion region 203, and the drain of the amplification unit 204 is connected to a shared power supply 208 that supplies a power supply potential VDD.

The amplification unit 204 amplifies a voltage signal based on the charges held in the floating diffusion region 203, and outputs it as image signals. The reset switch 205 is connected between the floating diffusion region 203 and the shared power source 208.

The reset switch 205 is controlled by the control signal res to reset the potential of the floating diffusion region 203 to the power supply potential VDD. The selection switches 206*a* and 206*b* are connected between the source of the amplification unit 204 and column signal lines 300*a* to 300*l*. The selection switches 206*a* and 206*b* are respectively controlled by the control signals sel0 and sel1; and output the image signals that have been amplified by the amplification unit 204 to output to terminals vout 207*a* and 207*b*.

Returning to FIG. 2 to FIG. 5, a vertical scanning circuit 303 supplies control signals res, txa, txb, sel0, sel1, and the like to each pixel 200. These control signals are supplied to terminals res, txa, txb, sel0, sel1 of each pixel 200. The output terminals vout 207*a* and 207*b* of each pixel are connected to the column output lines 300*a* to 300*l*.

Referring to a vertical column (column 0) in which the pixels R0_0 are arranged, as shown in FIG. 2 to FIG. 5, the pixels from the pixels R0_0 of row 0 to the pixel Gm−1_0 of row m−1 and the column output lines 300*a* to 300*l* are connected at a cycle of every 12 rows.

In the present embodiment, the output terminals 207*a* of each row are connected to the different column output lines 300*a* to 300*l* at a cycle of every 12 rows. The output terminals 207*b* of three rows of pixels of the same color, arranged alternately every other one, are connected to the same column output lines 300*a*-300*l*. By this configuration, pixel signals for 12 rows can be simultaneously output to different column output lines by turning on sel0 for 12 rows for each horizontal period of time.

Additionally, the pixel signals for three rows each are output to the same column output line by turning on sel1 for 12 rows, and thereby the signals can be mixed (addition). This connection pattern is applied to each column. However, the present invention is not limited to this connection pattern of the pixel and column output lines.

The column output lines 300*a* to 300*l* are respectively connected to inputs of A/D converters (ADC) 301*a* to 301*l* serving as column circuits. The A/D converters 301*a* to 301*l* respectively analog-to-digital convert the optical signal (S signal) and the noise signal (N signal) output from the pixel 200. Current sources 302*a* to 302*l* are respectively connected to the column output lines 300*a* to 300*l*.

A source follower circuit is configured by the amplification unit 204 including an amplifying MOS transistor of the pixel 200 connected to current sources 302*a* to 302*l*, and the column output lines 300*a* to 300*l* via the selection switches 206*a* and 206*b*. The ADCs 301*a* to 301*l* AD-convert pixel signals output to the column output lines 300*a* to 300*l* based on signals output from ramp signal generators 306*a* and 306*b* and counters 305*a* and 305*b*, and control signals output from TGs (timing generator) 307*a* and 307*b*.

Power saving control signals are input from the TGs 307*a* and 307*b* for each ADC of the ADCs 301*a* to 301*l*. When these power saving control signals are asserted (enabled), the ADCs 301*a* to 301*l* enter a power saving state, and the power is reduced in comparison to the power during operation. In the present embodiment, the term "power saving" means stopping or reducing power supply.

The pixel data that become digital data after AD-conversion by the ADCs 301*a* to 301*l* are sequentially transferred in columns to memories 308*a* and 308*b* via the shared output lines 324*a*, 324*b*, 325*a*, and 325*b* in accordance with the control signals from horizontal scanning circuits 304*a* and 304*b* (memory transfer). From the memories 308*a* and 308*b*, the S data of the pixel and the N data of the pixel corresponding thereto are output to S–N calculation units 309*a* and 309*b* by an operation to be described below.

The vertical scanning circuit 303 and the horizontal scanning circuits 304*a* and 304*b* function as a reading means for reading out signals from the pixels, together with the CPU 102. As the reading means, a first reading operation that reads the signals of the first photoelectric converter to the column output line and a second reading operation that reads the signals obtained by mixing the signals of the first and second photoelectric converters to the column output line are performed.

The S–N calculation units 309*a* and 309*b* subtract the N data from the S data that has been input. By this operation, an image signal from which a noise component caused by the readout circuit of each pixel has been canceled is generated. The data output from the S–N calculation units 309*a* and 309*b* are input to correction circuits 310*a* and 310*b*. The correction circuits 310*a* and 310*b* perform predetermined correction processing such as an OB clamp.

The data output from the correction circuits 310a and 310b are input to data output units 311a and 311b, and the data output units 311a and 311b output the data to the outside of the image pickup element 100. The S–N calculation units 309a and 309b and the correction circuits 310a and 310b control power saving by individual power saving control signals output from the TGs 307a and 307b.

When the power saving control signals are asserted (enabled), each circuit enters a power saving state, and the power is reduced in comparison to the power during operation. The configurations of the memories 308a and 308b will now be described with reference to FIG. 7 and FIG. 8. As an example, the memory 308a that stores the signal of the R pixel will be described.

Figure 7:
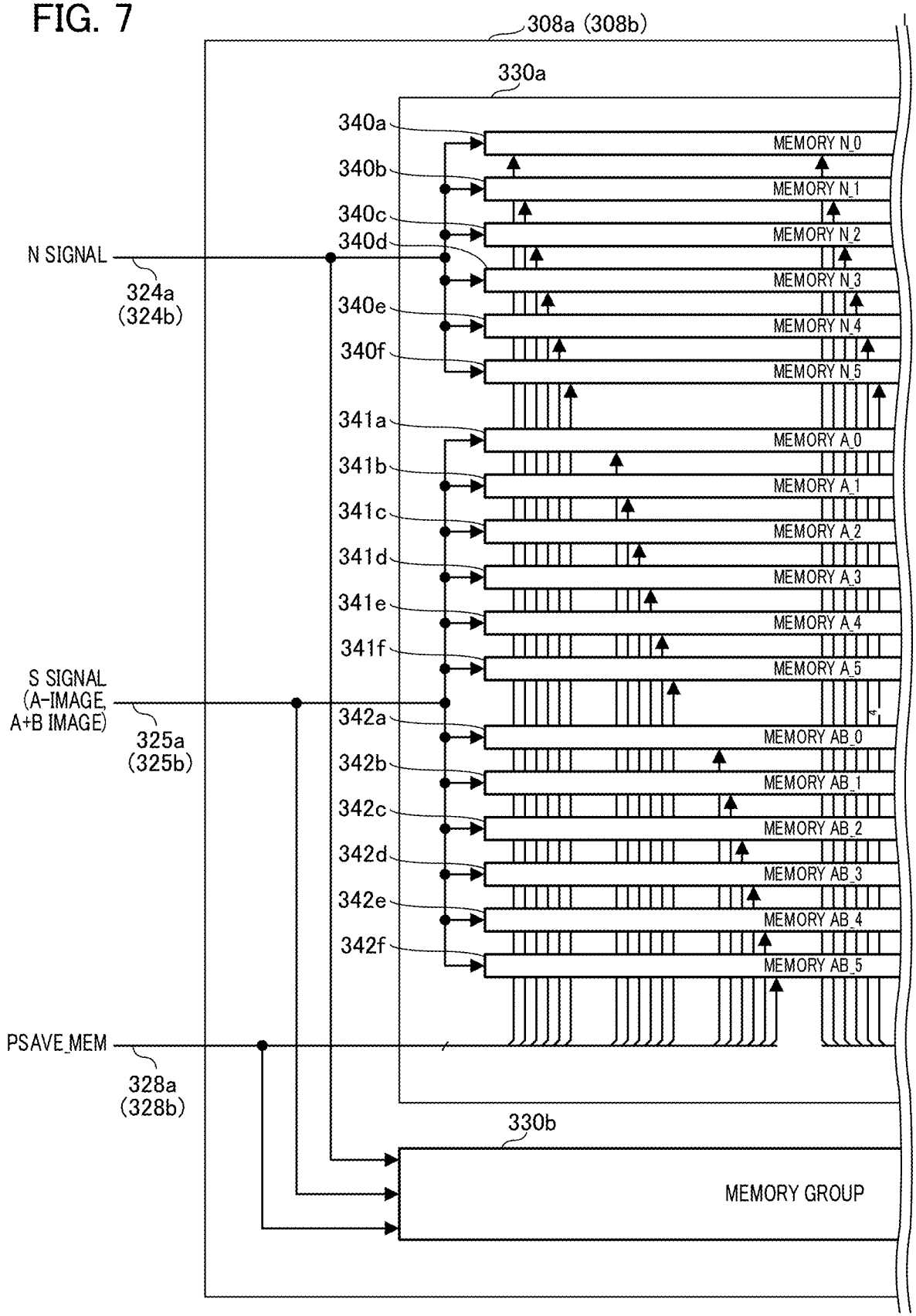
FIG. 7 illustrates the left side portion of a configuration diagram of a memory in the image pickup element of Embodiment 1.
Figure 8:
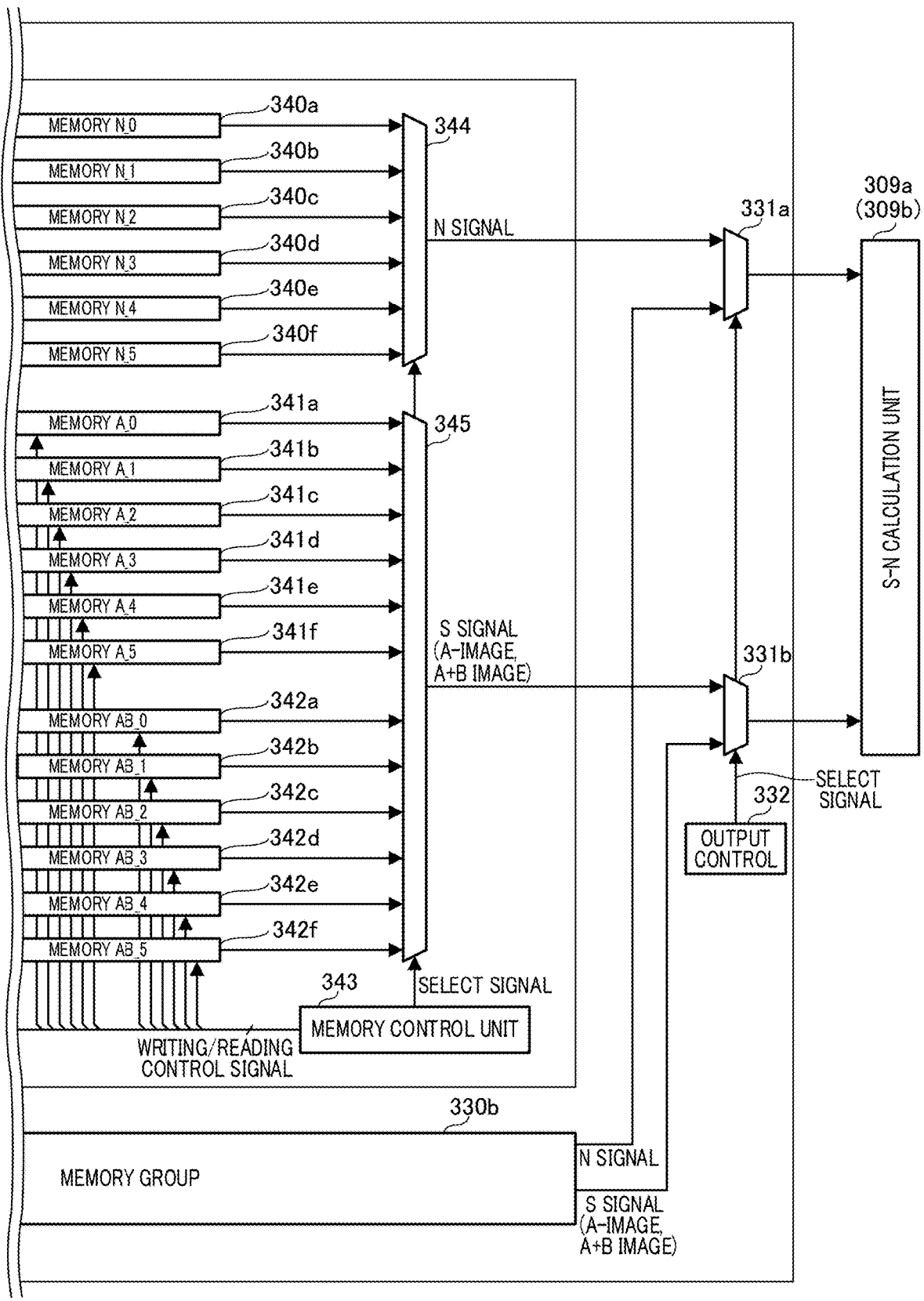
FIG. 8 illustrates the right side portion of a configuration diagram of the memory in the image pickup element of Embodiment 1.

FIG. 7 and FIG. 8 illustrate a configuration of the memory 308a in the image pickup element of Embodiment 1. FIG. 7 illustrates a configuration of the left side portion of the memory 308a in the image pickup element, and FIG. 8 illustrates a configuration of the right side portion of the memory 308a in the image pickup element.

The memory 308a is configured by the memory groups 330a and 330b. Each memory group is configured by memories N_0 340a to N_5 340f, memories A_0 341a to A_5 341f, and memories AB_0 342a to AB_5 342f. Each memory is controlled by a writing control signal and a reading control signal output from a memory control unit 343 of FIG. 8, and each memory has a capacity for one row.

The N data of each column input from the ADCs 301a to 301f are respectively written to the memories N_0 340a to N_5 340f. The A-image data of each column are respectively written to the memories A_0 341a to A_5 341f. The A+B image data of each column, which are mixed signals of the A-image data and the B-image data, are written to the memories AB_0 342a to AB_5 342f.

Each signal written to each memory is sequentially read by a read control signal output from the memory control unit 343. The N data of the predetermined memory and the S signal (A-image data and A+B image data) of the predetermined memory are output to the S–N calculation unit 309a via selectors 344 and 345 that operate in accordance with the select signals output from the memory control unit 343, and the selectors 331a and 331b that operate in accordance with the select signals output from the output control unit 332 of FIG. 8.

The select signals output from the output control unit 332 of the memory group 330a and the memory group 330b, or the writing control and the reading control of the memory control unit 343 are alternately switched every one horizontal period of time. For example, in a predetermined horizontal period of time, reading from the memory 330b is performed simultaneously with writing to the memory group 330a, and in another predetermined horizontal period of time, reading from the memory 330a is performed simultaneously with writing to the memory group 330b.

By this operation, the data for 12 rows can be simultaneously AD-converted in a predetermined horizontal scanning period of time and stored in the memory group 330a (330b), and the data for 12 rows that have been AD-converted in the previous horizontal period of time and stored in the memory group 330b (330a) can be subject to S–N calculation and output from the image pickup element. The power-saving of the memories N_0 340a to N_5 340f, the memories A_0 341a to A_5 341f, and the memories AB_0 342a to AB_5 342f of the memory group 330a, is controlled by individual power saving control signals (PSAVE_MEM) output from the TG 307a.

When these power saving control signals are asserted, each memory enters a power saving state, and the power is reduced in comparison to the power during operation. The control is also applied to the memory group 330b. The reading operation of the image pickup element 100 in each mode will now be described. The image pickup apparatus of Embodiment 1 includes a moving image mode 1, a moving image mode 2, a moving image mode 3, and a still image mode to serve as shooting modes.

Figure 9:
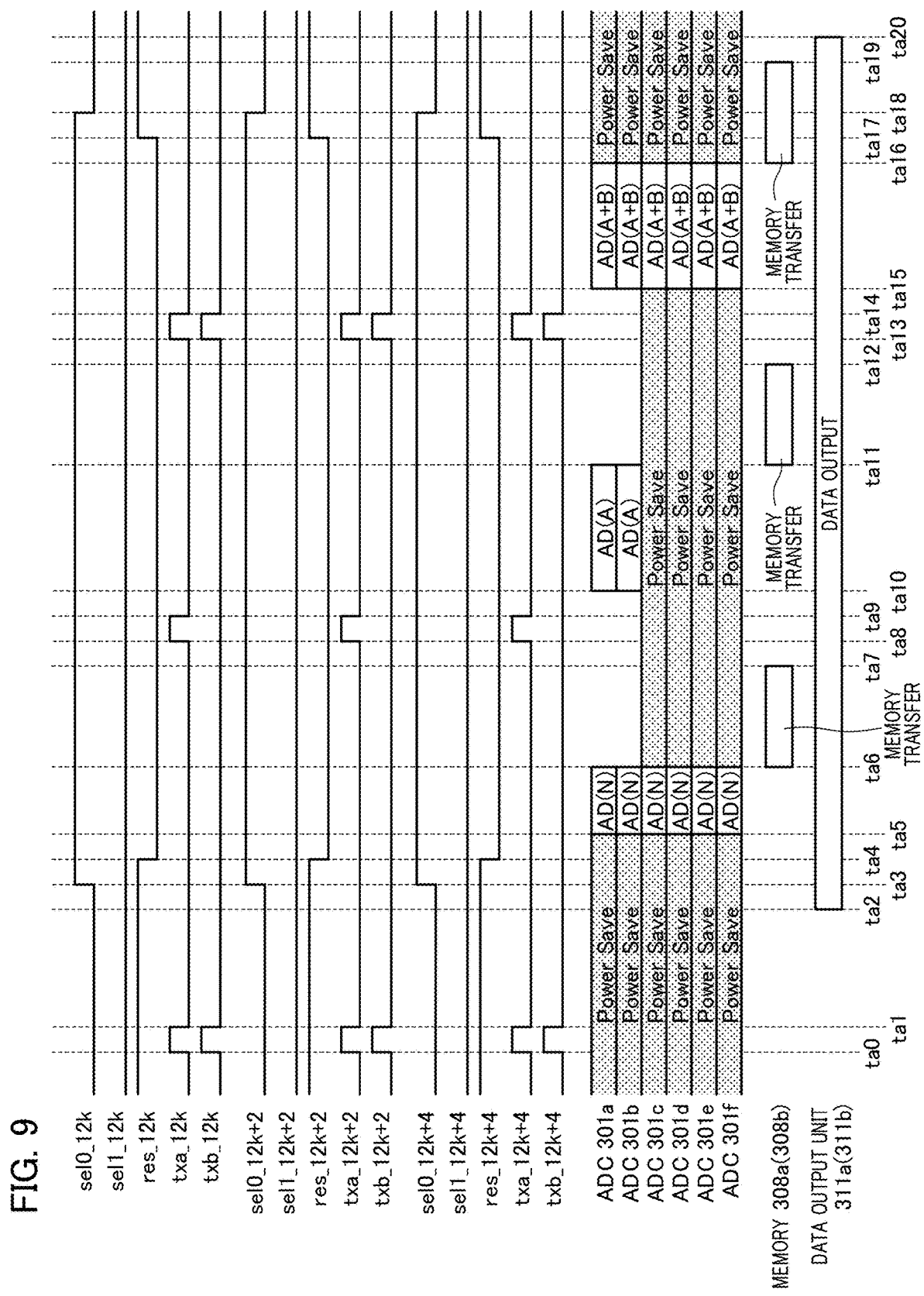
FIG. 9 illustrates the upper half of a timing chart illustrating a reading operation of the image pickup element in the moving image mode 1 of Embodiment 1.
Figure 10:
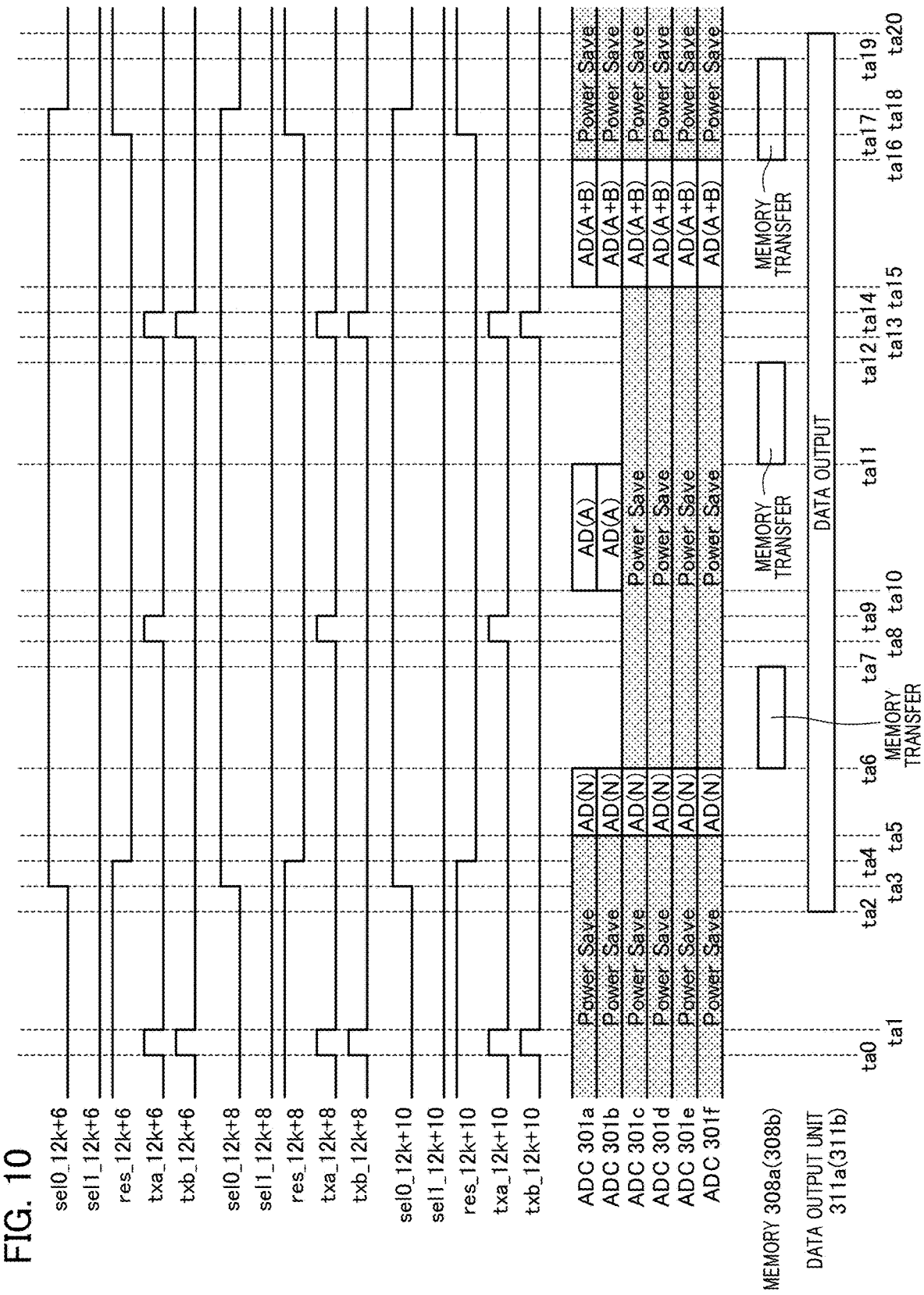
FIG. 10 illustrates the lower half of the timing chart illustrating the reading operation of the image pickup element in the moving image mode 1 of Embodiment 1.

FIG. 9 to FIG. 12 are timing charts illustrating the reading operation in the moving image mode 1. FIG. 9 illustrates the upper half of the timing chart illustrating the reading operation of the image pickup element in the moving image mode 1, and FIG. 10 illustrates the lower half of the timing chart illustrating the reading operation of the image pickup element in the moving image mode 1.

Figure 11:
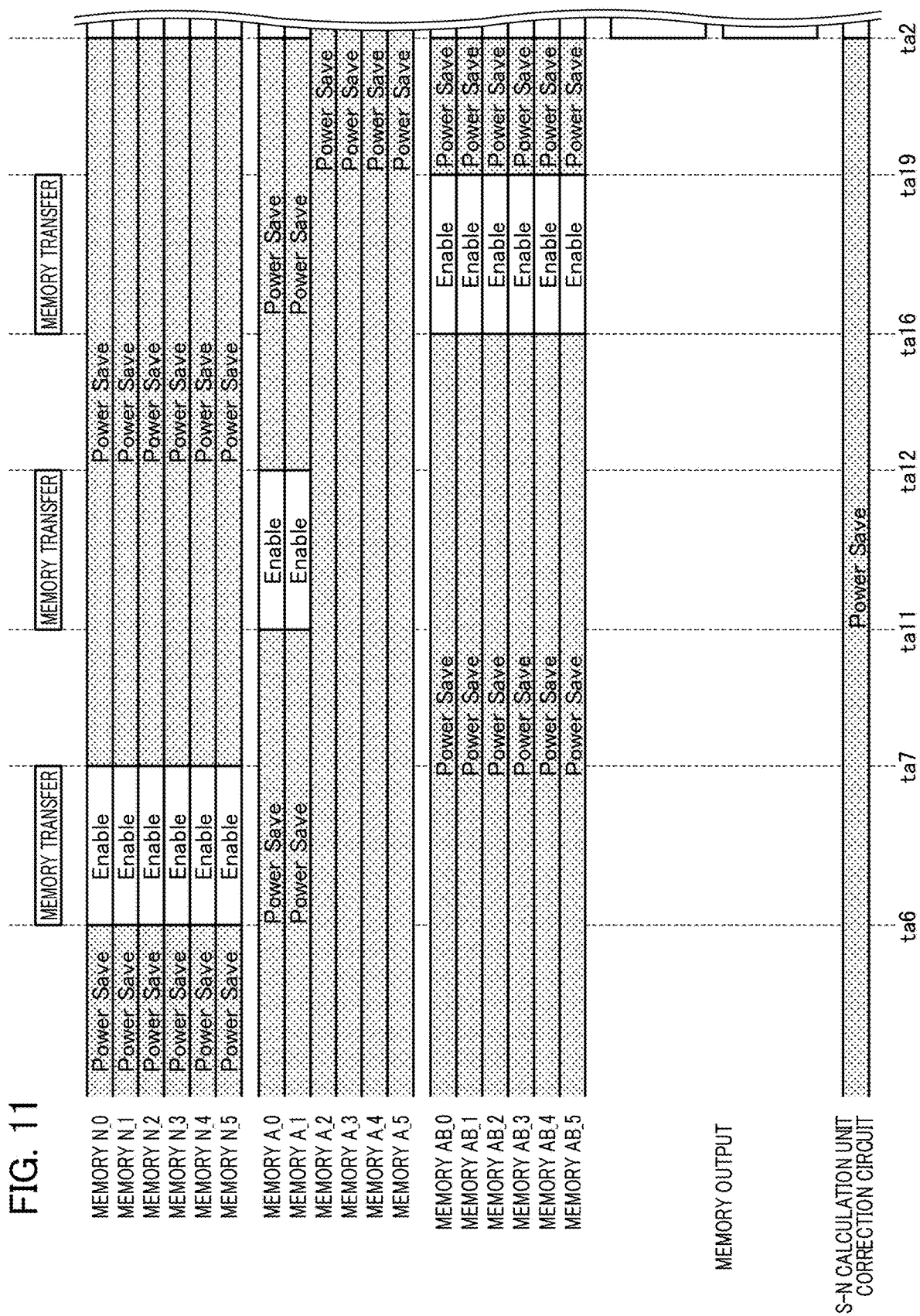
FIG. 11 illustrates the left side portion of the timing chart illustrating the writing and reading operations to and from the memory in the moving image mode 1 of Embodiment 1.
Figure 12:
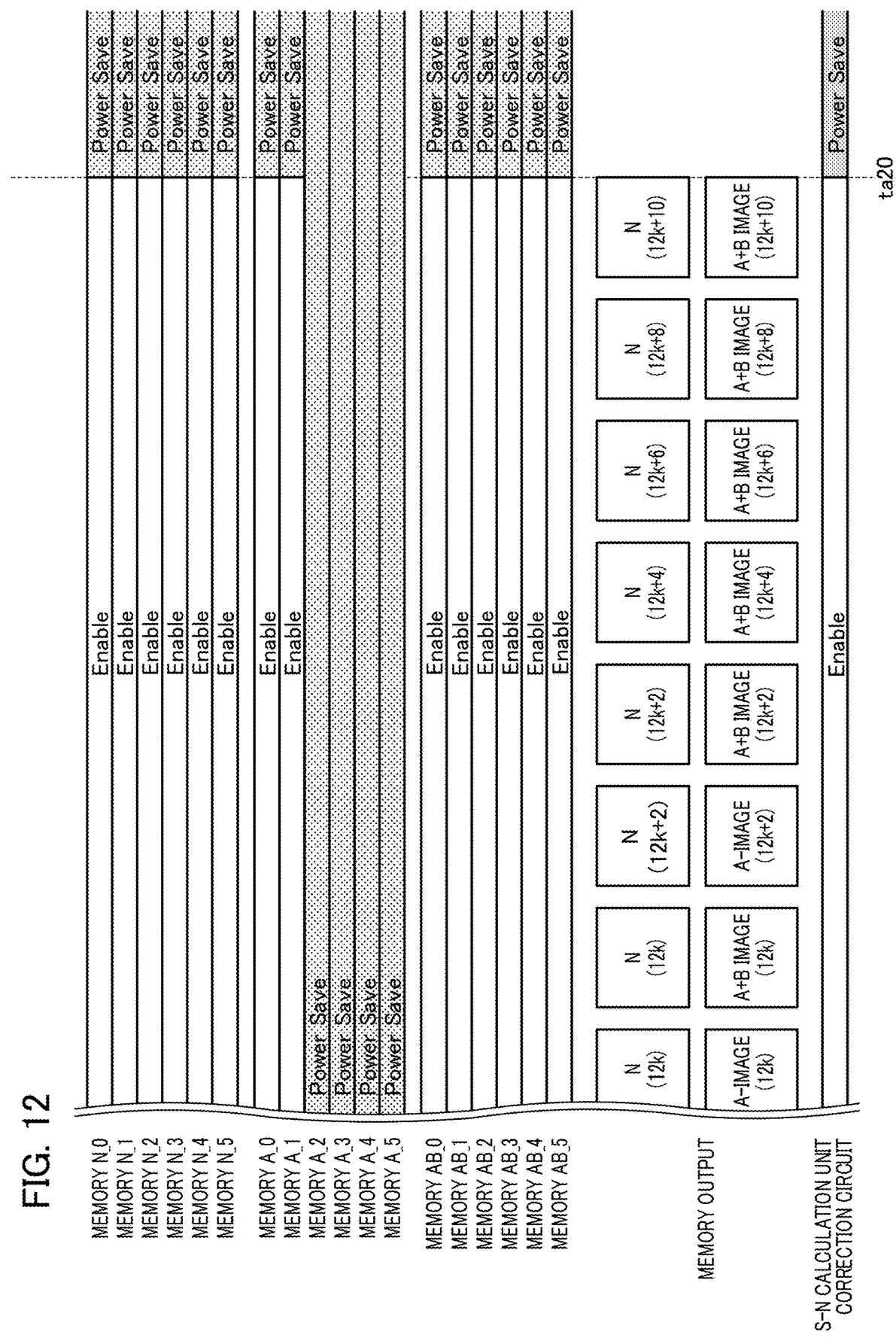
FIG. 12 illustrates the right side portion of the timing chart illustrating the writing and reading operations to and from the memory in the moving image mode 1 of Embodiment 1.

FIG. 11 illustrates the left side portion of the timing chart illustrating a memory reading operation in the moving image mode 1, and FIG. 12 illustrates the right side portion of the timing chart illustrating the memory reading operation in the moving image mode 1. The reading operation for 12 rows of the image signals (one horizontal scanning line) will be described below with reference to FIG. 9 to FIG. 12. It is assumed that each switch is turned on when each control signal is H and that each switch is turned off when each control signal is L.

Although, for example, the reading operation of the R pixel will be described with reference to FIG. 9 to FIG. 12, the same operation is applied to the other colors, and the description thereof will be omitted. As shown in FIG. 9 and FIG. 10, at time ta0, control signals txa_12k to txa_12k+10 and txb_12k to txb_12k+10 become H. and the transfer switches 202a and 202b are turned on.

At this time, the signals res_12k to res_12k+10 become H. and the electric charges stored in the photodiodes 201a and 201b are transferred to the power supply 208 via the transfer switches 202a and 202b and the reset switch 205. That is, at time ta0, the photodiodes 201a and 201b are reset. Next, at time ta1, the control signals txa_12k to txa_12k+10 and txb_12k to txb_12k+10 are set to L, and the accumulation of the photo-charge on the photodiodes 201a, 201b starts.

At a time ta3, which is after the accumulation of the photo-charge for a predetermined time, the control signals sel0_12k to sel0_12k+10 of the selection switch 206 become H. and the source of the amplification unit 204 is connected to the column output lines 300a to 300f via the selection switch 206a. At time ta4, the reset of the floating diffusion region 203 is released by setting the control signals res_12k to res_12k+10 of the reset switch 205 to L.

At this time, the potential (N signal) of the reset signal level corresponding to the potential of the floating diffusion region 203 is read out to the column output lines 300a to 300f via the amplification unit 204, and is input to the A/D converters 301a to 301f. Thus, at time ta4, a noise reading operation for reading the N signal (noise signal) is performed. Next, at time ta5, the power saving control signals of the A/D converters 301a to 301f are negated (disabled) and the A/D converters 301a to 301f become active.

Here, the TGs 307a and 307b function as a control means for performing power saving together with the CPU 102. The ramp signal generator 306a starts outputting a ramp signal having a signal level that changes in proportion to the elapsed time. At the same time, the counter 305a starts counting up from the reset state. Comparators in the A/D converters 301a to 301f compare the input signal with the ramp signal output from the ramp signal generator 306a.

The output counter value is stored when the signal level of the input ramp signal increases with the elapsed time, and exceeds the value of the input signal. This stored counter value becomes N data (AD conversion of the N signal). At time ta6, when the A/D conversion of the N-signal is completed, the N data of each column is transferred to the memory 308a, and the transfer is completed at time ta7.

At this time, the N data of each column of the A/D converters 301a to 301f are sent to, for example, the memories N_0 340a to N_5 340f of the memory group 330a. Accordingly, at time ta6, the power saving control signals of A/D converters 301c to 301f are simultaneously asserted, and the A/D converters 301c to 301f enter a power saving state.

Next, at time ta8, the control signals txa_12k to txa_12k+10 become H, and the photo-charges of the photodiodes 201a are respectively transferred to the floating diffusion regions 203. Subsequently, at time ta9, the control signals txa_12k to txa_12k+10 become L. By this operation, the charge signal (A-signal) accumulated in the photodiode 201a (first photoelectric converter) for the period of time ta1 to ta9 is transferred to the floating diffusion region 203.

At this time, since the control signals sel0_12k to sel0_12k+10 of the selection switch 206 are H, a voltage corresponding to the change is output to the amplification unit 204 and the column output lines 300a to 300f. Thus, at time ta9, a first reading operation for reading the signal (A-image signal) of the first photoelectric converter to the column output line is performed.

Next, at time ta10 the ramp signal generator 306a starts outputting the ramp signal. At the same time, the counter 305a starts counting up from a reset state. The comparators in the A/D converters 301a and 301b compare the input signal with the ramp signal output from the ramp signal generator 306a. The output counter value is stored when the signal level of the input ramp signal increases with the elapsed time and exceeds a value of the input signal.

This stored counter value becomes A-image data (A/D conversion of the A-image signal). However, since only the A/D converters 301a and 301b are active, only the A-image signals of the 12k rows and 12k+2 rows are AD-converted. At time ta11, when the A/D conversion of the A-image signal is completed, the A-image data of each column are transferred to the memory 308a and the transfer is completed at time ta12.

At this time, the A-image data of each column of the A/D converters 301a and 301b are respectively stored in the memories A_0 341a and A_1 341b. However, since the A/D converters 301c to 301f are in a power saving state, no valid data is output, and no data is stored in the memory 308a.

At time ta13, the control signals txa_12k to txa_12k+10 again become H. and the control signals txb_12k to txb_12k+10 also become H. Subsequently, at time ta14, the control signals txa_12k to txa_12k+10 and txb_12k to txb_12k+10 become L.

By this operation, the charge signals of both the photodiodes 201a (first photoelectric converter) and 201b (second photoelectric converter) are transferred to the floating diffusion region 203 and added (mixed) to generate an A+B image signal. At this time, since the control signals sel0_12k to sel0_12k+10 of the selection switch 206 are H, a voltage corresponding to the change is output to the amplification unit 204 and the column output lines 300a to 300f. Thus, at time ta14, the second reading operation for reading out the signal (A+B image signal) obtained by mixing the signals of the first and second photoelectric converters to the column output line is performed.

Next, at time ta15, the power saving control signals of the A/D converters 301c to 301f are negated (disabled), and the A/D converters 301c to 301f become active.

The ramp signal generator 306a starts outputting the ramp signal. At the same time, the counter 305a starts counting up from the reset state. The comparators in the A/D converters 301a to 301f compare the input signal with the ramp signal output from the ramp signal generator 306a.

The counter value that has been output is stored when the signal level of the input ramp signal increases with the elapsed time and exceeds the value of the input signal. This stored counter value becomes A+B image data (A/D conversion of the A+B image signal). When the A/D conversion of the A+B image signal is completed at the time ta16, the A+B image data of each column are transferred to the memory 308a and the transfer is completed at the time ta19.

At this time, the A+B image data of each column of the A/D converters 301a to 301f are respectively stored in the memories AB_0 342a to AB_5 342f. At the time ta16, the power saving control signals of the A/D converters 301a to 301f are simultaneously asserted, and the A/D converters 301a to 301f enter a power saving state. Subsequently, at time ta17, the control signals res_12k to res_12k+10 become H, and at time ta8, the control signals SEL0_12k to SEL0_12k+10 become L, and the signal reading from the pixels for 12 rows (one horizontal scanning line) and the A/D conversion operation are completed.

In a period from time ta2 to time ta 20 shown in FIG. 9 and FIG. 10, the data already stored in the memory group 330b of the memory 308a (AD-converted data in the previous horizontal period of time) are output from the memory 308a, and output to the outside of the image pickup element 100 via the data output unit 311a. The period of time from the above time ta2 to the time ta20 is defined as one horizontal period of time, which is a unit of reading.

FIG. 11 and FIG. 12 illustrate the timing charts of the operations from the storing of data in the memory group 330a of the memory 308a after A/D conversion of the data to the output of the data from the memory group 330a via the data output unit 311a. FIG. 11 illustrates the left side portion of the timing chart illustrating a writing operation and a reading operation to and from the memory group 330a in the moving image mode 1, and FIG. 12 illustrates the right-side portion. The timing in FIG. 11 and FIG. 12, in which a time that is identical to that in FIG. 9 and FIG. 10 is used, indicates that the timing in FIG. 11 and FIG. 12 is the same as that in FIG. 9 and FIG. 10.

At time ta6, the power saving control signals of the memories N_0 340a to N_5 340f of the memory group 330a are negated, the memories enter an operating state, and writing of N data to the memories N_0 340a to N_5 340f starts. When the writing is completed at time ta7, the power saving control signals are asserted, and the memories enter a power saving state. In the power saving state, the data in the memory are held.

At time ta11, the power saving control signals of the memories A_0 341a to A_1 341b of the memory group 330a are negated, the memories enter an operating state, and writing of the A-image data to the memories A_0 341a and A_1 341b starts.

When the writing is completed at time ta12, the power saving control signals are asserted, and the memories enter a power saving state. Since the data are not written to the memories A_2 341c to A_5 341f, the power saving control signals remain asserted, and the memories are maintained in the power saving state.

At time ta16, the power saving control signals of the memories AB_0 342a to AB_5 342f are negated, the memories enter an operating state, and the writing of the A+B image data to the memories AB_0 342a to AB_5 342f starts. When the writing is completed at time ta19, the power saving control signals are asserted and the memories enter a power saving state.

At time ta2, which is the next horizontal period of time, the power saving control signals of the memories N_0 340a to N_5 340f, the memory A_0 341a, the memory A_1 341b, and the memories AB_0 342a to AB_5 342f of the memory group 330a are negated, and these memories enter an operating state. For the memories A_2 341c to A_5 341f, the power saving control signals remain asserted and the memories are maintained in the power saving state.

In this state, the A-image data of 12k, 12k+2 rows, and the N data and A+B image data of 12k, 12k+2, 12k+4, 12k+6, 12k+8, and 12k+10 are output from the memory 308a by the memory control unit 343 and the output control unit 332, as shown in FIG. 12. During this time, the S–N calculation unit 309a and the correction circuit 310a are in an operating state while the power saving control signals are negated.

The S–N calculation unit 309a outputs the A-image data-N data or (A+B) image data-N data, and after the process in the correction circuit 310a, the data output unit 311a outputs the data to the outside of the image pickup element 100. As will be described below, the (A+B) image data –N data are image-displayed as a moving image on the display unit 104 in step S103 of FIG. 25. Additionally, the B-image data are generated by a calculation operation of the A-image data-N data, and phase difference focus detection is executed by using the A-image data and the B-image data. Specifically, for example, step S103 functions as a phase difference focus detecting means.

When the output is completed at time ta20, all the power saving control signals of the memory 308a, the S–N calculation unit 309a, and the correction circuit 310a are asserted, and each circuit enters a power saving state. The operation from time ta0 to time ta20 is repeated every 12 rows by a predetermined number of horizontal scanning lines to obtain an image signal for one screen.

As described above, during the first reading operation, the TG 307a, 307b, and the CPU 102 function as a control means that saves power for at least a part of the column circuits not used in the first reading operation among the column circuits used in the second reading operation. During the first reading operation, the control means also saves power for the column circuit not used during the second reading operation.

In the embodiment, the number of rows readout during the first reading operation is set smaller than the number of rows read out during the second reading operation. Additionally, the embodiment is configured to have a noise reading operation for reading out a noise signal from a plurality of pixels, and save power of a column circuit during the first reading operation so as to save power from the end of the noise reading operation.

Additionally, the embodiment is configured so as not to change the power saving state and the non-power saving state for the column circuit from the end of the noise reading operation to the start of the second reading operation. Accordingly, the power saving state is not changed to the non-power saving state at the start of the second reading operation, and the delay due to the start is less likely to occur. Additionally, in the embodiment, a corresponding memory for storing each of data output from the column circuit to which power is to be saved is provided, and a corresponding memory is power-saved in accordance with the power saving of the column circuit.

Figure 13:
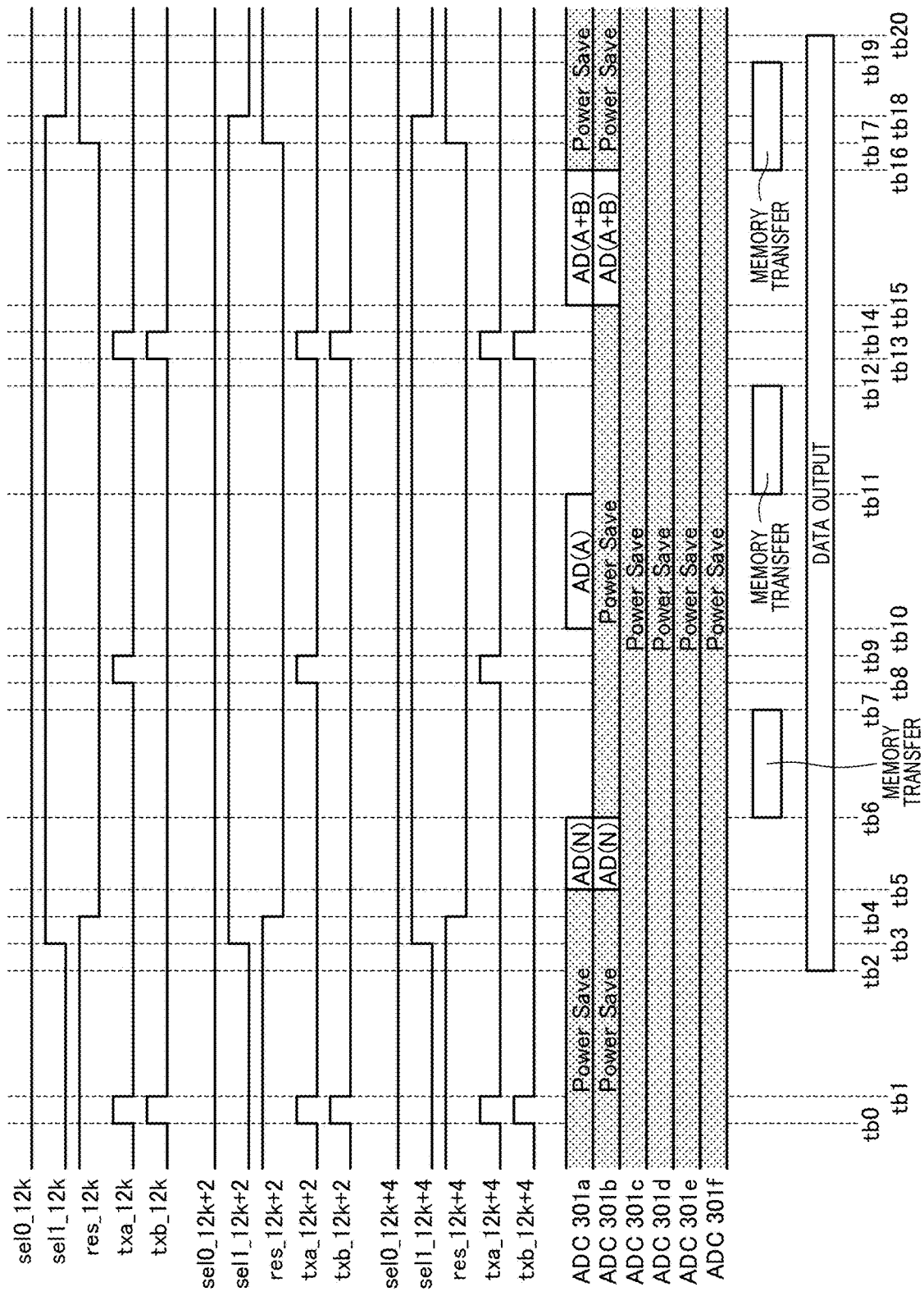
FIG. 13 illustrates the upper half of the timing chart illustrating the reading operation of the image pickup element in the moving image mode 2 of Embodiment 1.
Figure 14:
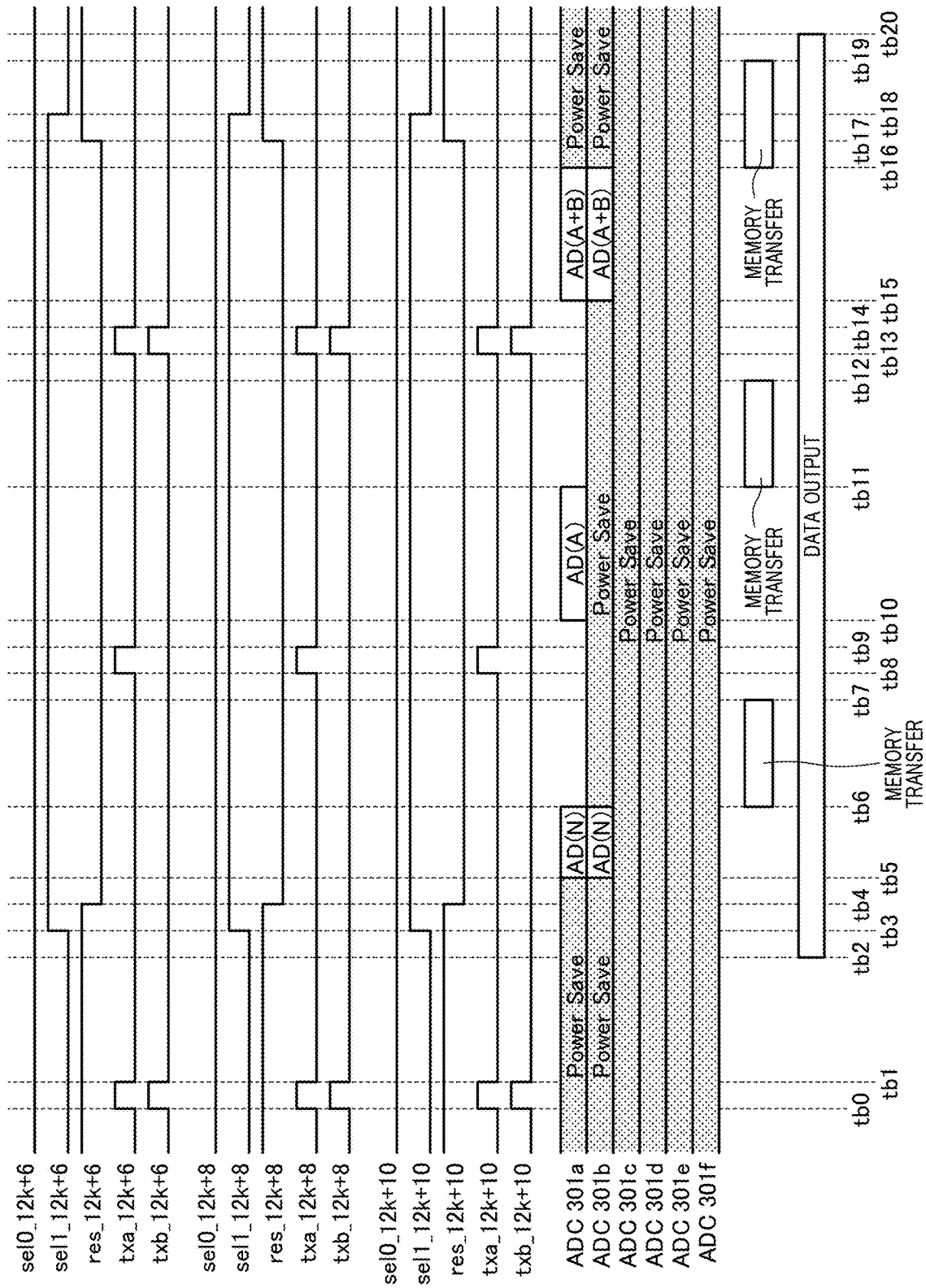
FIG. 14 illustrates the lower half of the timing chart illustrating the reading operation of the image pickup element in the moving image mode 2 of Embodiment 1.

FIGS. 13 to 16 are each timing charts illustrating a reading operation in the moving image mode 2 of Embodiment 1. FIG. 13 illustrates the upper half of the timing chart illustrating the reading operation of the image pickup element in the moving image mode 2 of Embodiment 1, and FIG. 14 illustrates the lower half of the timing chart illustrating the reading operation of the image pickup element in the moving image mode 2 of Embodiment 1.

Figure 15:
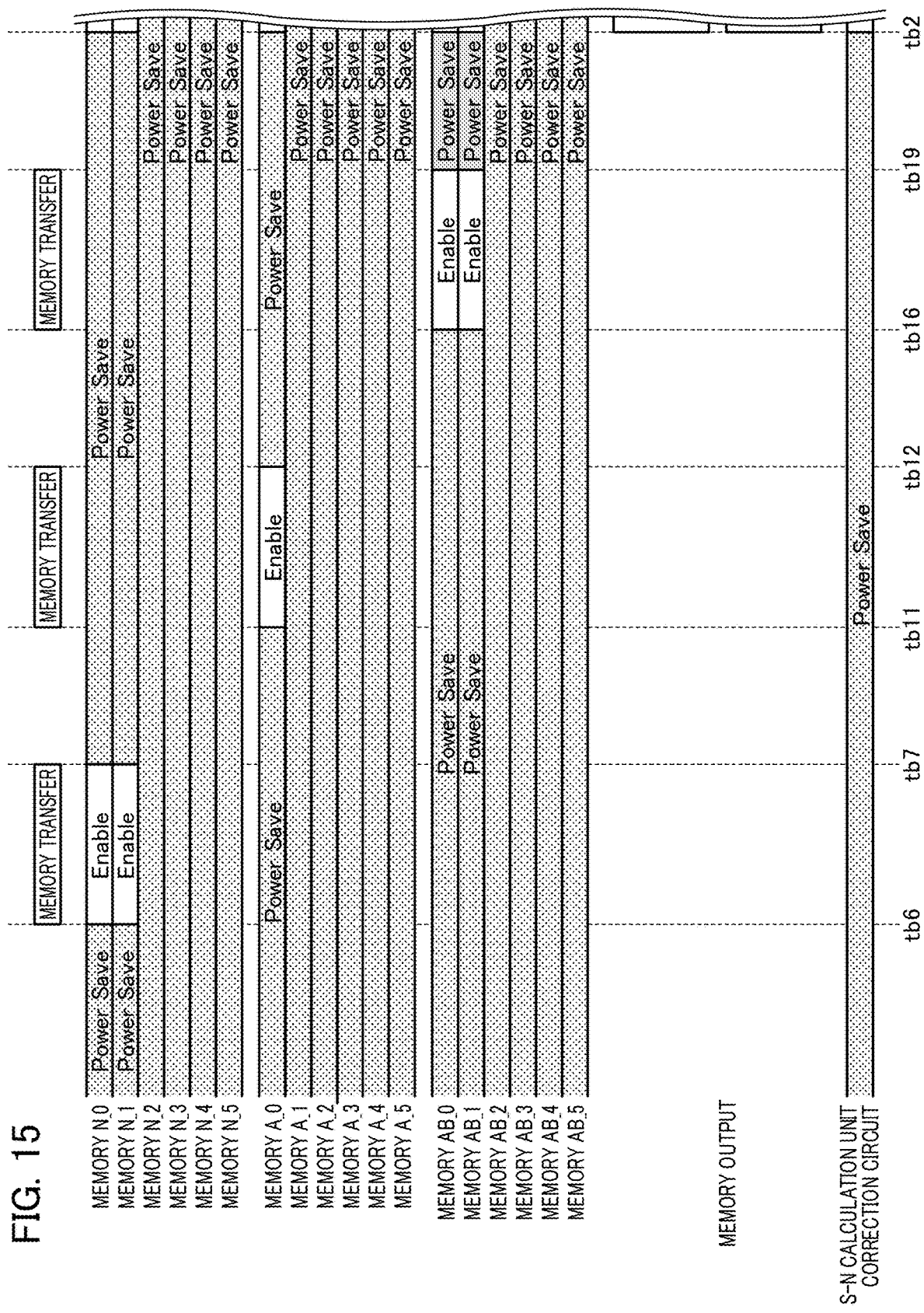
FIG. 15 illustrates the left portion of the timing chart illustrating the writing and reading operations to and from the memory in the moving image mode 2 of Embodiment 1.
Figure 16:
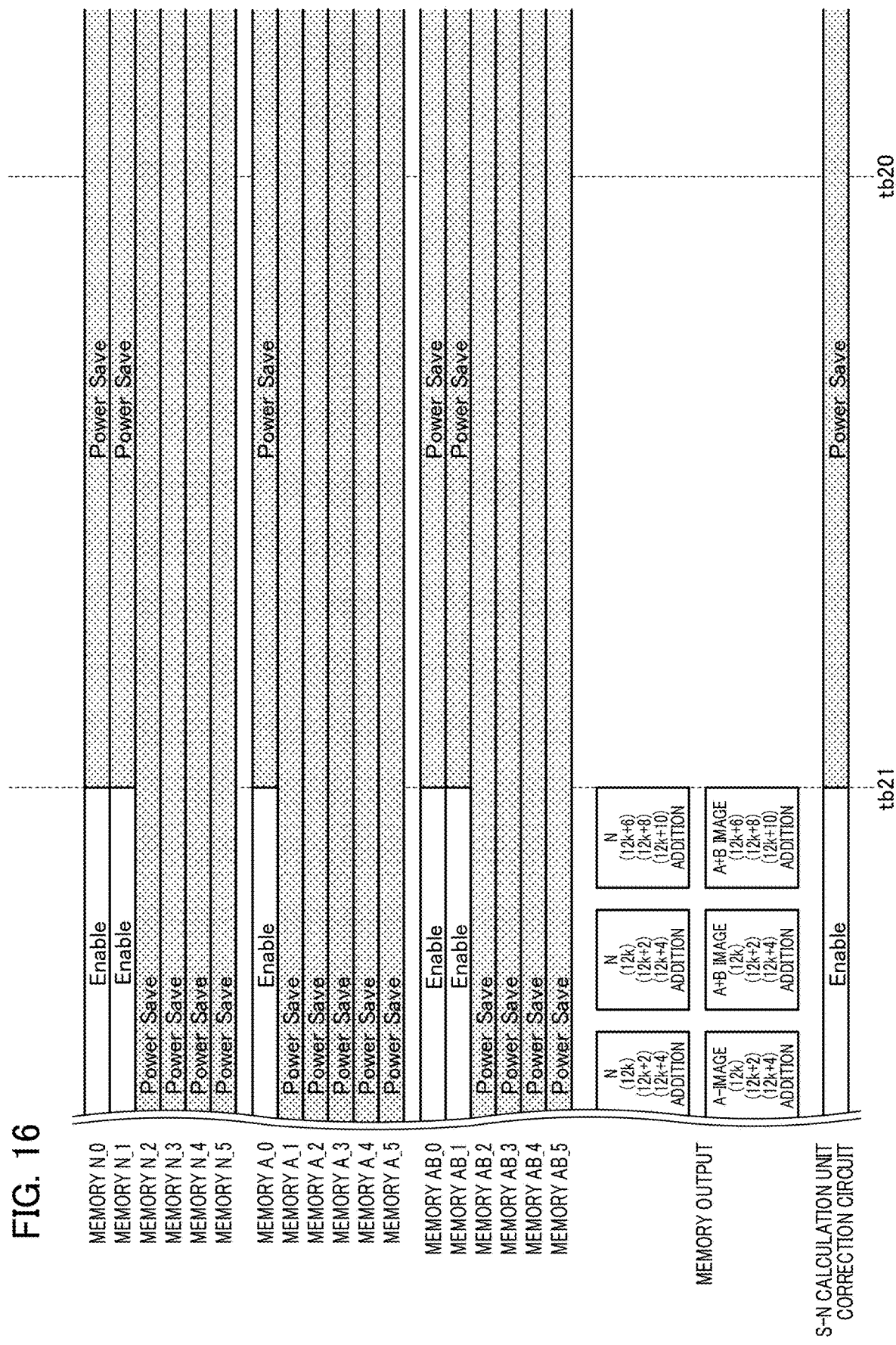
FIG. 16 illustrates the right side portion of the timing chart illustrating the writing and reading operations to and from the memory in the moving image mode 2 of Embodiment 1.

FIG. 15 illustrates the left side portion of the timing chart illustrating a writing operation and a reading operation to and from to the memory in the moving image mode 2 of Embodiment 1, and FIG. 16 illustrates the right side portion of the timing chart illustrating a writing operation and a reading operation to and from the memory in the moving image mode 2 of Embodiment 1.

Hereinafter, a reading operation for 12 rows of the image signals (one horizontal scanning line) will be described with reference to FIGS. 13 to 16. In FIGS. 13 to 16, the reading operation for the R pixel is described as an example, the same operation is applied to the other colors, and the description thereof will be omitted. At time tb0, the control signals txa_12k to txa_12k+10 and txb_12k to txb_12k+10 become H, and the transfer switches 202a and 202b are turned on.

At this time, the signals res_12k to res_12k+10 become H, and the electric charges accumulated in the photodiodes 201a and 201b are transferred to the power supply 208 via the transfer switches 202a and 202b and the reset switch 205, and the electric charges of the photodiodes 201a and 201b are reset. At time tb1, the control signals txa_12k to txa_12k+10 and txb_12k to txb_12k+10 become L, and the accumulation of photo-charge in the photodiodes 201a and 201b starts.

At time tb3, which is after the accumulation of the photo-charge for a predetermined time, the control signals sel1_12k to sel1_12k+10 of the selection switch 206 become H, and the source of the amplification unit 204 is connected to the column output lines 300a to 300f via the selection switch 206b. Note that in FIG. 9 and FIG. 10, the control signals sel0_12k to se0_12k+10 of the selection switch 206a are set to H, while in FIG. 13 and FIG. 14, the control signals sel1_12k to sel1_12k+10 of the selection switch 206b are set to H. Therefore, the column output lines to which the respective pixel outputs are connected are different.

At the time tb4, the reset of the floating diffusion region 203 is released by setting the control signals res_12k to res_12k+10 of the reset switches 205 to L. At this time, since the control signals sel1_12k to sel1_12k+10 of the selection switch 206 are H, the potential (N signal) of the reset signal level corresponding to the potential of the floating diffusion region 203 is read out only to the column output lines 300a and 300b via the amplification unit 204.

Next, at time tb5, the power saving control signals of the A/D converters 301a to 301b are negated and the A/D converters 301a to 301b become active. However, the A/D converters 301c to 301f remain in the power saving state. The ramp signal generator 306a starts outputting a ramp signal having a signal level that changes in proportion to the elapsed time. At the same time, the counter 305a starts counting up from the reset state.

The comparators in the A/D converters 301a to 301b compare the input signal with the ramp signal output from the ramp signal generator 306a The output counter value is stored when the signal level of the input ramp signal increases with the elapsed time and exceeds the value of the input signal. The stored counter value serves as the N data (A/D conversion of the N signal).

At this time, the addition signals of the N signal of the 12k, 12k+2 rows and 12k+4 rows that have been output to the column output line 300a are AD-converted by the A/D converter 301a. The addition signals of the N signal of the 12k+6, 12k+8 rows, and 12k+10 rows that have been output to the column output line 300b, are AD-converted by the A/D converter 301b.

At time tb6, when the A/D conversion of the N signal is completed, the N data of each column is transferred to the memory 308a, and the transfer is completed at time tb7. At this time, the added N data of 12k, 12k+2 rows, and 12k+4 rows from the A/D converter 301a, are stored in the memory N_0 340a, and the added N data of 12k+6, 12k+8 rows and 12k+10 rows from the A/D converter 301b, are stored in the memory N_1 340b.

At the time tb6, the power saving control signals of the A/D converter 301b are asserted at the same time, and the A/D converter 301b enters a power saving state. At times tb8 to tb9, the control signals txa_12k to txa_12k+10 become H whereby the electric charge stored in the photodiode 201a is transferred to the floating diffusion region 203. Since the control signals sel1_12k to sel1_12k+10 of the selection switch 206 at this time are H, the voltage in response to the change is read out only to the amplification unit 204 and the column output lines 300a and 300b.

Next, at time tb10, only the A/D converter 301a is activated and the ramp signal generator 306a starts outputting the ramp signals. At the same time, the counter 305a starts counting up from the reset state. The comparator in the A/D converter 301a compares an input signal with a ramp signal output from the ramp signal generator 306a. The output counter value is stored when the signal level of the input ramp signal increases with the elapsed time and exceeds the value of the input signal. The stored counter value serves as A-image data (A/D conversion of the A-image signal).

Accordingly, only the addition signals of the A-image signals of the 12k, 12k+2 rows, and 12k+4 rows that have been output to the column output line 300a are AD-converted by the A/D converter 301a. As described above, in the moving image mode 2, signals in a plurality of rows are added during the first reading operation and read out to the column output lines. At time tb11, when the A/D conversion of the A-image signal is completed, the A-image data of the A/D converter 301a are transferred to the memory 308a, and the transfer is completed at time tb12. At this time, the A-image data of the A/D converter 301a are stored in the memory A_0 341a.

Since the A/D converters 301b to 301f are in the power saving state, no valid data is output, and no data is stored in the memory 308a. At times tb13 to tb14, the control signals txa_12k to txa_12k+10 again become H and the control signals txb_12k to txb_12k+10 also become H. By this operation, both the photo-charges of the photodiodes 201a and 201b are transferred to the floating diffusion region 203 and added to generate an A+B image signal. The voltage corresponding to the change is output only to the amplification unit 204 and the column output lines 300a and 300b.

Next, at time tb15, the power saving control signals of the A/D converter 301b are negated and the A/D converter 301b becomes active. The ramp signal generator 306a starts outputting the ramp signal. At the same time, the counter 305a starts counting up from the reset state. The comparator in the A/D converters 301a to 301b compares the input signal with the ramp signal output from the ramp signal generator 306a. The output counter value is stored when the signal level of the input ramp signal increases with the elapsed time and exceeds the value of the input signal.

The stored counter value serves as A+B image data (A/D conversion of the A+B image signal). Accordingly, the addition signals of the A+B image signal of the 12k, 12k+2 rows, and 12k+4 rows that have been output to the column output line 300a are AD-converted by the A/D converter 301a. The addition signals of the A+B image signal of the 12k+6, 12k+8 rows, and 12k+10 rows that have been output to the column output line 300b are AD-converted by the A/D converter 301b.

When the A/D conversion for the A+B image signals is completed at time tb16, the A+B image data are transferred to the memory 308a, and the transfer is completed at time tb19. At this time, the A+B image data obtained by adding 12k, 12k+2 rows, and 12k+4 rows from the A/D converter 301a are stored in the memory AB_0 342a. The A+B image data obtained by adding 12k+6, 12k+8 rows, and 12k+10 rows from the A/D converter 301a are stored in the memory AB_1 342b.

At time tb16, the power saving control signals of the A/D converters 301a to 301b are simultaneously asserted, and the A/D converters 301a to 301b enter a power saving state. Subsequently, at time tb17, the control signals res_12k to res_12k+10 become H, at time tb18, the control signals sel1_12k to sel1_12k+10 become L, and the signal reading from the pixels for 12 rows (one horizontal scanning line) and the A/D conversion operation are completed.

In the period of time from time tb2 to time tb20 in FIG. 13 and FIG. 14, the data already stored in, for example, the memory group 330b of the memory 308a (AD-converted data in the previous horizontal period of time to be described below) are output, and are output to the outside of the image pickup element 100 via the data output unit 311a. Note that the period of time from the time tb2 to the time tb20 is defined as one horizontal period of time, which is a unit of reading.

FIG. 15 and FIG. 16 illustrate the timing charts of the operations from the storing of data in the memory group 330a of the memory 308a after A/D conversion of the data to the output of the data from the data output unit 311a. The timing in FIG. 15 and FIG. 16, in which a time that is the same as FIG. 13 and FIG. 14 is used, indicates that the timing in FIG. 15 and FIG. 16 is the same as that in FIG. 13 and FIG. 14.

At time tb6, the power saving control signals of the memories N_0 340a to N_1 340b are simultaneously negated, the memories enter an operating state, and the writing of the N data of the memory group 330a to the memories N_0 340a to N_1 340b starts. When the writing is completed at time tb7, the power saving control signals are asserted, and the memories enter a power saving state. In the power saving state, the data in the memory are held. Since the data are not written to the memory N_2 340c to the memory N_5 340f, the power saving control signals remain asserted and the memories are maintained in the power saving state.

At time tb11, the power saving control signals of the memory A_0 341a are negated, the memory enters an operating state, and writing of the A-image data to the memory A_0 341a starts. When the writing is completed at time tb12, the power saving control signals are asserted, and the memory enters a power saving state. Since the data are not written to the memories A_1 341b to A_5 341f, the power saving control signals remain asserted and the memories are maintained in the power saving state.

At time tb16, the power saving control signals of the memories AB_0 342a to AB_1 342b are negated, the memories enter an operating state, and the writing of the A+B image data to the memories AB_0 342a to AB_1 342b starts. When the writing is completed at time tb19, the power saving control signals are asserted, and the memories enter a power saving state. Since the data are not written to the memories AB_2 342c to AB_5 342f, the power saving control signals remain asserted and the memories are maintained in the power saving state.

At time tb2, which is the next horizontal period of time, the power saving control signals of the memories N_0 340a to N_1 340b, memory A_0 341a, and memories AB_0 342a to AB_1 342b are negated, and the memories enter an operation state. The memories N_2 340c to N_5 340f, the memories A_1 341b to A_5 341f, and the memories AB_2 342c to AB_5 342f are maintained in the power saving state while the power saving control signals remain asserted.

In this state, as shown in FIG. 16, the memory control unit 343 and the output control unit 332 output the added N data of 12k, 12k+2 rows, and 12k+4 rows, the added A-image data, and the added A+B image data from the memory 308a. The added N data of 12k+6, 12k+8, and 12k+10 rows and the added A+B image data are output from the memory 308a. During this time, the S–N calculation unit 309a and the correction circuit 310a are in an operating state while the power saving control signals are negated.

The added N data are subtracted from the added A-image data by the S–N operation unit 309a, and the added N data are subtracted from the added A+B image data. Subsequently, after the process in the correction circuit 310a, the data are output from the data output unit 311a to the outside of the image pickup element 100. In step S108 of FIG. 25, which ill be described below, the A+B image data obtained by subtracting the N data are used as a moving image for display or the like, and the B image data are calculated by further subtracting the A-image data obtained by subtracting the N data. Subsequently, focus detection is performed based on the phase difference between the A-image data and the B-image data.

When the output is completed at time tb21, all the power saving control signals of the memory 308a, the S–N calculation unit 309a, and the correction circuit 310a are asserted, and each circuit enters a power saving state. The operations from time tb0 to time tb20 are repeated by 12 rows each by a predetermined number of horizontal scanning lines to obtain an image signal for one screen.

Figure 17:
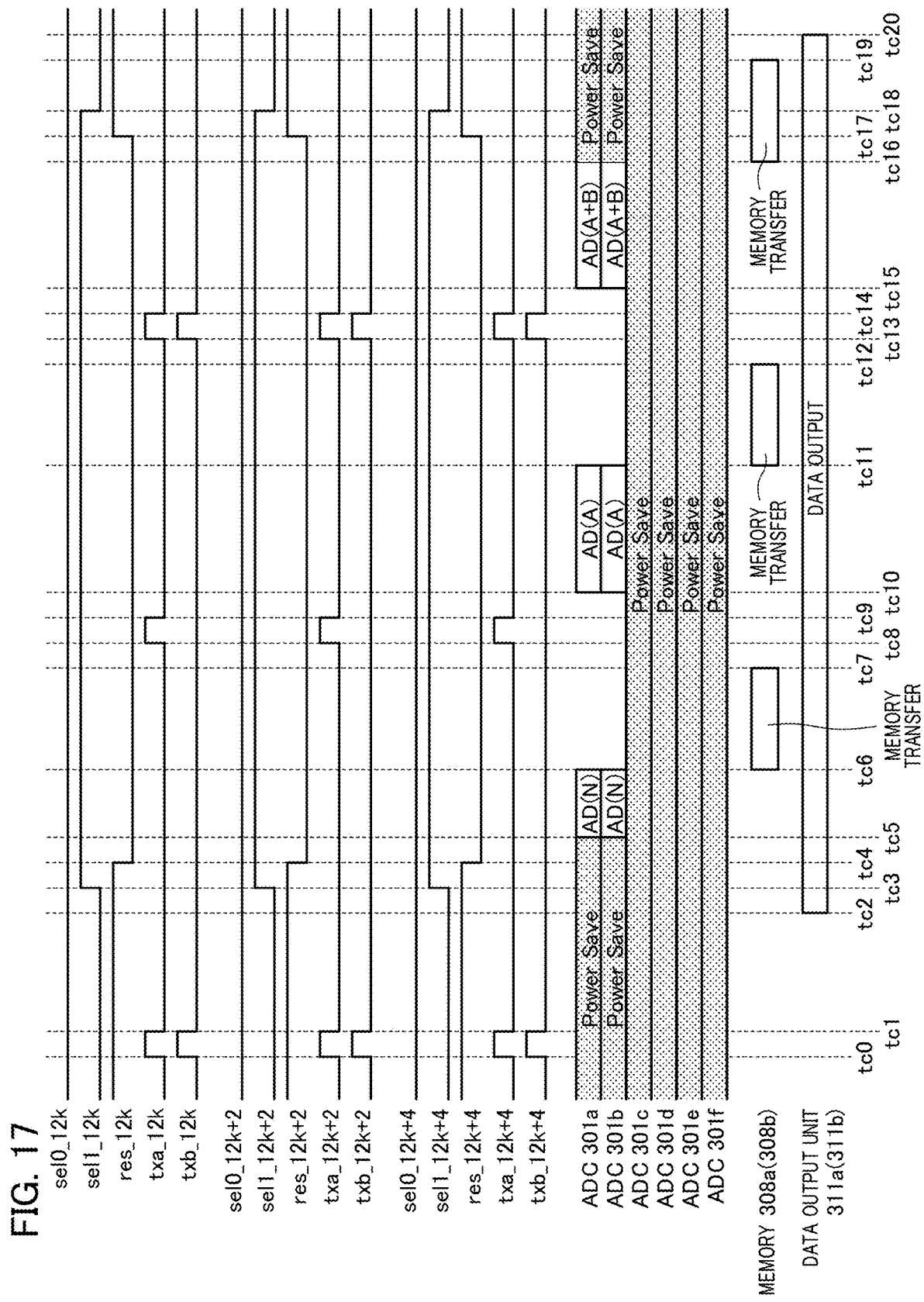
FIG. 17 illustrates the upper half of the timing chart illustrating the reading operation of the image pickup element in the moving image mode 3 of Embodiment 1.
Figure 18:
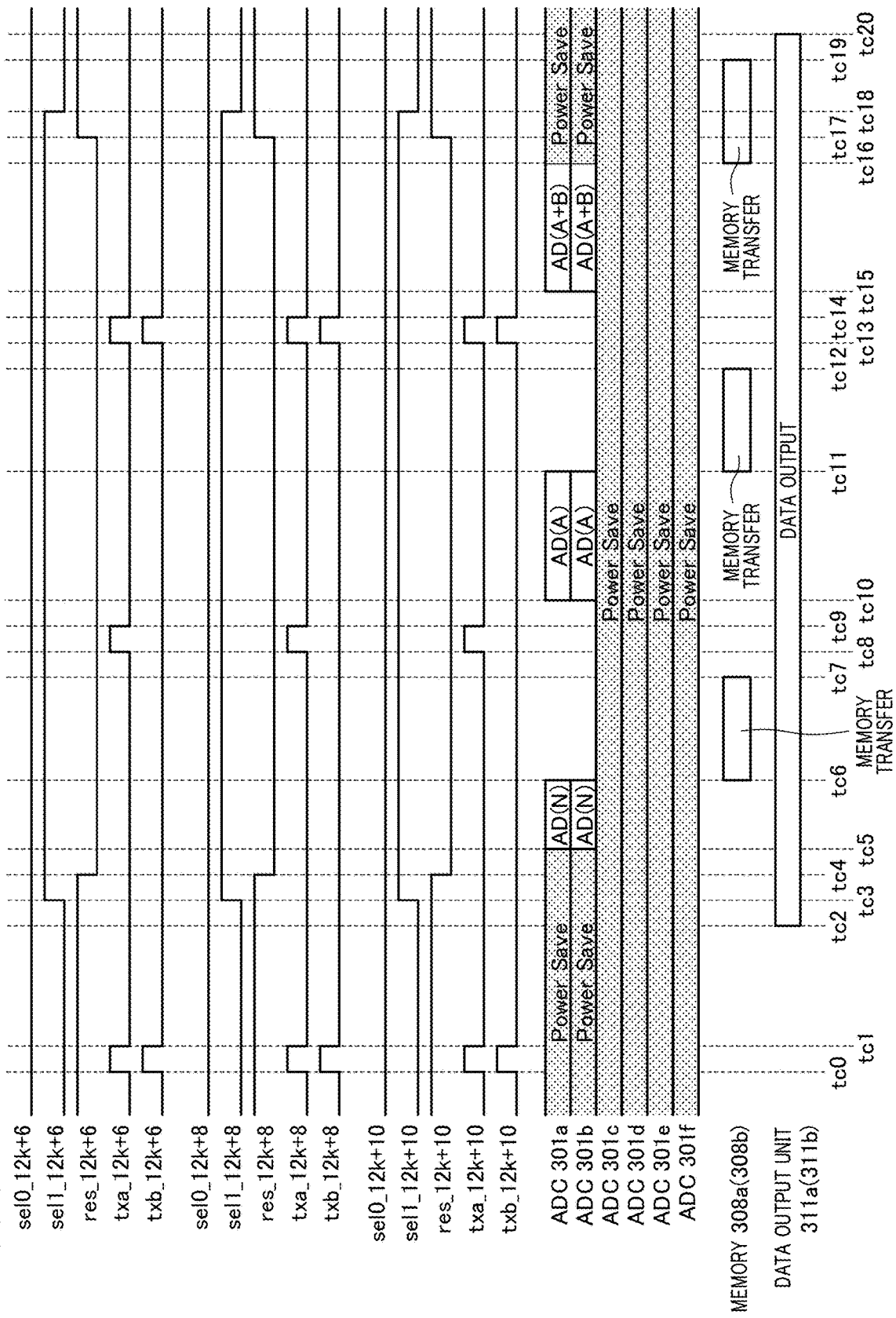
FIG. 18 illustrates the lower half of the timing chart illustrating the reading operation of the image pickup element in the moving image mode 3 of Embodiment 1.

Next, FIG. 17 to FIG. 20 are timing charts illustrating a reading operation in the moving image mode 3 of Embodiment 1. FIG. 17 illustrates the upper half of the timing chart illustrating the reading operation of the image pickup element in the moving image mode 3 of Embodiment 1, and FIG. 18 illustrates the lower half of the timing chart illustrating the reading operation of the image pickup element in the moving image mode 3 of Embodiment 1.

Figure 19:
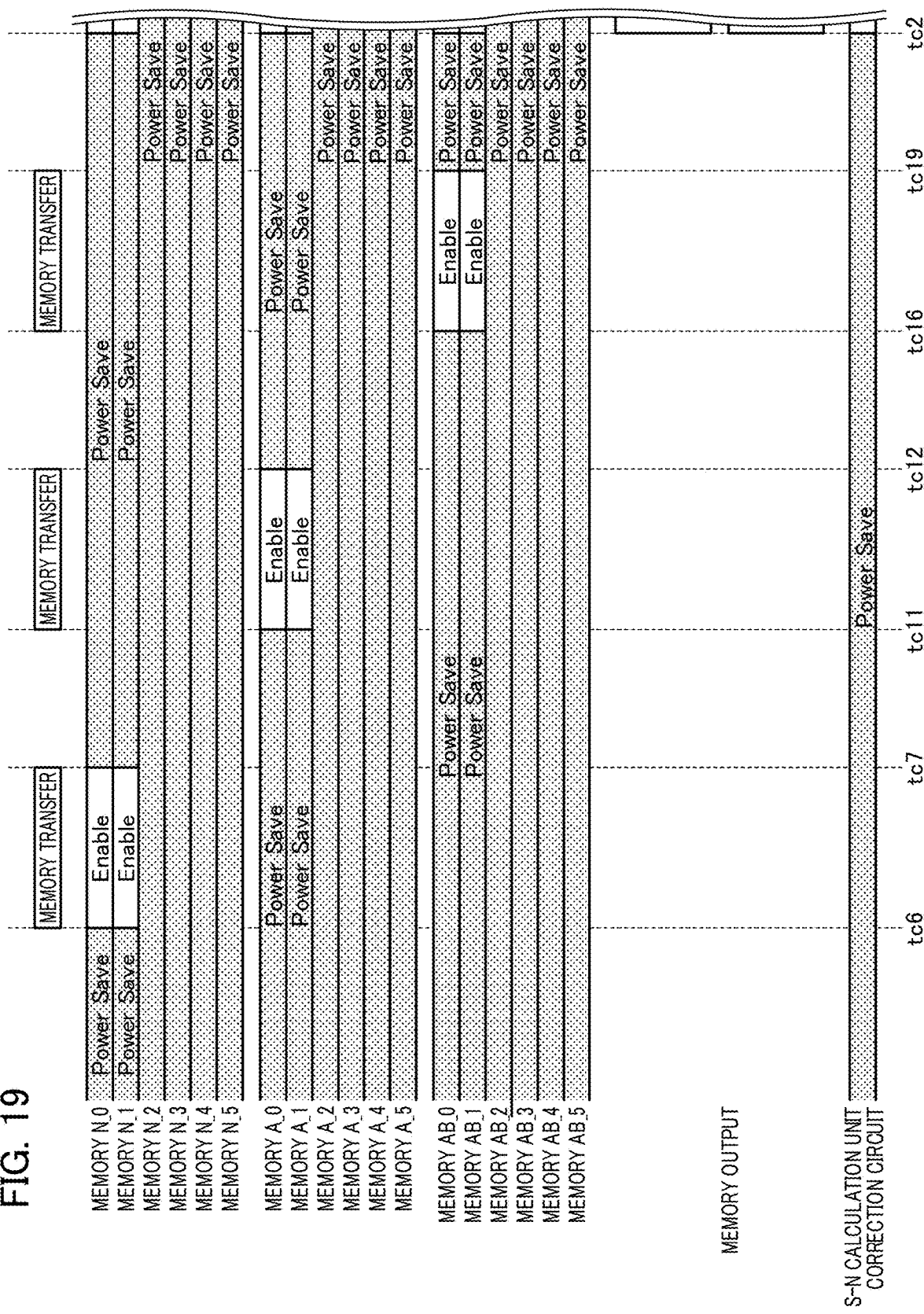
FIG. 19 illustrates the left side portion of the timing chart illustrating the writing and reading operations to and from the memory in the moving image mode 3 of Embodiment 1.
Figure 20:
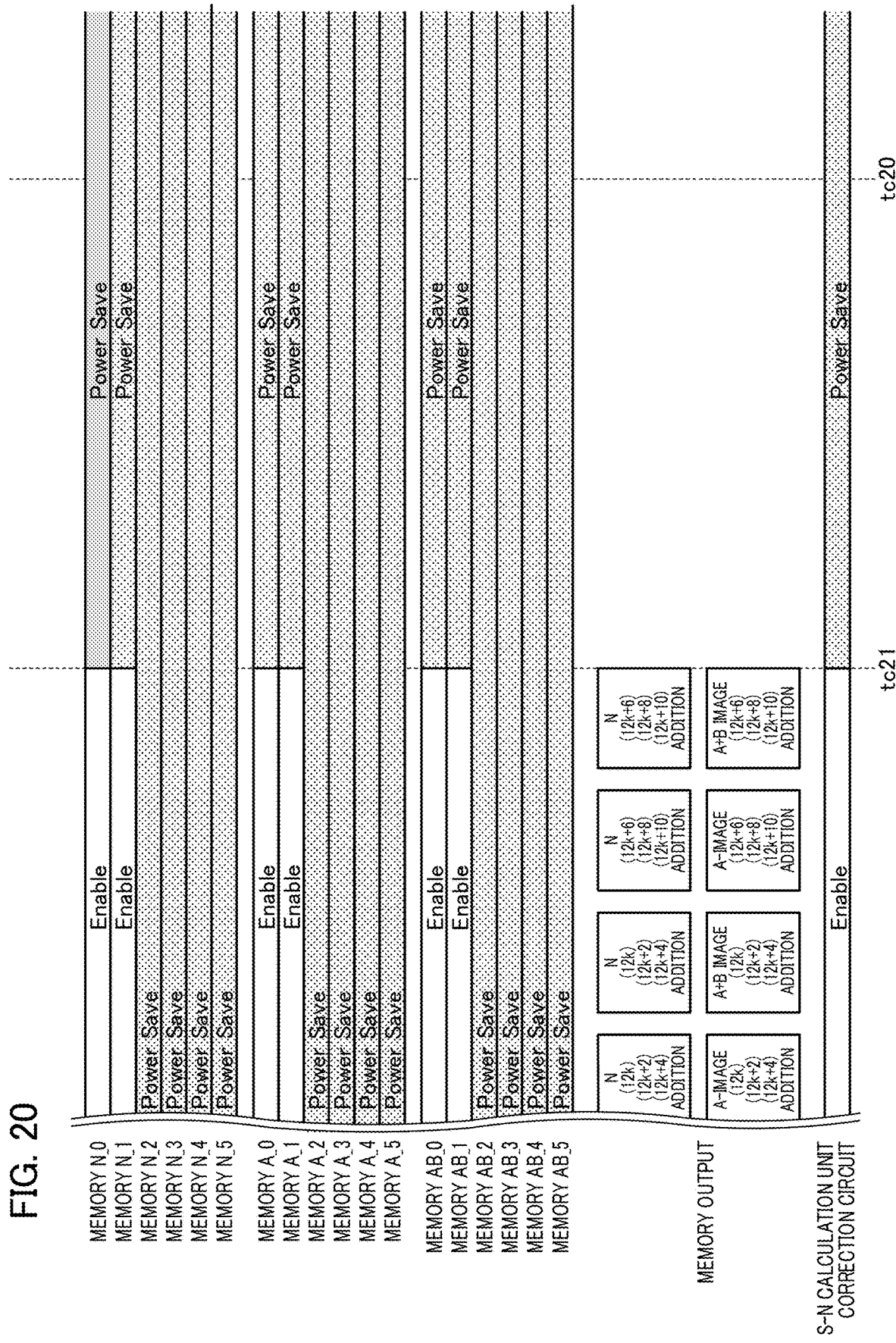
FIG. 20 illustrates the right side portion of the timing chart illustrating the writing and reading operations to and from the memory in the moving image mode 3 of Embodiment 1.

FIG. 19 illustrates the left side portion of the timing chart illustrating a writing operation and a reading operation to and from to the memory in the moving image mode 3 of Embodiment 1, and FIG. 20 illustrates the right side portion of the timing chart illustrating the writing operation and the reading operation to and from the memory in the moving image mode 3 of Embodiment 1. Hereinafter, the simultaneous reading operation for 12 rows of the image signals (one horizontal scanning line) will be described with reference to FIG. 17 to FIG. 20. In FIG. 17 to FIG. 20, the reading operation of the R pixel will be described as an example. The same operation is applied to the other colors, and the description thereof will be omitted.

In the moving image mode 2 and the moving image mode 3, the driving control and the like for each pixel of the image pickup element 100 is the same, and there is a difference in that the A/D converter 301b is also activated during the reading of the A-image signal. At time tc0, the control signals txa_12k to txa_12k+10, txb_12k to txb_12k+10 become H and the transfer switches 202a and 202b are turned on. At this time, the signals res_12k to res_12k+10 become H, and the electric charges stored in the photodiodes 201a and 201b are transferred to the power supply 208 via the transfer switches 202a and 202b and the reset switch 205. Subsequently, the photodiodes 201a and 201b are reset.

At time tc1, the control signals txa_12k to txa_12k+10 and txb_12k to txb_12k+10 are set to L, and the accumulation of the photo-charge on the photodiodes 201a and 201b starts. At time tc3, which is after the accumulation of the photo-charge for a predetermined time, the control signals sel1_12k to sel1_12k+10 of the selection switch 206 become H and the source of the amplification unit 204 is connected to the column output lines 300a to 300b.

At time tc4, the reset of the floating diffusion region 203 is released by setting the control signals res_12k to res_12k+10 of the reset switch 205 to L. At this time, the potential of the reset signal level corresponding to the potential of the floating diffusion region 203 is read out to the column output lines 300a and 300b via the amplification unit 204 and is input to the A/D converters 301a to 301b.

Next, at time tc5, the power saving control signals of the A/D converters 301a and 301b are negated and the A/D converters 301a and 301b are activated. The ramp signal generator 306a starts outputting a ramp signal having a signal level that changes in proportion to the elapsed time. At the same time, the counter 305a starts counting up from the reset state. The comparators in the A/D converters 301a and 301b compare the input signal with the ramp signal output from the ramp signal generator 306a.

The output counter value is stored when the signal level of the input ramp signal increases with the elapsed time and exceeds the value of the input signal. This stored counter value becomes N data (A/D conversion of the N signal). At time tc6, when the A/D conversion of the N signal is completed, the N data of each column are transferred to the memory 308a, and the transfer is completed at time tc7. At this time, the N data of the A/D converters 301a and 301b are respectively stored in the memories N_0 340a to N_1 340b.

At time tc8, the control signals txa_12k to txa_12k+10 become H, and the photo-charge of the photodiode 201a is transferred to the floating diffusion region 203. Subsequently, at time tc9, the control signals txa_12k to txa_12k+10 become L. By this operation, the electric charge stored in the photodiode 201a is transferred to the floating diffusion region 203. Subsequently, the voltage corresponding to the change is output to the amplification unit 204 and the column output lines 300a and 300b.

Next, at time tc10, the ramp signal generator 306a starts outputting the ramp signal. At the same time, the counter 305a starts counting up from the reset state. The comparators in the A/D converters 301a and 301b compare the input signal with the ramp signal output from the ramp signal generator 306a. The output counter value is stored when the signal level of the input ramp signal increases with the elapsed time and exceeds the value of the input signal. This stored counter value serves as A-image data (A/D conversion of the A-image signal).

At time tc11, when the A/D conversion of the A-image signal is completed, the A-image data of each column are transferred to the memory 308a and the transfer is completed at time tc12. At this time, the A-image data of the A/D converters 301a and 301b are respectively stored in memories A_0 341a and A_1 341b. Since the A/D converters 301c to 301f are in the power saving state, no valid data is output, and no data is stored in the memory 308a.

At times tc13 to tc14, the control signals txa_12k to txa_12k+10 again become H and the control signals txb_12k to txb_12k+10 also become H. By this operation, both the photo-charges of the photodiodes 201a and 201b are transferred to the floating diffusion region 203 and added together. The voltage corresponding to the change is output to the amplification unit 204 and the column output lines 300a and 300b.

Next, at time tc15, the ramp signal generator 306a starts outputting the ramp signal. At the same time, the counter 305a starts counting up from the reset state.

The comparators in the A/D converters 301a and 301b compare the input signal with the ramp signal output from the ramp signal generator 306a. The output counter value is stored when the signal level of the input ramp signal increases with the elapsed time and exceeds the value of the input signal. The stored counter value serves as A+B image data (A/D conversion of the A+B image signal).

At time tc16, when the A/D conversion of the A+B image signal is completed, the A+B image data of each column are transferred to the memory 308a, and the transfer is completed at time tc19. At this time, the A+B image data of the A/D converters 301a and 301b are respectively stored in the memories AB_0 342a to AB_1 342b. Additionally, at time tc16, the power saving control signals of the A/D converters 301a and 301b are simultaneously asserted, and the A/D converters 301a and 301b enter a power saving state.

Subsequently, at time tc17, the control signals res_12k to res_12k+10 become H, and at time tc18, the control signals sel1_12k to sel1_12k+10 become L, and the signal reading from the pixels for 12 rows (one horizontal scanning line) and the A/D conversion operation are completed.

In the period of time from time tc2 to time tc20 shown in FIG. 17 and FIG. 18, data already stored in the memory 308a (data that have been AD-converted in the previous horizontal period of time to be described below) are output from the memory 308a and output to the outside of the image pickup element 100 via the data output unit 311a. The period of time from the time tc2 to the time tc20 described above is defined as one horizontal period of time, which is a unit of reading.

FIG. 19 and FIG. 20 illustrate a timing chart of the operation from the storing of data in the memory 308a after A/D conversion of the data to the output of the data from the data output unit 311a. The timing in FIG. 19 and FIG. 20, in which a time that is the same as FIG. 17 and FIG. 18 is used, indicates that the timing in FIG. 19 and FIG. 20 is the same as that in FIG. 17 and FIG. 18. At time tc6, the power saving control signals of the memories N_0 340a to N_1 340b are negated, the memories enter an operating state, and the writing of the N data to the memories N_0 340a to N_1 340b starts.

When the writing is completed at the time tc7, the power saving control signals are asserted, and the memories enter a power saving state. In the power saving state, the data in the memory are held. Since the data are not written to the memory N_2 340c to the memory N_5 340f, the power saving control signals remain asserted, and the memories are maintained in the power saving state.

At time tc11, the power saving control signals of the memories A_0 341a to A_1 341b are negated, the memories enter an operating state, and the writing of the A-image data to the memories A_0 341a to A_1 341b starts. When the writing is completed at time tc12, the power saving control signals are asserted, and the memories enter a power saving state. Since the data are not written to the memories A_2 341c to A_5 341f, the power saving control signals remain asserted, and the memories are maintained in the power saving state.

At time tc16, the power saving control signals of the memories AB_0 342a to AB_1 342b are negated, the memories enter an operating state, and writing of the N data to the memories AB_0 342a to AB_1 342b starts. When the writing is completed at time tc19, the power saving control signals are asserted, and the memories enter a power saving state. Since the data are not written to the memories AB_2 342c to AB_5 342f, the power saving control signals remain asserted, and the memories are maintained in the power saving state.

At the time tc2 of the next horizontal period of time, the power saving control signals of the memories N_0 340a to N_1 340b, the memories A_0 341a to A_1 341b, and the memories AB_0 342a to AB_1 342b are negated and the memories enter an operating state. For the memories N_2 340c to N_5 340f, the memories A_2 341c to A_5 341f, and the memories AB_2 342c to AB_5 342f, the power saving control signals remain asserted, and the memories are maintained in the power saving state.

In this state, as shown in FIG. 20, the data obtained by adding N data of 12k, 12k+2 rows, and 12k+4 rows, the data obtained by adding the A-image data, and the data obtained by adding the A+B image data are obtained from the memory 308a by the memory control unit 343 and the output control unit 332. Additionally, the data obtained by adding the N data of 12k+6, 12k+8 rows, and 12k+10 rows, the data obtained by adding the A-image data, and the data obtained by adding the A+B image data are obtained from the memory 308a. During this time, the S−N calculation unit 309a and the correction circuit 310a are in an operating state while the power saving control signals are negated.

After the process performed by the S−N calculation unit 309a and the correction circuit 310a, the data are output from the data output unit 311a to the outside of the image pickup element 100. In step S111 of FIG. 25 to be described below, the A+B image data obtained by subtracting the N data are used for the display of moving images or the like, the A-image data obtained by subtracting the N data are calculated to obtain the B-image data, and the focusing adjustment is performed based on the phase difference between the A-image data and the B-image data.

When the output is completed at time tc21, all the power saving control signals of the memory 308a, the S−N calculation unit 309a, and the correction circuit 310a are asserted, and each circuit enters a power saving state. The operation from time tc0 to time tc20 is repeated for 12 rows each by a predetermined number of the horizontal scanning lines to obtain image signals for one screen.

Figure 21:
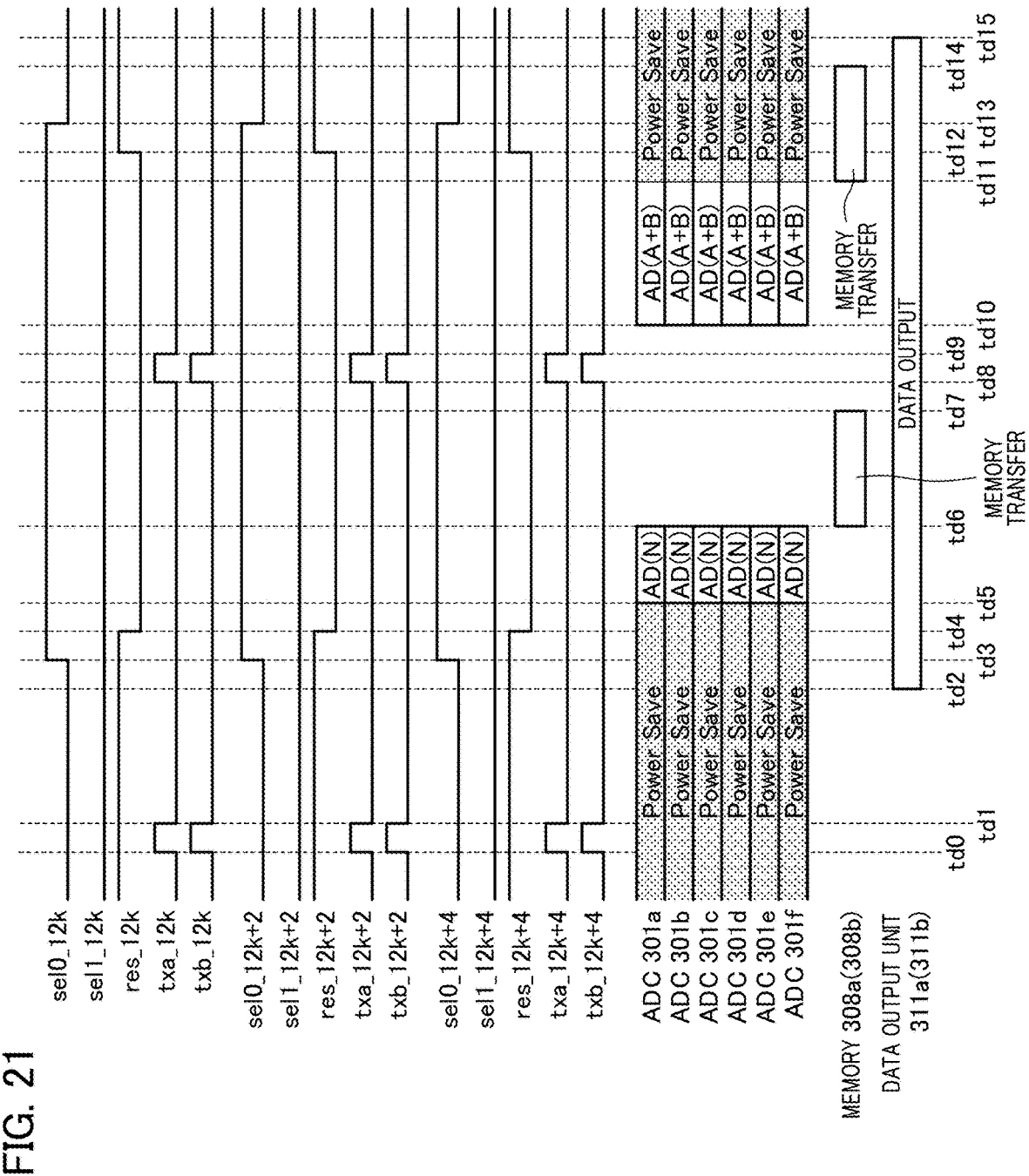
FIG. 21 illustrates the upper half of the timing chart illustrating the reading operation of the image pickup element in a still image mode of Embodiment 1.
Figure 22:
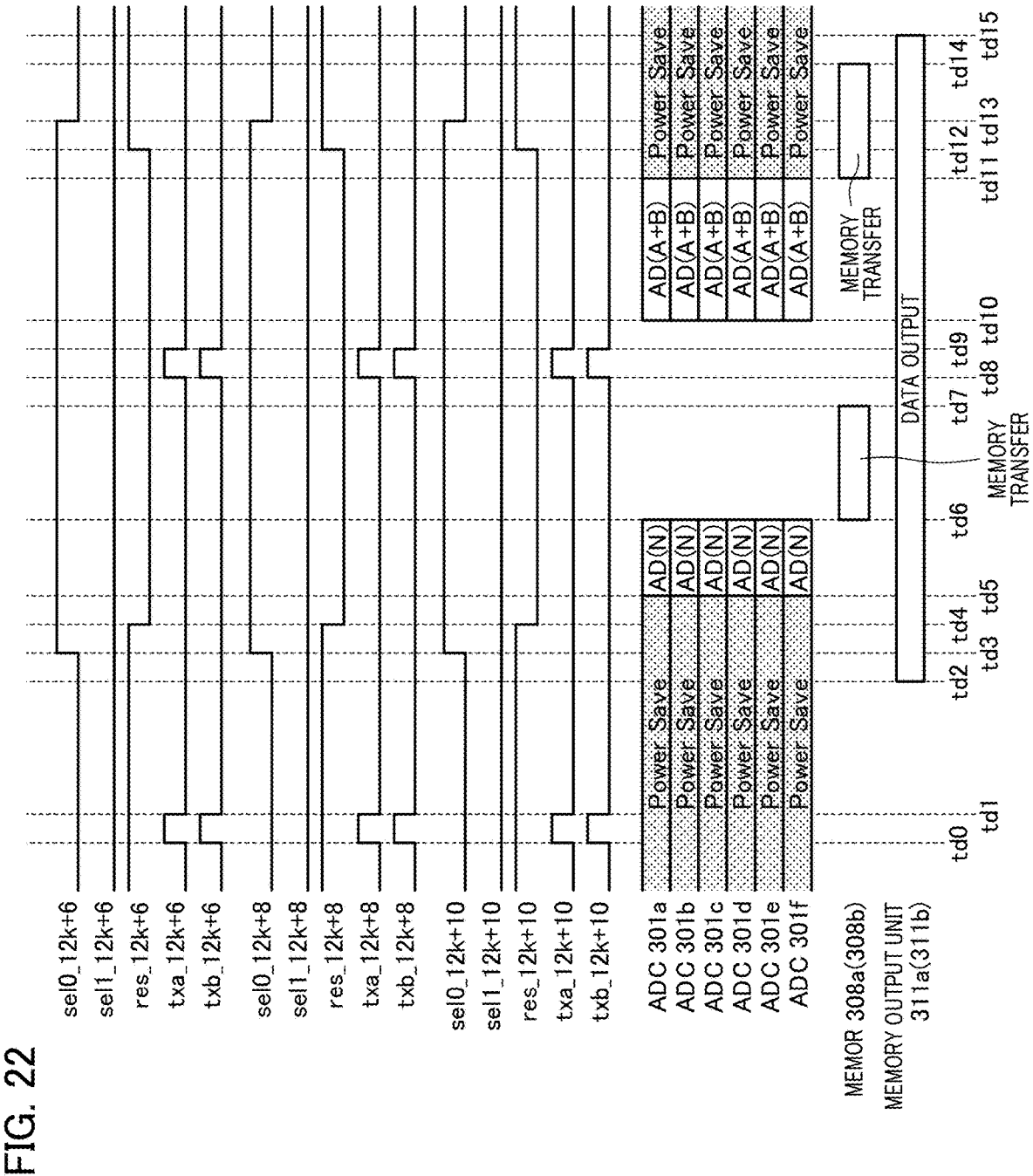
FIG. 22 illustrates the lower half of the timing chart illustrating the reading operation of the image pickup element in the still image mode of Embodiment 1.

Next, FIG. 21 to FIG. 24 are timing charts illustrating the reading operation in the still image mode. FIG. 21 illustrates the upper half of the timing chart illustrating the reading operation of the image pickup element in a still image mode, and FIG. 22 illustrates the lower half of the timing chart illustrating the reading operation of the image pickup element in the still image mode.

Figure 23:
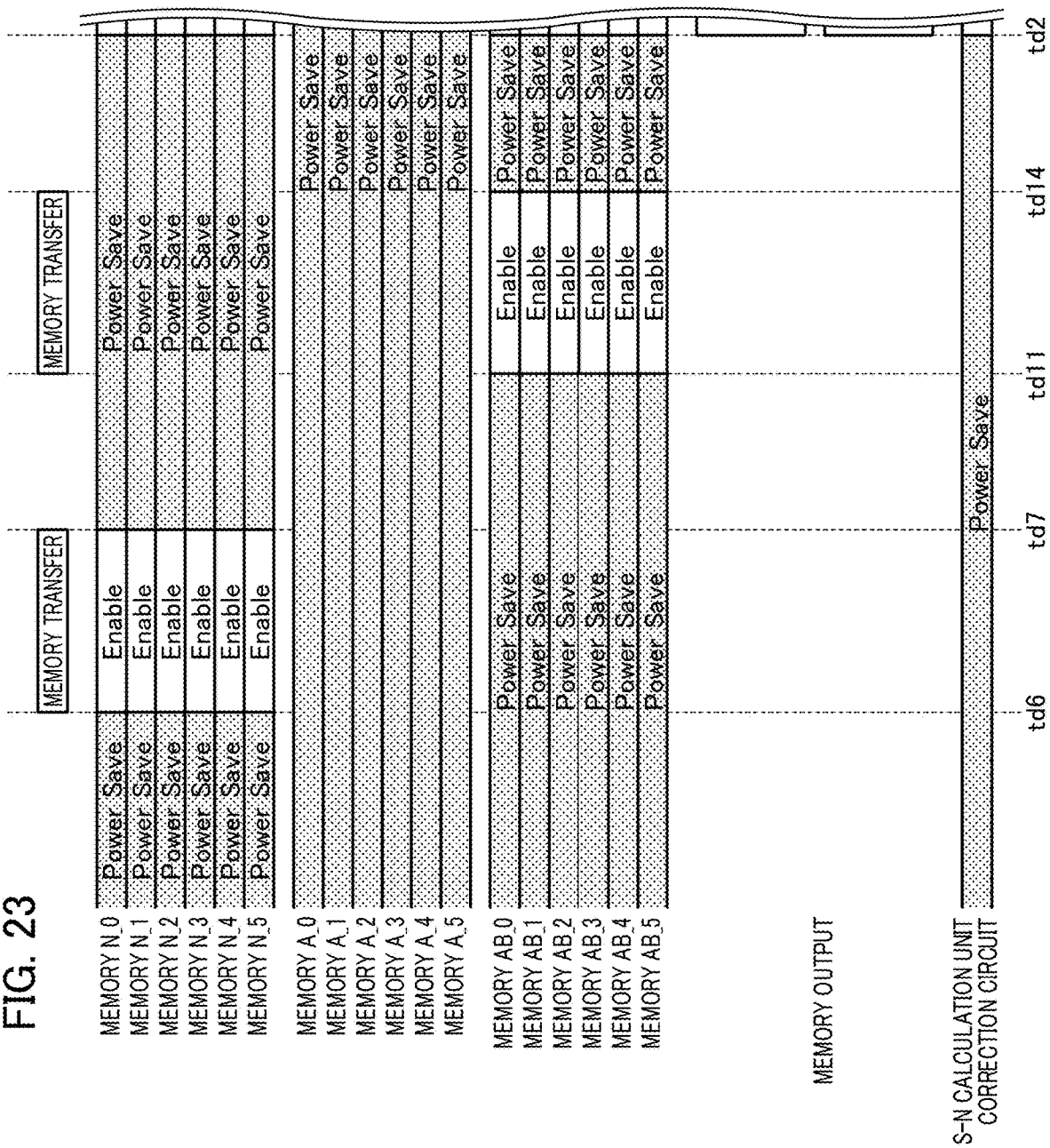
FIG. 23 illustrates the left side portion of the timing chart illustrating the writing and reading operations to and from the memory in the still image mode of Embodiment 1.
Figure 24:
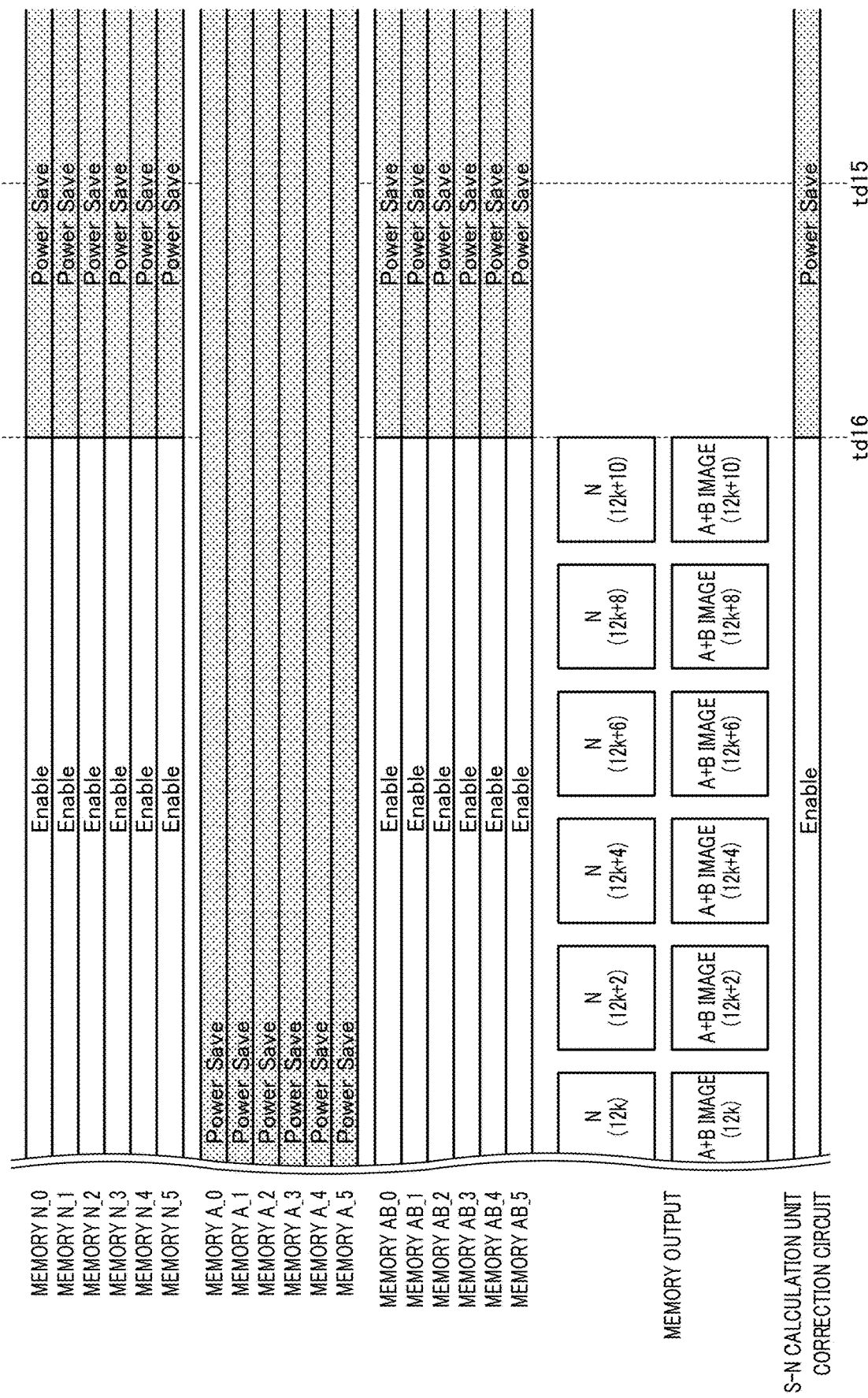
FIG. 24 illustrates the right side portion of the timing chart illustrating the writing and reading operations to and from the memory in the still image mode of Embodiment 1.

FIG. 23 illustrates the left side portion of the timing chart illustrating a writing operation and a reading operation to and from the memory in the still image mode, and FIG. 24 illustrates the right side portion of the timing chart illustrating a writing operation and a reading operation to and from the memory in the still image mode.

The reading operation for 12 lines of the image signals (one horizontal scanning line) will be described below with reference to FIG. 21 to FIG. 24. It is assumed that each switch is turned on when each control signal is H, and that each switch is turned off when each control signal is L. The reading operation of the R pixel will be described as an example with reference to FIG. 21 to FIG. 24. The same operation is applied to the other colors, and the description thereof will be omitted.

At time td0, the control signals txa_12k to txa_12k+10 and txb_12k to txb_12k+10 become H, and transfer switches 202a and 202b are turned on. At this time, the signals res_12k to res_12k+10 are H, and the electric charges stored in the photodiodes 201a and 201b are transferred to the power supply 208 via the transfer switches 202a and 202b and the reset switch 205, and the photodiodes 201a and 201b are reset.

At time td1, the control signals txa_12k to txa_12k+10 and txb_12k to txb_12k+10 are set to L, and accumulation of the photo-charge on the photodiodes 201a and 201b starts. At time td3, which is after the accumulation of the photo-charge for a predetermined time, the control signals sel0_12k to sel0_12k+10 of the selection switch 206 become H. and the source of the amplification unit 204 is connected to the column output lines 300a to 300f.

At time td4, the reset of the floating diffusion region 203 is released by setting the control signals res_12k to res_12k+ 10 of the reset switch 205 to L. At this time, the potential (N signal) of the reset signal level corresponding to the potential of the floating diffusion region 203 is read out to the column output lines 300a to 300f via the amplification unit 204, and is input to the A/D converters 301a to 301f.

Next, at time td5, the power saving control signals of the A/D converters 301a to 301f are negated, and the A/D converters 301a to 301f become active. The ramp signal generator 306a starts outputting a ramp signal having a signal level that changes in proportion to the elapsed time. At the same time, the counter 305a starts counting up from the reset state. The comparators in the A/D converters 301a to 301f compare the input signal with the ramp signal output from the ramp signal generator 306a. The output counter value is stored when the signal level of the input ramp signal increases with the elapsed time and exceeds the value of the input signal. This stored counter value serves as the N data (A/D conversion of N signal).

At time td6, when the A/D conversion of the N signal is completed, the N data of each column are transferred to the memory 308a, and the transfer is completed at time td7. At this time, the N data of the A/D converters 301a to 301f are respectively stored in memories N_0 340a to N_5 340f. At times td8 to td9, the control signals txa_12k to txa_12k+0 again become H and the control signals txb_12k to txb_12k+ 10 also become H. By this operation, the photo-charges of both the photodiodes 201a and 201b are transferred to the floating diffusion region 203 and added together.

The voltage corresponding to the change is input to the A/D converters 301a to 301f via the amplification unit 204 and the column output lines 300a to 300f. Next, at time td10, the power saving control signals of the A/D converters 301c to 301f are negated, and the A/D converters 301c to 301f become active. The ramp signal generator 306a starts outputting the ramp signal. At the same time, the counter 305a starts counting up from the reset state.

The comparators in the A/D converters 301a to 301f compare the input signal with the ramp signal output from the ramp signal generator 306a. The output counter value is stored when the signal level of the input ramp signal increases with the elapsed time and exceeds the value of the input signal. This stored counter value serves as the A+B image data (A/D conversion of the A+B image signal).

When the A/D conversion of the A+B image signal is completed at time td11, the A+B image data of each column are transferred to the memory 308a, and the transfer is completed at time td14. At this time, the A+B image data of each column of the A/D converters 301a to 301f are each stored in the memories AB_0 342a to AB_5 342f.

Additionally, at time td11, the power saving control signals of the A/D converters 301a to 301f are simultaneously asserted, and the A/D converters 301a to 301f enter a power saving state. Subsequently, at time td12, the control signals res_12k to res_12k+10 become H, and at time td13, the control signals se0_12k to sel0_12k+10 become L, and the signal reading from the pixels for 12 rows and the A/D conversion operation are completed.

In the period of time from time td2 to time td 15 shown in FIG. 21 and FIG. 22, the data already stored in the memory 308a (data that have A/D-converted in the previous horizontal period of time to be described below) are output from the memory 308a and output to the outside of the image pickup element 100 via the data output unit 311a. The period of time from the time td2 to the time td15 described above is defined as one horizontal period of time, which is a reading unit.

FIG. 23 and FIG. 24 illustrate timing charts of the operations from the storing of data in the memory 308a after A/D conversion of the data to the output of the data from the data output unit 311a. The timing in FIG. 23 and FIG. 24, in which a time that is the same as FIG. 21 and FIG. 22 is used, indicates that the timing in FIG. 23 and FIG. 24 is the same as that in FIG. 21 and FIG. 22. At time td6, the power saving control signals of the memories N_0 340a to N_5 340f are negated, the memories enter an operating state, and writing of the N data to the memories N_0 340a to N_5 340f starts.

When the writing is completed at time td7, the power saving control signals are asserted and the memories enter a power saving state. In the power saving state, the data in the memories are held. At time td11, the power saving control signals of the memories AB_0 342a to AB_5 342f are negated, the memories enter an operating state, and writing of the A+B image data to the memories AB_0 342a to AB_5 342f starts. When the writing is completed at time td14, the power saving control signals are asserted, and the memories enter a power saving state.

At time td2 of the next horizontal period of time, the power saving control signals of the memories N_0 340a to N_5 340f and the memories AB_0 342a to AB_5 342f are negated, and the memories enter an operating state. For the memories A_0 341a to A_5 341f, the power saving control signals remain asserted, and the memories are maintained in the power saving state.

In this state, as shown in FIG. 24, the A+B image data of 12k, 12k+2, 12k+4, 12k+6, 12k+8, and 12k+10 rows are output from the memory 308a by the memory control unit 343 and the output control unit 332. During this time, the S-N calculation unit 309a and the correction circuit 310a are in an operating state while the power saving control signals are negated. After the process performed by the S-N calculation unit 309a and the correction circuit 310a, the data are output from the data output unit 311a to the outside of the image pickup element 100.

When the output is completed at time td16, all the power saving control signals for the memory 308*a*, the S–N calculation unit 309*a*, and the correction circuit 310*a* are asserted, and each circuit enters a power saving state. The operation from the time td0 to td 15 is repeated by 12 rows each by a predetermined number of the horizontal scanning lines to obtain image signals for one screen.

Figure 25:
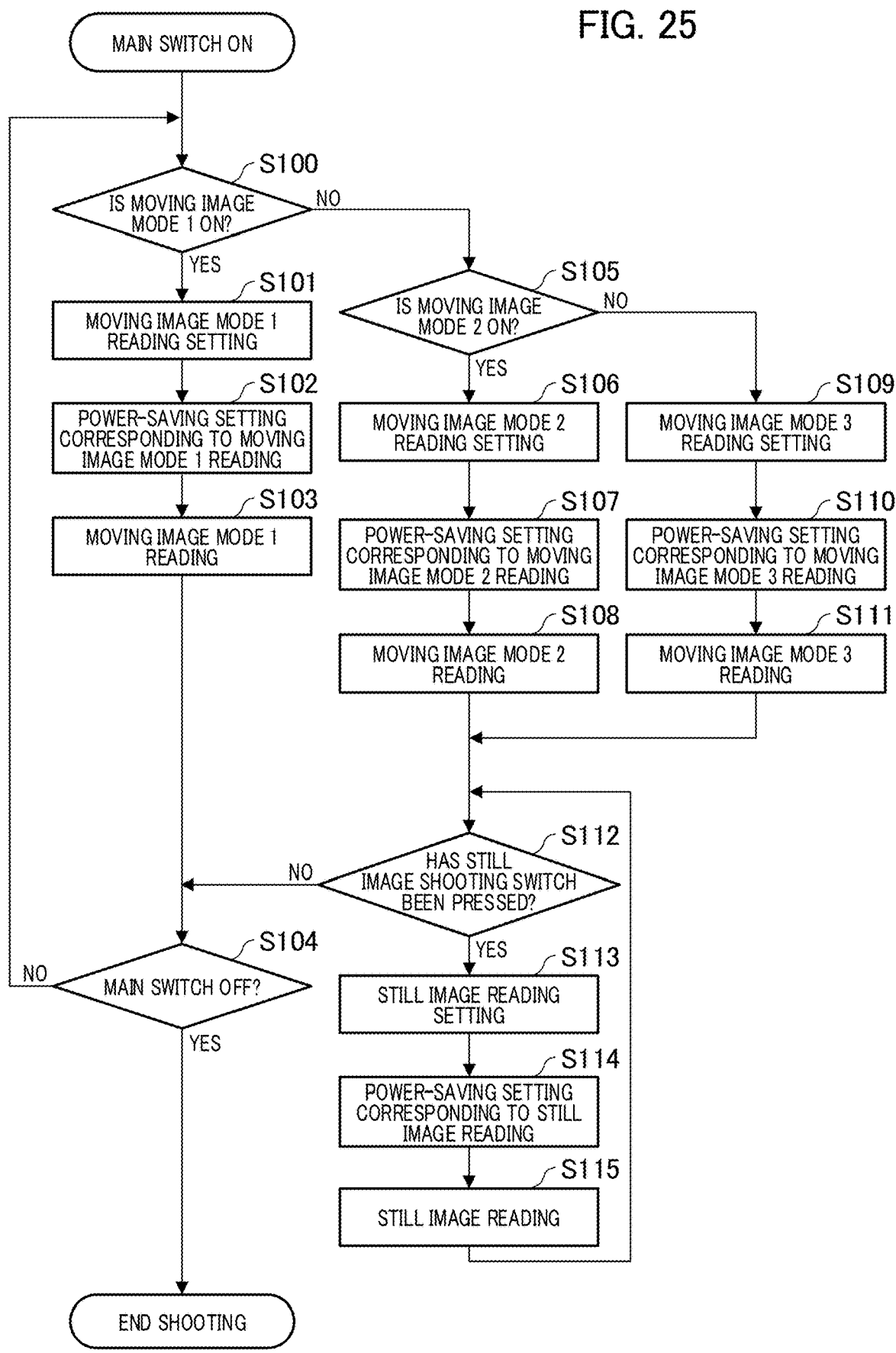
FIG. 25 is a flowchart for explaining the shooting operation of an image pickup apparatus 1000 in Embodiment 1.

Next, the operation of the image pickup apparatus in Embodiment 1 will be described. FIG. 25 is a flowchart that explains the shooting operation of the image pickup apparatus 1000 in Embodiment 1, which is operated by the CPU 102 executing a computer program stored in the ROM 106. When a user presses a main switch of the operation unit 103 shown in FIG. 1, the operation of the image pickup apparatus 1000 starts.

First, in step S100, the CPU 102 determines whether or not the switch included in the operation unit 103 is set in the moving image mode 1. If the moving image mode 1 is ON, the process proceeds to step S10. In step S101, the CPU 102 sets the reading of the moving image mode 1 in the image pickup element 100. Subsequently, the process proceeds to step S102.

In step S102, the CPU 102 performs power saving setting of the moving image mode 1 for the image pickup element 100. Subsequently, the process proceeds to step S103. Next, in step S103, the reading of the moving image mode 1 is performed from the image pickup element 100. The reading operation shown in FIG. 9 to FIG. 12 is performed based on the reading setting and the power saving setting that have been set in steps S101 and S102. The CPU 102 develops the data input to the DSP 101 by a developing circuit (not illustrated), displays the data as a moving image on the display unit 104, and simultaneously records the data on the recording unit 107.

The CPU 102 generates B image data by subtracting the A-image data of the corresponding pixel from the A+B image data at the DSP 101, and performs correlation operation on the phase difference signals between the A-image data and the B-image data to detect focus. Based on the result, the focus of the image pickup apparatus 1000 is adjusted by a mechanism (not illustrated). Subsequently, the process proceeds to step S104. In step S104, the CPU 102 determines whether or not the main switch of the operation unit 103 has been turned off. When the main switch has been turned off, the shooting ends. If the main switch of the operation unit 103 has not been turned off, the process returns to step S100.

Next, a case in which the moving image mode 1 has not been selected in step S100 will be described. If "No" has been selected in step S100, the process proceeds to step S105. In step S105, the CPU 102 determines whether or not the moving image mode 2 has been selected. If the moving image mode 2 is ON, the process proceeds to step S106. In step S106, the CPU 102 sets the reading of the moving image mode 2 to the image pickup element 100. Subsequently, the process proceeds to step S107.

In step S107, the CPU 102 sets power saving of the moving image mode 2 to the image pickup element 100. Subsequently, the process proceeds to step S108. Subsequently, in step S108, the reading of the moving image mode 2 is performed from the image pickup element 100. The reading operation shown in FIG. 13 to FIG. 16 is performed based on the reading setting and the power saving setting set in steps S106 and S107.

The CPU 102 develops the data input to the DSP 101 by a developing circuit (not illustrated), displays the data as a moving image on the display unit 104, and simultaneously records the data on the recording unit 107. The CPU 102 also generates B-image data by subtracting the A-image data of the corresponding pixel from the A+B image data at the DSP 101, and performs a correlation calculation on the phase difference signals between the A-image data and the B-image data to detect focus. Based on the result, the focus of the image pickup apparatus 1000 is adjusted by a mechanism (not illustrated).

Subsequently, the process proceeds to step S112. In step S112, the CPU 102 determines whether or not the still image shooting switch of the operation unit 103 has been pressed. If the still image shooting switch of the operation unit 103 has been pressed, the process proceeds to step S13. If the still image shooting switch of the operation unit 103 has not been pressed, the process proceeds to step S104.

In step S113, the CPU 102 sets the reading of the still image mode in the image pickup element 100. Subsequently, the process proceeds to step S114. In step S114, the CPU 102 sets the power saving of the still image mode in the image pickup element 100. Subsequently, the process proceeds to step S15.

Subsequently, in step S115, the still image is read from the image pickup element 100. In the reading, the reading operation shown in FIG. 21 to FIG. 24 is performed on the reading setting and the power saving setting set in steps S113 and S114. The CPU 102 causes a developing circuit (not illustrated) to develop the data that have been input to the DSP 101, causes the display unit 104 to display the data as a still image, and causes the recording unit 107 to record the image. Subsequently, the process returns to step S112.

If "No" has been selected in step S105, the process proceeds to step S109. In step S109, the CPU 102 sets the reading of the moving image mode 3 in the image pickup element 100. Subsequently, the process proceeds to step S110. In step 110, the CPU 102 sets the power saving of the moving image mode 3 in the image pickup element 100. Subsequently, the process proceeds to step S11.

Subsequently, in step S111, the reading of the moving image mode 3 is performed from the image pickup element 100. In the reading, the reading operation shown in the above FIG. 17 to FIG. 20 is performed based on the reading setting and the power saving setting set in steps S109 and S110. The CPU 102 causes a developing circuit (not illustrated) to develop the data that have been input to the DSP 101, causes the display unit 104 to display the data as a moving image, and simultaneously causes the recording unit 107 to record the data.

The CPU 102 also generates B-image data by subtracting the A-image data of the corresponding pixel from the A+B image data at the DSP 101, and performs correlation calculation on the phase difference signals between the A-image data and the B-image data to detect focus. Based on the result, the focus of the image pickup apparatus 1000 is adjusted by a mechanism (not illustrated). Subsequently, the process proceeds to step S112.

By the above operation, the image pickup apparatus of Embodiment 1 can reduce and adjust an amount of data of the A-image data used for the image plane phase difference AF read out from the image pickup element to adjust data rates of the image pickup element and a circuit that receives the data. At that time, the column circuit and the memory that are not used can be power-saved in accordance with the reduction of the amount of the A-image data, thereby reducing power consumption.

Additionally, a ratio of reduction of the A-image data can be changed by changing the shooting mode, and even when a row not reading the A-image data is changed at that time, the column circuit and the memory to be power-saved can be changed to reduce power consumption for each shooting mode. In Embodiment 1, although the column circuit to be power-saved is an A/D converter, the present invention is not limited thereto. The column circuit includes a circuit that can reduce a power during non-operation (during power saving), such as a current source, an amplifier, and a buffer, connected to the column output line.

Embodiment 2

An image pickup apparatus according to Embodiment 2 of the present invention will be described below. The configuration of the image pickup apparatus of Embodiment 2 is the same as that of the image pickup apparatus of Embodiment 1. A power saving control mode of the moving image mode 2 is different from that of the moving image mode 2 of Embodiment 1.

Figure 26:
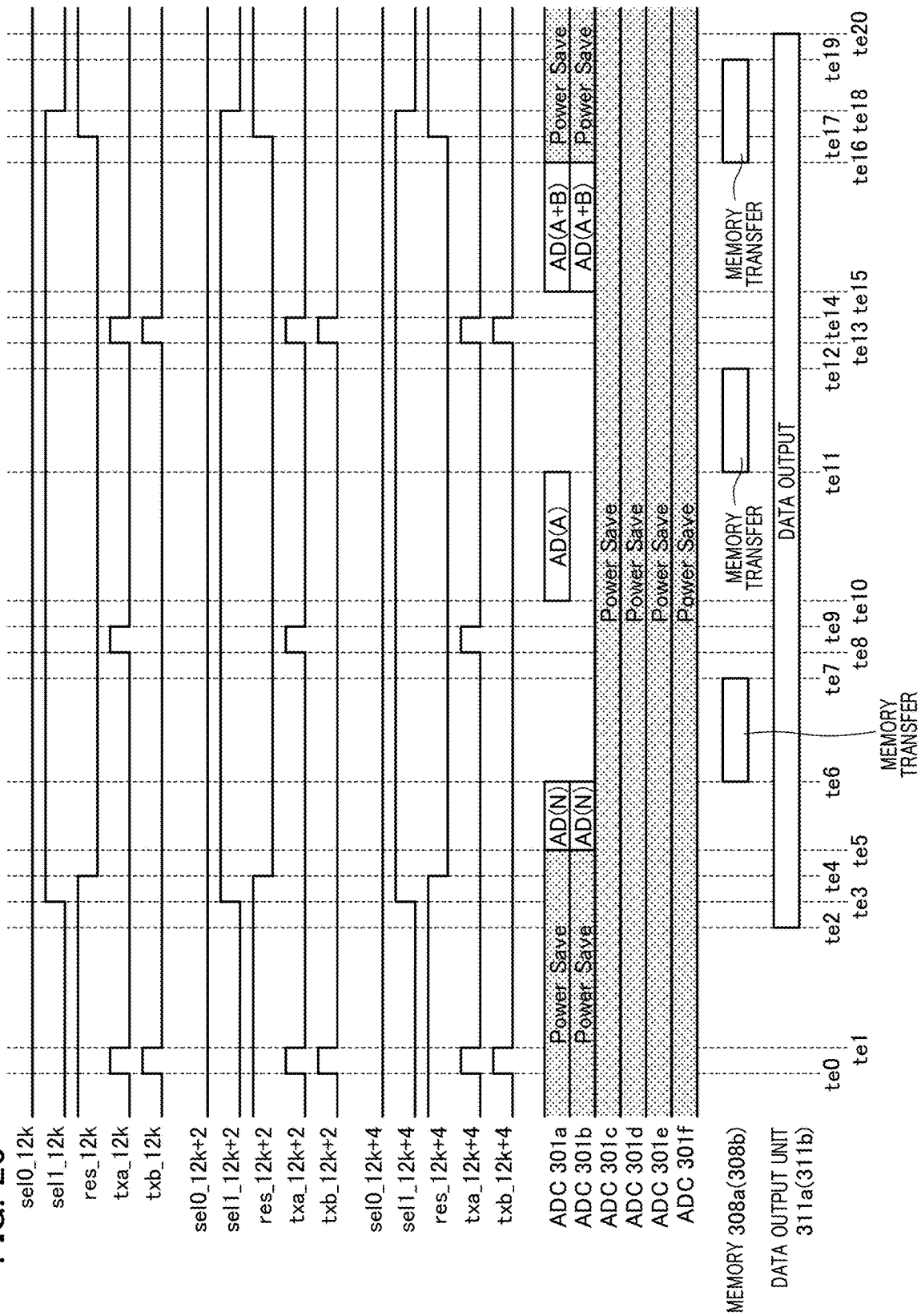
FIG. 26 illustrates the upper half of the timing chart illustrating the reading operation of the image pickup element in the moving image mode 2 of Embodiment 2.
Figure 27:
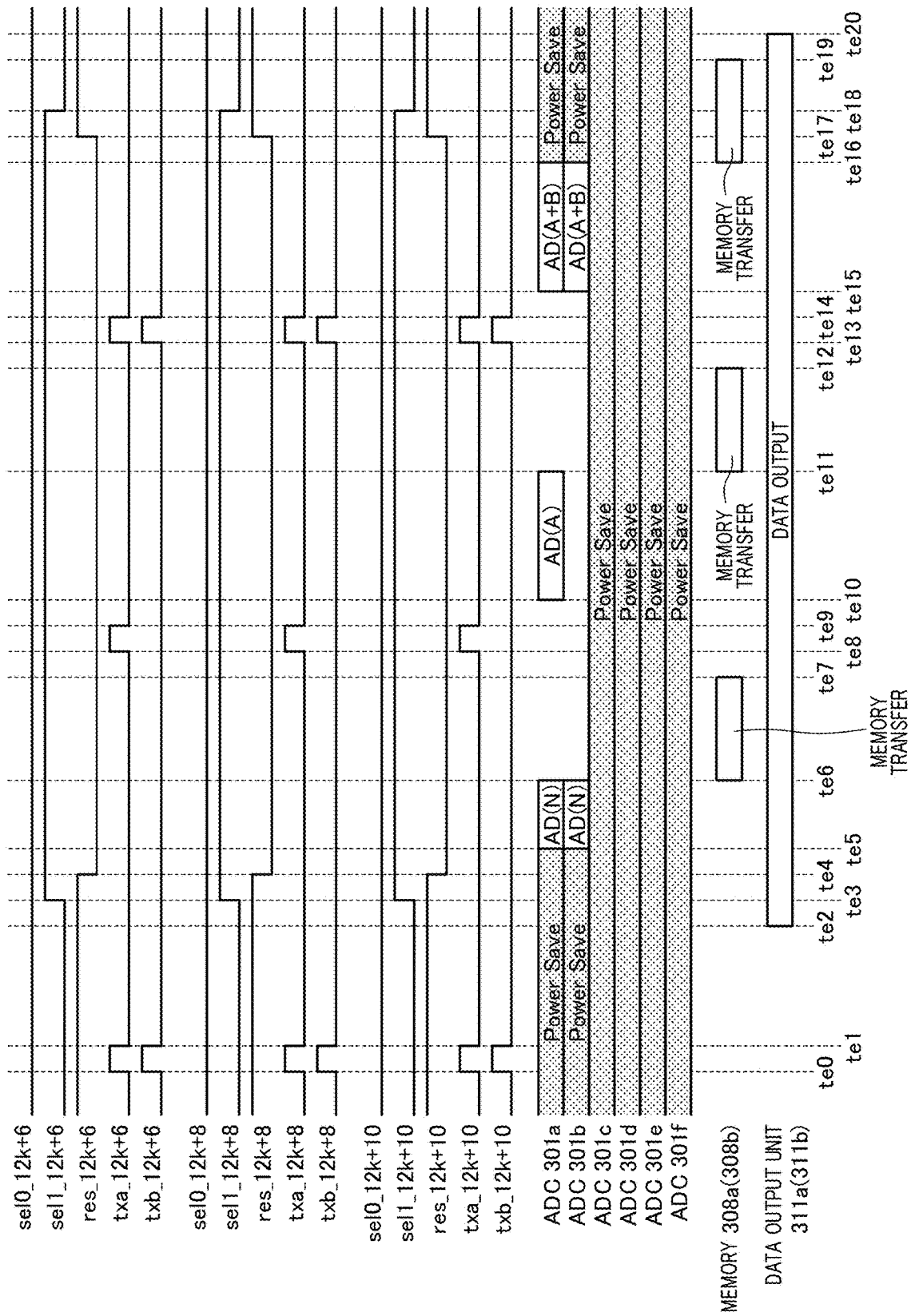
FIG. 27 illustrates the lower half of the timing chart illustrating the reading operation of the image pickup element in the moving image mode 2 of Embodiment 2.

FIG. 26 and FIG. 27 illustrate a timing chart of the reading operation of the moving image mode 2 in Embodiment 2. FIG. 26 illustrates the upper half of the timing chart illustrating the reading operation of the image pickup element in the moving image mode 2 of Embodiment 2 and FIG. 27 illustrates the lower half of the timing chart illustrating the reading operation of the image pickup element in the moving image mode 2 of Embodiment 2.

Hereinafter, the reading operation for 12 lines (one horizontal scanning line) of the image signals will be described below with reference to FIG. 26 and FIG. 27. In FIG. 26 and FIG. 27, the reading operation of the R pixel will be described as an example. The same operation is applied to the other colors and the description thereof will be omitted.

At time te0, the control signals txa_12k to txa_12k+10 and txb_12k to txb_12k+10 become H, and the transfer switches 202a and 202b are turned on. At this time, the signals res_12k to res_12k+10 become H, and the electric charges stored in the photodiodes 201a and 201b are transferred to the power supply 208 via the transfer switches 202a and 202b and the reset switch 205, and the photodiodes 201a and 201b are reset. At time te1, the control signals txa_12k to txa_12k+10 and txb_12k to txb_12k+10 are set to L, and the accumulation of the photo-charges on the photodiodes 201a and 201b starts.

At time te3, which is after the accumulation of the photo-charges for a predetermined time, the control signals sel1_12k to sel1_12k+10 of the selection switch 206 become H. and the source of the amplification unit 204 is connected to the column output lines 300a to 300b. At time te4, the reset of the floating diffusion region 203 is released by setting the control signals res_12k to res_12k+10 of the reset switch 205 to L.

At this time, the potential of the reset signal level corresponding to the potential of the floating diffusion region 203 is read out to the column output lines 300a to 300b via the amplification unit 204, and is input to the A/D converters 301a to 301b. Next, at time te5, the power saving control signals of the A/D converters 301a to 301b are negated, and the A/D converters 301a to 301b become active.

The ramp signal generator 306a starts outputting a ramp signal having a signal level that changes in proportion to the elapsed time. At the same time, the counter 305a starts counting up from the reset state. The comparators in the A/D converters 301a to 301b compare the input signal with the ramp signal output from the ramp signal generator 306a. The output counter value is stored when the signal level of the input ramp signal increases with the elapsed time, and exceeds the value of the input signal. This stored counter value serves as N data (A/D conversion of the N signal).

When the A/D conversion for the N signal is completed at the time te6, the N data of each column are transferred to the memory 308a, and the transfer is completed at time te7. At this time, the N data of each column of the A/D converters 301a to 301b are respectively stored in the memories N_0 340a to N_1 340b. At time te8, the control signals txa_12k to txa_12k+10 become H, and the photo-charges of the photodiode 201a are independently transferred to the floating diffusion region 203.

Subsequently, at time te9, the control signals txa_12k to txa_12k+10 become L. By this operation, the electric charges stored in the photodiode 201a are transferred to the floating diffusion region 203. The voltage corresponding to the change is input to the A/D converters 301a to 301b via the amplification unit 204 and the column output lines 300a to 300b.

Next, at time te10, the ramp signal generator 306a starts outputting the ramp signal. At the same time, the counter 305a starts counting up from the reset state. The comparator in the A/D converter 301a compares the input signal with the ramp signal output from the ramp signal generator 306a. The output counter value is stored when the signal level of the input ramp signal increases with the elapsed time and exceeds the value of the input signal. This stored counter value serves as the A-image data (A/D conversion of the A-image signal).

At time te11, when the A/D conversion of the A-image signal is completed, the A-image data of each column are transferred to the memory 308a, and the transfer is completed at time te12. At this time, the A-image data of each column of the A/D converter 301a are respectively stored in the memory A_0 341a. Since the A/D converters 301c to 301f are in the power saving state, no valid data is output, and no data is stored in the memory 308a.

Additionally, since the A/D converter 301b is not operating, no valid data is output, and no data is stored in the memory 308a. However, the A/D converter 301b is not in the power saving state. This is to prevent the delay of the rise that occurs when the A/D converter 301b is activated from the power saving state at time te15.

At times te13 to te14, the control signals txa_12k to txa_12k+10 again become H and the control signals txb_12k to txb_12k+10 also become H. By this operation, the photo-charges of both the photodiodes 201a and 201b are transferred to the floating diffusion region 203 and added together. The voltage corresponding to the change is input to the A/D converters 301a to 301b via the amplification unit 204 and the column output lines 300a to 300b.

Next, at time te15, the power saving control signals of the A/D converter 301b are negated and the A/D converter 301b becomes active. The ramp signal generator 306a starts outputting the ramp signal. At the same time, the counter 305a starts counting up from the reset state. The comparators in the A/D converters 301a to 301b compare the input signal with the ramp signal output from the ramp signal generator 306a. The output counter value is stored when the signal level of the input ramp signal increases with the elapsed time and exceeds the value of the input signal. The stored counter value serves as the A+B image data (A/D conversion of the A+B image signal).

When the A/D conversion of the A+B image signal is completed at time te16, the A+B image data of each column are transferred to the memory 308a, and the process ends at time te19. At this time, the A+B image data of each column of the A/D converters 301a to 301b are respectively stored in the memories AB_0 342a to AB_1 342b.

At the time te16, the power saving control signals of the A/D converters 301a to 301b are simultaneously asserted, and the A/D converters 301a to 301b enter a power saving state. Subsequently, at time te17, the control signals res_12k to res_12k+10 become H, and at time te18, the control signals sel0_12k to sel0_12k+10 become L, and the signal reading from the pixels for 12 rows (one horizontal scanning line) and the A/D conversion operation are completed.

In the period of time from the time te2 to the time te20 shown in FIG. 26, data already stored in the memory 308a (the data that have been AD-converted in the previous horizontal period of time, which will be described below) are output from the memory 308a and are output to the outside of the image pickup element 100 via the data output unit 311a. The period of time from the time te2 to the time te20 described above is defined as one horizontal period of time, which is a reading unit.

In Embodiment 2, the operation from the storing of data in the memory 308a after A/D conversion of the data to the output of the data from the data output unit 311a is the same as the operation shown in FIG. 15 and FIG. 16 of Embodiment 1, and thus the description thereof will be omitted. In the reading of the moving image mode 2 of Embodiment 2, the A/D converter 301b is not power-saved at the time te10 to the time te11 during which the A-image signal is AD-converted. In contrast, digital circuits such as the memory, the S-N calculation circuit, and a correction circuit are power-saved in an operation related to the A-image data when the A-image data are not output.

By such an operation, power can be saved for a circuit that takes a short time to start from power saving while power cannot be saved for a circuit that takes a long time to start from power saving. Additionally, in a circuit related to the A-image data that is not to be read out, the power saving can be turned on or turned off for each circuit. In this manner, it may be possible to switch the circuits to be power-saved for each mode in accordance with differences such as a reading time.

Embodiment 3

Hereinafter, an image pickup apparatus according to Embodiment 3 of the present invention will be described below. The configuration of the image pickup apparatus of Embodiment 3 is the same as that of the image pickup apparatus of Embodiment 1. The image pickup apparatus of Embodiment 3 includes a moving image mode 4 and a moving image mode 5. Since the operation of the moving image mode 5 is the same as that of the moving image mode 1 in Embodiment 1, the description thereof will be omitted.

In the moving image mode 4, one of two types of reading operations is switched every one horizontal period of time. One of the readout operations reads the A-image data, and the other one does not read the A-image data. The operation during the horizontal period of time in which the A-image data are read is the same as the reading in the moving image mode 1 of Embodiment 1 shown in FIG. 9 to FIG. 12, and the description thereof will be omitted.

FIG. 28 to FIG. 31 illustrate a timing chart of the operation of the moving image mode 4 during a horizontal period of time during which the A-image data are not read. Hereinafter, the reading operation for 12 lines of the image signals (one horizontal scanning line) will be described below with reference to FIG. 28 to FIG. 31. It is assumed that each switch is turned on when each control signal is H, and that each switch is turned off when each control signal is L. In FIG. 28 to FIG. 31, the reading operation of the R pixel will be described as an example. The same operation is applied to the other colors, and description thereof will be omitted.

At time tf0, the control signals txa_12k to txa_12k+10 and txb_12k to txb_12k+10 become H, and the transfer switches 202a and 202b are turned on. At this time, the signals res_12k to res_12k+10 become H, and the electric charges stored in the photodiodes 201a and 201b are transferred to the power supply 208 via the transfer switches 202a and 202b and the reset switch 205, and the photodiodes 201a and 201b are reset. At time tf1, the control signals txa_12k to txa_12k+10 and txb_12k to txb_12k+10 become L, and the accumulation of the photo-charges on the photodiodes 201a and 201b starts.

At time tf3, which is after the accumulation of the photo-charges has been performed for a predetermined time, the control signals sel0_12k to sel0_12k+10 of the selection switch 206 become H, and the source of the amplification unit 204 is connected to the column output lines 300a to 300f. At time tf4, the reset of the floating diffusion region 203 is released by setting the control signals res_12k to res_12k+10 of the reset switch 205 to L. At this time, the potential of the reset signal level corresponding to the potential of the floating diffusion region 203 is read out to the column output lines 300a to 300f via the amplification unit 204, and is input to the A/D converters 301a to 301f.

Next, at time tf5, the power saving control signals of the A/D converters 301a to 301f are negated, and the A/D converters 301a to 301f become active. The ramp signal generator 306a starts outputting a ramp signal having a signal level that changes in proportion to the elapsed time. At the same time, the counter 305a starts counting up from the reset state. The comparators in the A/D converters 301a to 301f compare the input signal with the ramp signal output from the ramp signal generator 306a. The output counter value is stored when the signal level of the input ramp signal increases with the elapsed time and exceeds the value of the input signal. This stored counter value serves as N data (A/D conversion of the N signal).

At time tf6, when the A/D conversion of the N signal is completed, the N data of each column are transferred to the memory 308a and the transfer is completed at time tf7. At this time, the N data of each column of the A/D converters 301a to 301f are each stored in the memories N_0 340a to N_5 340f. At the time tf6, the power saving control signals of the A/D converters 301a to 301f are simultaneously asserted and the A/D converters 301a to 301f enter a power saving state.

At time tf8, the control signals txa_12k to txa_12k+10 again become H, and the control signals txb_12k to txb_12k+10 also become H. Subsequently, at time tf9, the control signals txa_12k to txa_12k+10 and txb_12k to txb_12k+10 become L. By this operation, the photo-charges of both the photodiodes 201a and 201b are transferred to the floating diffusion region 203. The voltage corresponding to the change is input to the A/D converters 301a to 301f via the amplification unit 204 and the column output lines 300a to 300f.

Next, at time tf10, the power saving control signals of the A/D converters 301a to 301f are negated and the A/D converters 301a to 301f become active. The ramp signal generator 306a starts outputting a ramp signal. At the same time, the counter 305a starts counting up from the reset state.

The comparators in the A/D converters 301a to 301f compare the input signal with the ramp signal output from the ramp signal generator 306a.

The output counter value is stored when the signal level of the input ramp signal increases with the elapsed time and exceeds the value of the input signal. This stored counter value becomes A+B image data (A/D conversion of the A+B image signal). At time tf11, when the A/D conversion of the A+B image signal is completed, the A+B image data of each column are transferred to the memory 308a, and the transfer is completed at time tf14. At this time, the A+B image data of each column of the A/D converters 301a to 301f are respectively stored in the memories AB_0 342a to AB_5 342f.

At the time tf11, the power saving control signals of the A/D converters 301a to 301f are simultaneously asserted and the A/D converters 301a to 301f enter a power saving state. Subsequently, at time tf12, the control signals res_12k to res_12k+10 become H, at time tf13, the control signals se0_12k to sel0_12k+10 become L, and the signal reading from the pixels for 12 rows (one horizontal scanning line) and the A/D conversion operation are completed.

Figure 28:
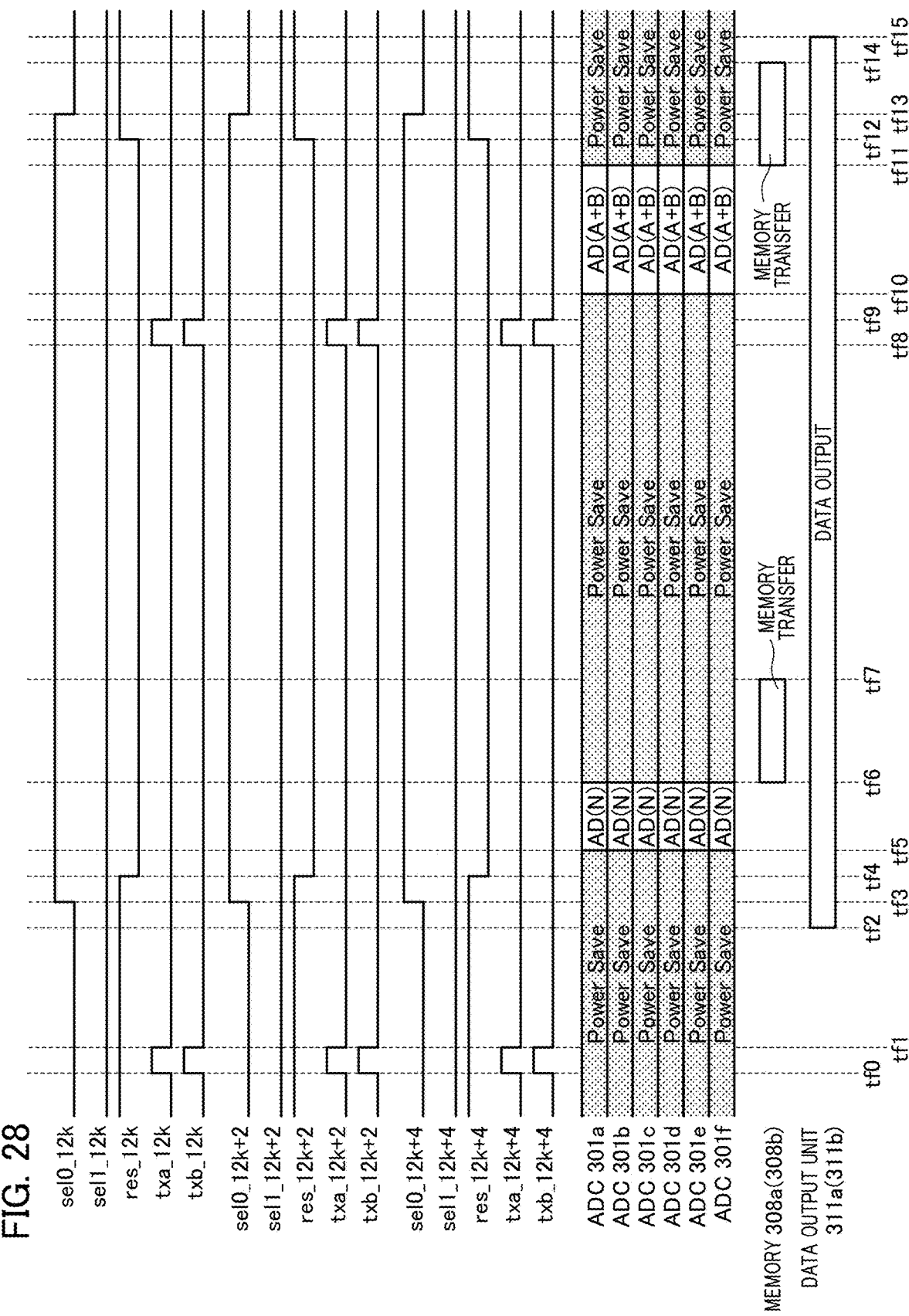
FIG. 28 illustrates the upper half of the timing chart illustrating the reading operation of the image pickup element in the moving image mode 4 of Embodiment 3.
Figure 29:
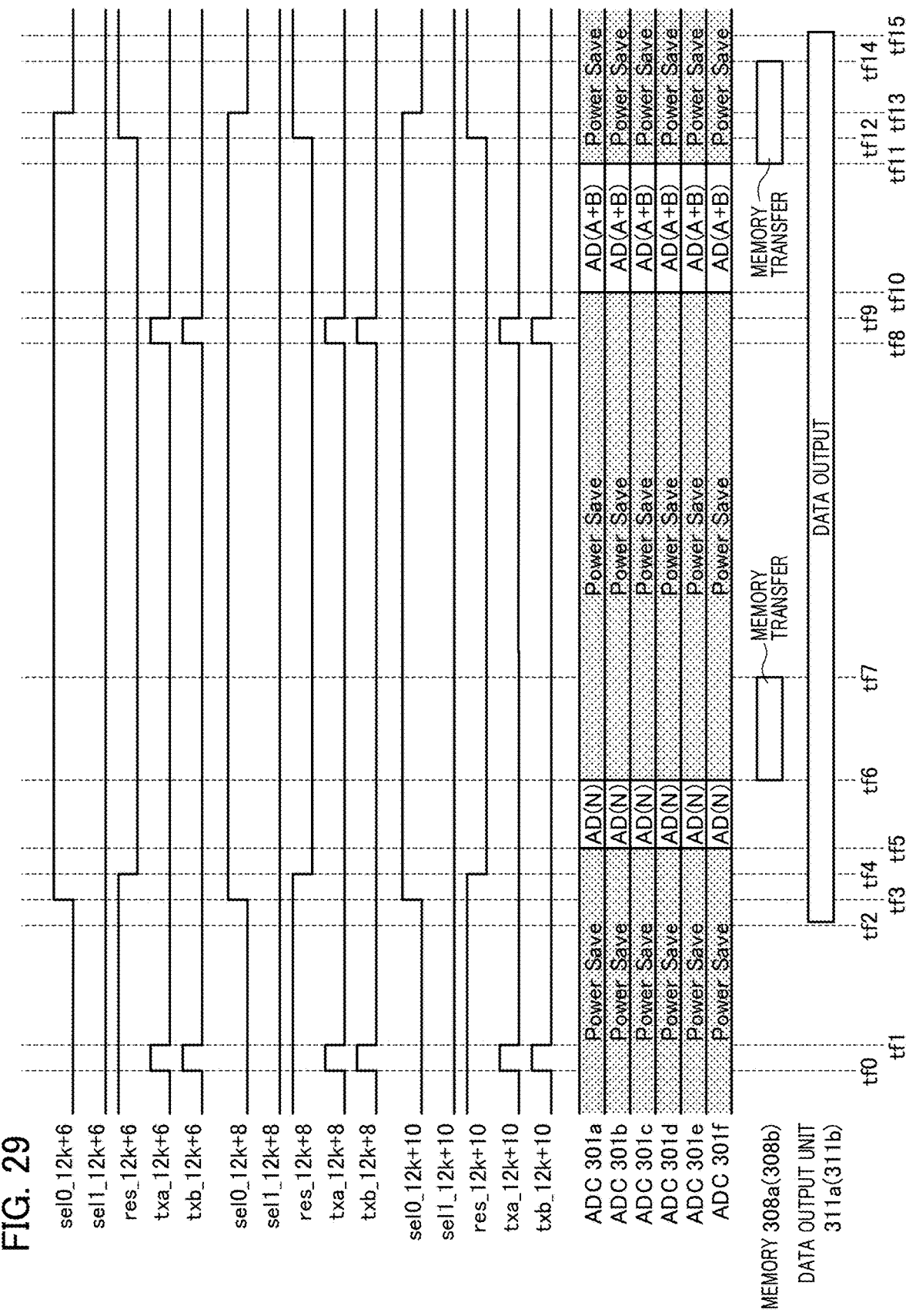
FIG. 29 illustrates the lower half of the timing chart illustrating the reading operation of the image pickup element in the moving image mode 4 of Embodiment 3.
Figure 30:
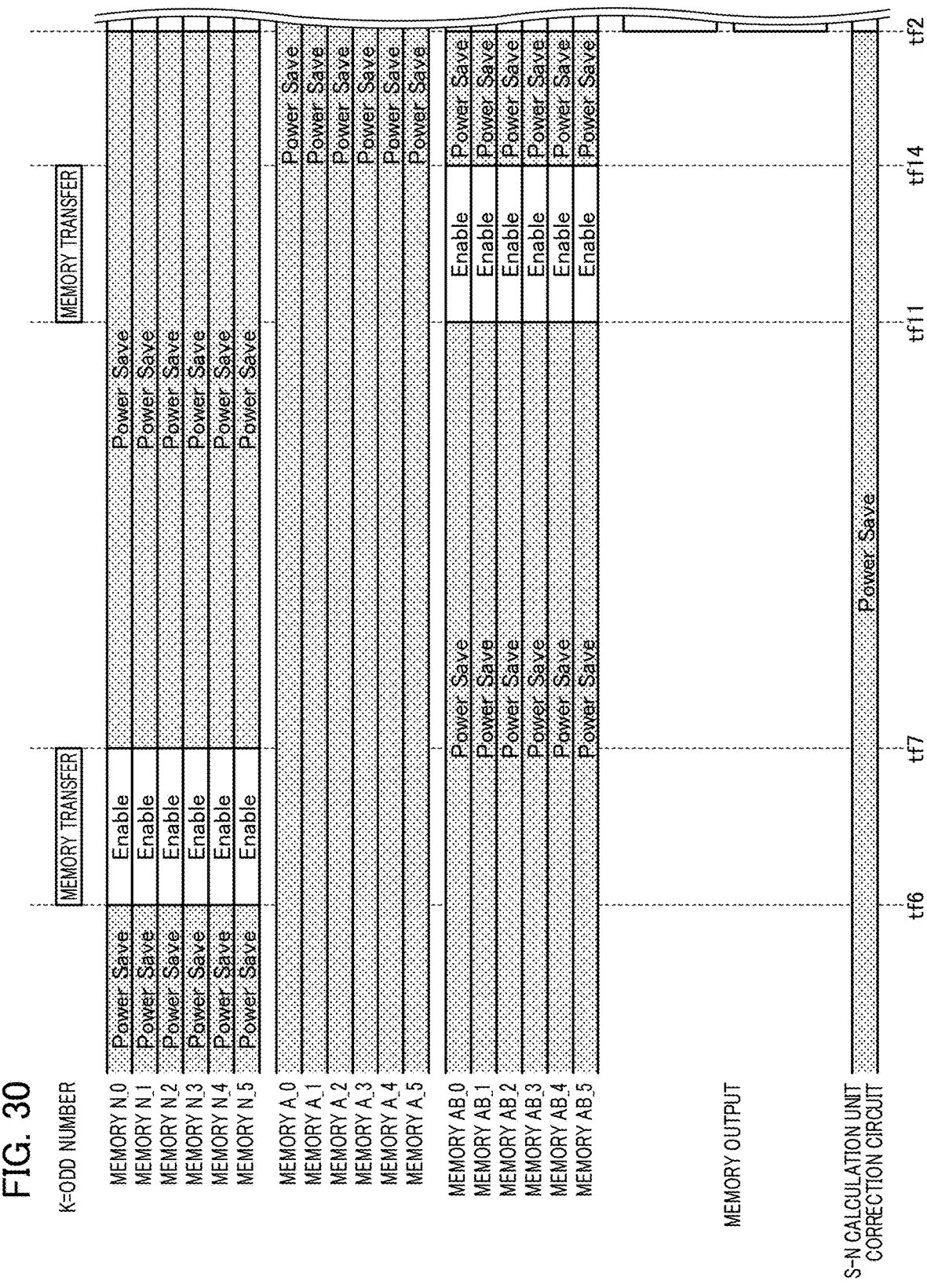
FIG. 30 illustrates the left side portion of the timing chart illustrating the writing and reading operations to and from the memory in the moving image mode 4 of Embodiment 3.
Figure 31:
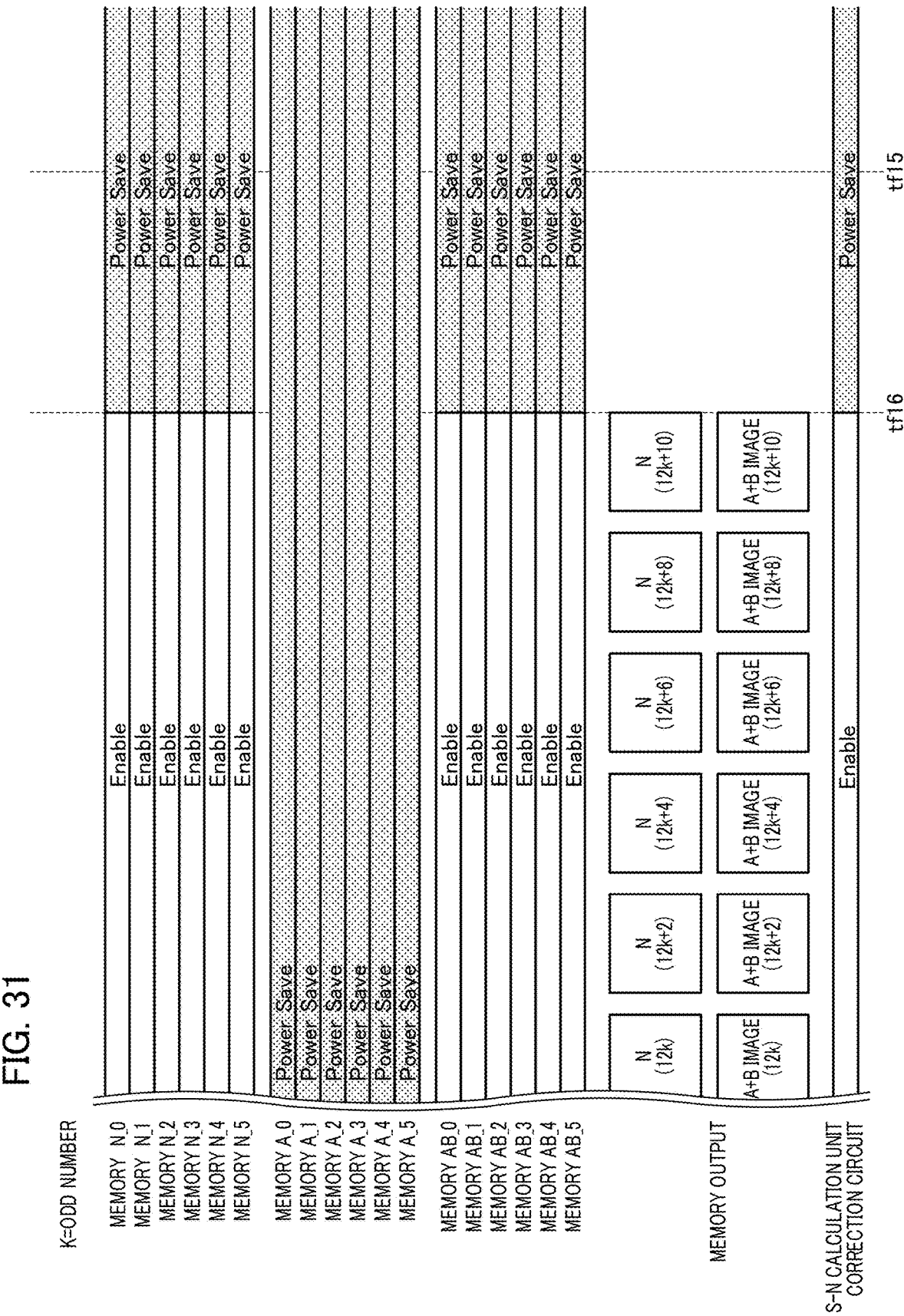
FIG. 31 illustrates the right side portion of the timing chart illustrating the writing and reading operations to and from the memory in the moving image mode 4 of Embodiment 3.

In the period of time from time tf2 to time tf15 shown in FIG. 28 and FIG. 29, the data already stored in the memory 308a (data that have been AD-converted in the previous horizontal period of time, which will be described below) are output from the memory 308a, and then output to the outside of the image pickup element 100 via the data output unit 311a. The period of time from the above times tf2 to tf15 is defined as one horizontal period of time, which is a reading unit. FIG. 30 and FIG. 31 illustrate a timing chart of the operation from the storing of data in the memory 308a after A/D conversion of the data to the output of the data from the data output unit 311a. The timing in FIG. 30 and FIG. 31, in which a time that is the same FIG. 28 and FIG. 29 is used, indicates that the timing in FIG. 30 and FIG. 31 is the same as that in FIG. 28 and FIG. 29.

At the time tf6, the power saving control signals of the memories N_0 340a to N_5 340f are negated, the memories enter an operating state, and writing of the N data to the memories N_0 340a to N_5 340f starts. When the writing is completed at the time tf7, the power saving control signals are asserted, and the memories enter a power saving state. In the power saving state, the data in the memory are held.

At the time tf11, the power saving control signals of the memories AB_0 342a to AB_5 342f are negated, the memories enter an operating state, and writing of the A+B image data to the memories AB_0 342a to AB_5 342f starts. When the writing is completed at the time tf14, the power saving control signals are asserted, and the memories enter a power saving state.

At the time tf2 of the next horizontal period of time, the power saving control signals of the memories N_0 340a to N_5 340f and the memories AB_0 342a to AB_5 342f are negated, and the memories enter an operating state. For the memories A_0 341a to A_5 341f, the power saving control signals remain asserted, and the memories are maintained in the power saving state.

In this state, as shown in FIG. 30 and FIG. 31, the A+B image data of 12k, 12k+2, 12k+4, 12k+6, 12k+8, and 12k+10 rows are output from the memory 308a by the memory control unit 343 and the output control unit 332. During this time, the S–N calculation unit 309a and the correction circuit 310a are in an operating state while the power saving control signals are negated. After the process performed by the S–N calculation unit 309a and the correction circuit 310a, the data are output from the data output unit 311a to the outside of the image pickup element 100.

When the output of data is completed at the time tf15, all the power saving control signals of the memory 308a, the S–N calculation unit 309a, and the correction circuit 310a are asserted, and each circuit enters a power-save state. The operation of the moving image mode 4 shown at the times tf1 to tf15 is performed alternately with the operation of the moving image mode 5 (the same as the moving image mode 1 of Embodiment 1) for each horizontal period by a predetermined number of horizontal scanning lines, and thereby an image signal for one screen is obtained.

Figure 32:
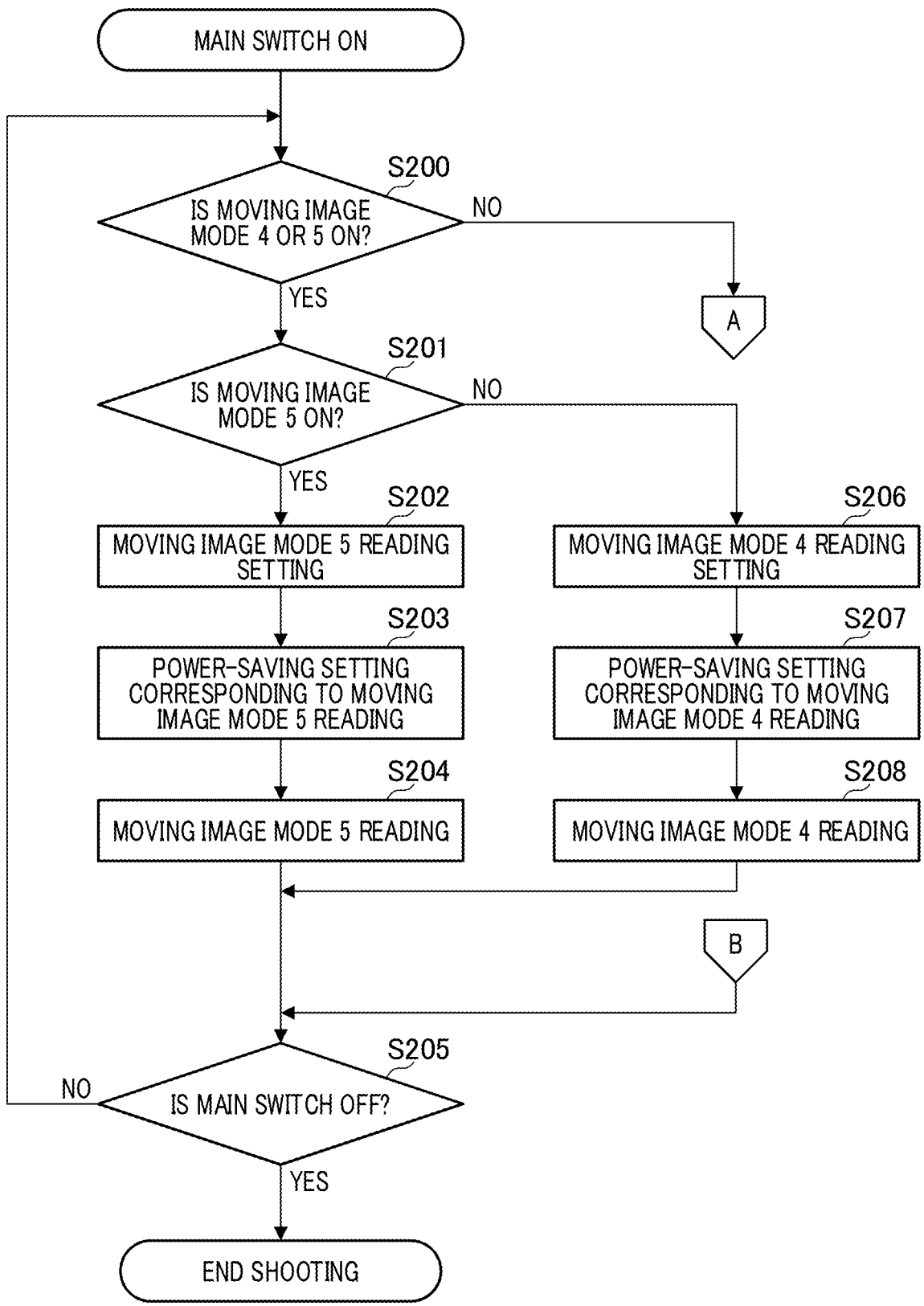
FIG. 32 is a flowchart for explaining the shooting operation of an image pickup apparatus 1000 in Embodiment 3.
Figure 33:
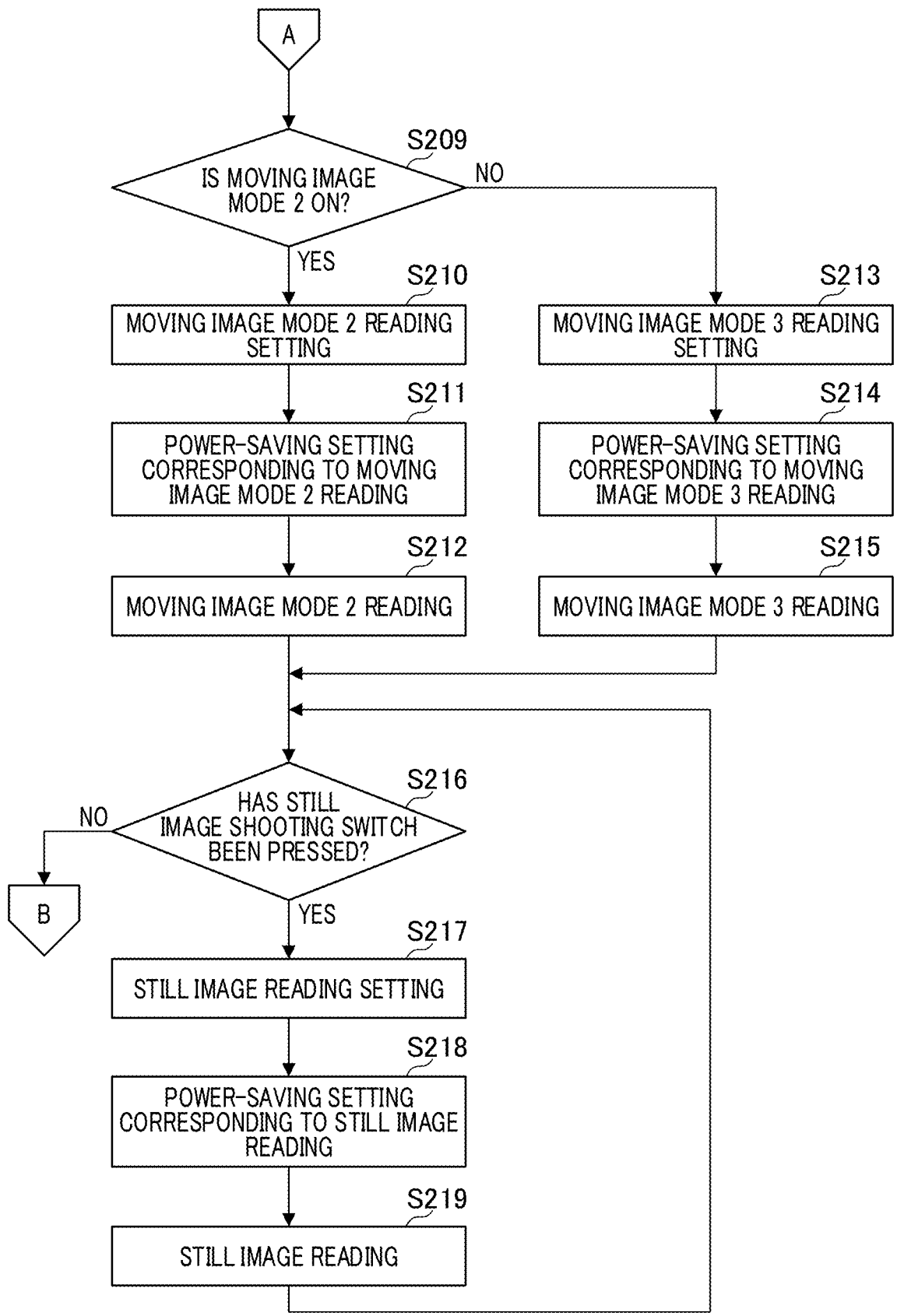
FIG. 33 is a flowchart for explaining another part of the shooting operation of the image pickup apparatus 1000 in Embodiment 3.

Next, the operation of the image pickup apparatus in Embodiment 3 will be described with reference to FIG. 32 and FIG. 33. FIG. 32 and FIG. 33 are flowcharts for explaining the shooting operation of the image pickup apparatus 1000 in Embodiment 3. When the user presses the main switch of the operation unit 103 shown in FIG. 1, the operation of the image pickup apparatus starts.

First, in step S200, the CPU 102 determines whether or not the switch included in the operation unit 103 is set in the moving image mode 4 or 5. If the moving image mode 4 or 5 is ON, the process proceeds to step S201. In step S201, the CPU 102 determines whether or not the switch included in the operation unit 103 is set to ON of moving image mode 5. If the moving image mode 5 is ON, the process proceeds to step S202.

In step S202, the CPU 102 sets the reading of the moving image mode 5 in the image pickup element 100. Subsequently, the process proceeds to step S203. In step S203, the CPU 102 sets the power saving of the moving image mode 5 in the image pickup element 100. Subsequently, the process proceeds to step S204.

Subsequently, in step S204, the reading of the moving image mode 5 is performed from the image pickup element 100. The reading operation is the same as that in the moving image mode 1 shown in FIG. 9 to FIG. 12 described above, based on the reading settings and the power saving settings set in steps S202 and S203. The CPU 102 develops the data input to the DSP 101 by a developing circuit (not illustrated), displays the data as a moving image on the display unit 104, and simultaneously records the data on the recording unit 107.

The CPU 102 generates B-image data by subtracting the A-image data of the corresponding pixel from the A+B image data at the DSP 101, and performs a correlation calculation on the phase difference signals between the A-image data and the B-image data to detect focus. Based on the result, the focus of the image pickup apparatus 1000 is adjusted by a mechanism (not illustrated). Subsequently, the process proceeds to step S205.

In step S205, the CPU 102 determines whether or not the main switch of the operation unit 103 has been turned off. When the main switch has been turned OFF, the shooting ends. If not, the process returns to step S200. If the moving image mode 5 is OFF in step S201, the process proceeds to step S206.

In step S206, the CPU 102 sets the reading of the moving image mode 4 in the image pickup element 100. Subsequently, the process proceeds to step S207. In step S207, the CPU 102 sets the power saving of the moving image mode 4 in the image pickup element 100. Subsequently, the process proceeds to step S208.

Subsequently, in step S208, the reading of the moving image mode 4 is performed from the image pickup element 100. The reading operation shown in FIG. 9 to FIG. 12 or FIG. 28 to FIG. 31 described above is performed based on the reading settings and the power saving settings set in steps S206 and S207. The CPU 102 develops the data input to the DSP 101 by a developing circuit (not illustrated), displays the data as a moving image on the display unit 104, and simultaneously records the data on the recording unit 107.

Additionally, the CPU 102 generates the B-image data by subtracting the A-image data of the corresponding pixel from the A+B image data at the DSP 101, and performs correlation calculation on the phase difference signals between the A-image data and the B-image data to detect focus. Based on the result, the focus of the image pickup apparatus 1000 is adjusted by a mechanism (not illustrated). Subsequently, the process proceeds to step S205.

If the moving image mode 4 or 5 is OFF in step S200, the process proceeds to step S209. The operation from step S209 to step S219 is the same as that from step S105 to step S15 described in Embodiment 1, and the description thereof will be omitted. As described above, the image pickup apparatus of Embodiment 3 can reduce power consumption while performing the image plane phase difference AF by alternately providing the horizontal scanning period of time during which the A-image data are read and the horizontal scanning period of time during which the A-image data are not read.

Although Embodiment 3 has a configuration in which the horizontal scanning period of time during which the A-image data are read and the horizontal scanning period of time during which the A-image data are not read are alternately switched, the present invention is not limited thereto. Additionally, if there are a horizontal period of time during which the A-image data are output and a horizontal period of time during which the A-image data are not output as in Embodiment 3, information for distinguishing the both may be written to a header of each horizontal scanning signal (image data). Specifically, it may be possible to provide an addition means that adds the information for distinguishing the case in which the first reading operation (A-image data reading) is performed from the case in which the first reading operation is not performed on the header of the image signal. Accordingly, the A-image data and the A+B image data may be distinguished and processed in the DSP 101.

Embodiment 4

Hereinafter, an image pickup apparatus according to Embodiment 4 of the present invention will be described. The configuration of the image pickup apparatus of Embodiment 4 is the same as that of the image pickup apparatus of Embodiment 3. The image pickup apparatus of Embodiment 4 has a moving image mode 6. Additionally, the configurations between the memories 308a and 308b are different. Although the moving image mode 6 in Embodiment 4 is the same as the moving image mode 1 (moving image mode 5) in terms of driving of pixels, the moving image mode 6 is different from the moving image mode 1 (moving image mode 5) in the driving method of the A/D converter and the memory.

Figure 34:
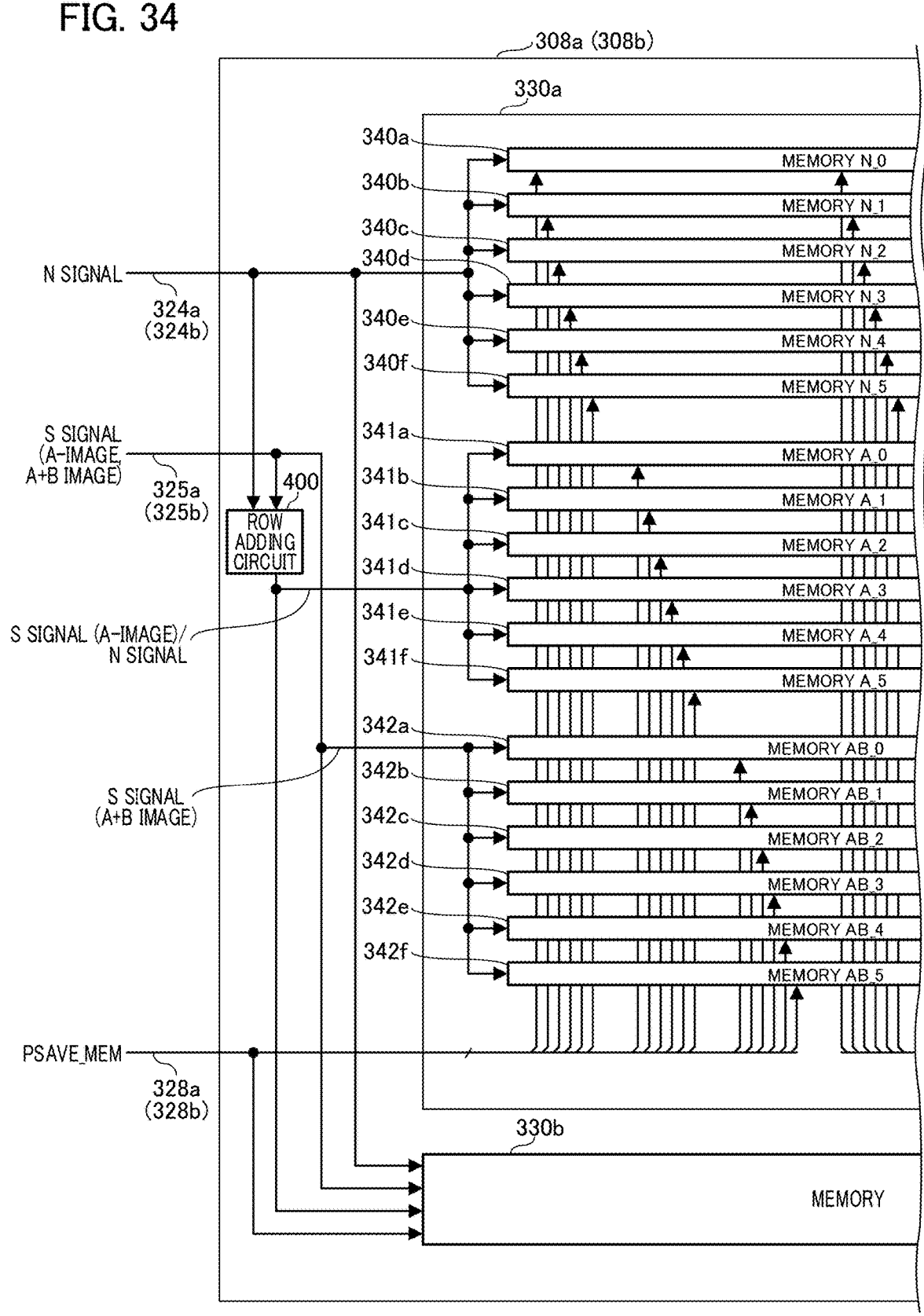
FIG. 34 illustrates the left side portion of a configuration diagram of the memory in the image pickup element of Embodiment 4.
Figure 35:
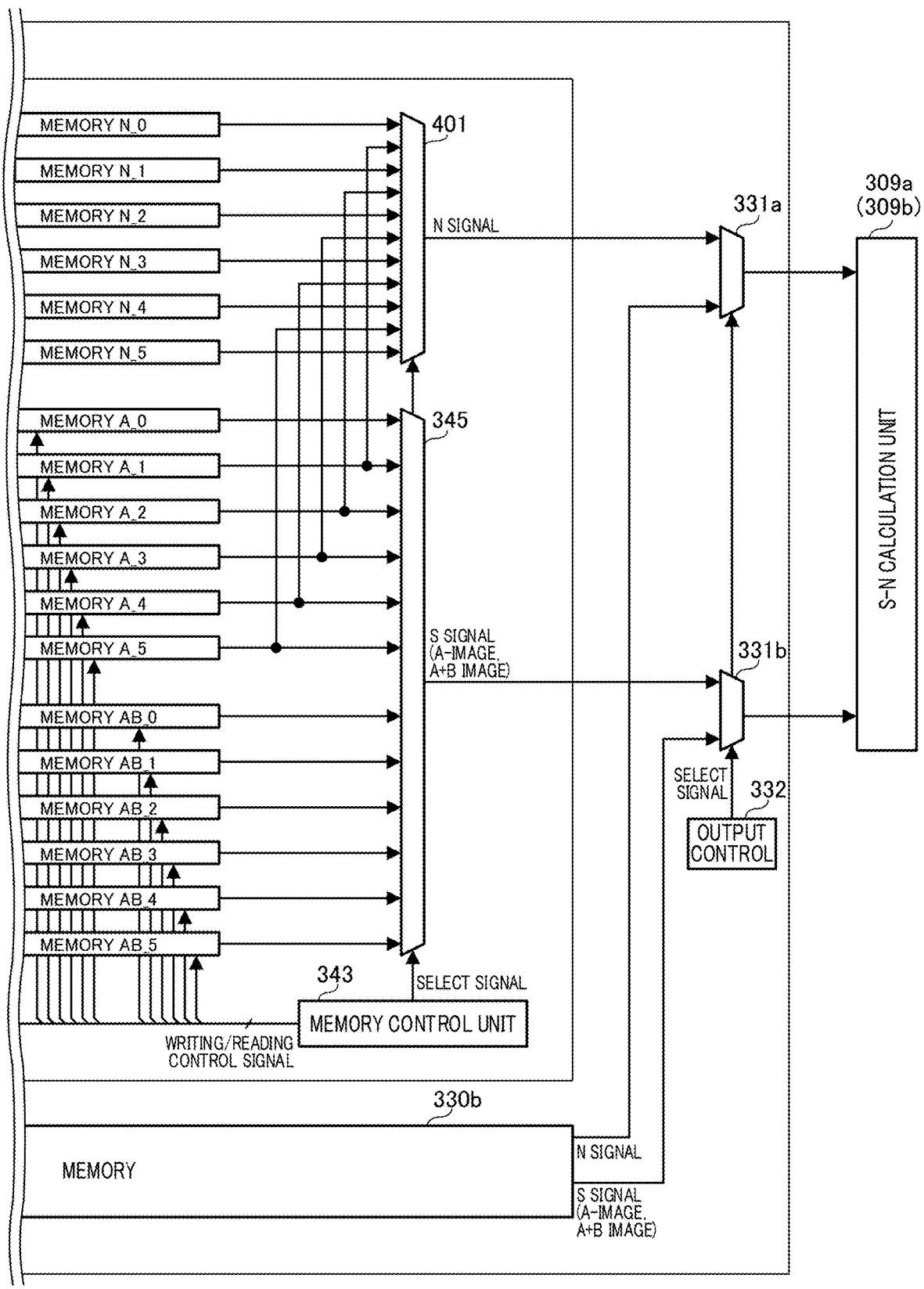
FIG. 35 illustrates the right side portion of the configuration diagram of the memory in the image pickup element of Embodiment 4.

FIG. 34 and FIG. 35 illustrate the configuration of the memories 308a and 308b in Embodiment 4. Components numbered the same as those in FIG. 7 and FIG. 8 are the same as those in Embodiment 1, and their explanation will be omitted. In FIG. 34, reference numeral 400 denotes a row adding circuit. For the AD-converted A-image data, the A-image data of the same column on a plurality of rows specified by the CPU 102 are added and averaged. The row adding circuit 400 functions as adding means that adds the signals for a plurality of rows that have been read to the column output lines during the first reading operation.

Additionally, the N data are also added and averaged in a plurality of rows. The A-image data or the N data added by the row adding circuit 400 are written to the memories A_0 341a to A_5 341f. The selector 401 of FIG. 35 selects and outputs the outputs of the memories A_0 341a to A_5 341f, in addition to the outputs of the memories N_0 340a to 340f.

Figure 36:
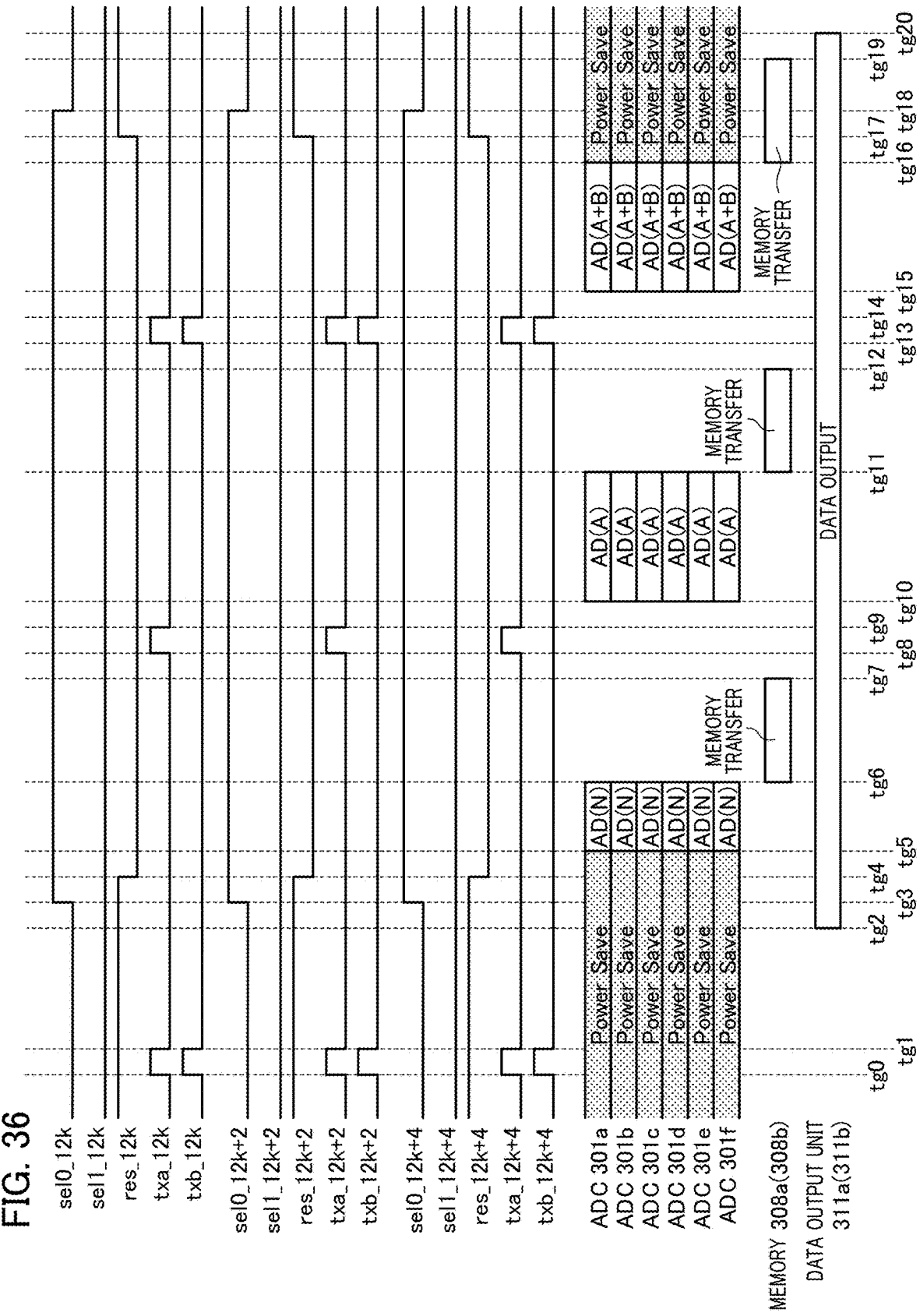
FIG. 36 illustrates the upper half of the timing chart illustrating the reading operation of the image pickup element in a moving image mode 6 of Embodiment 4.
Figure 37:
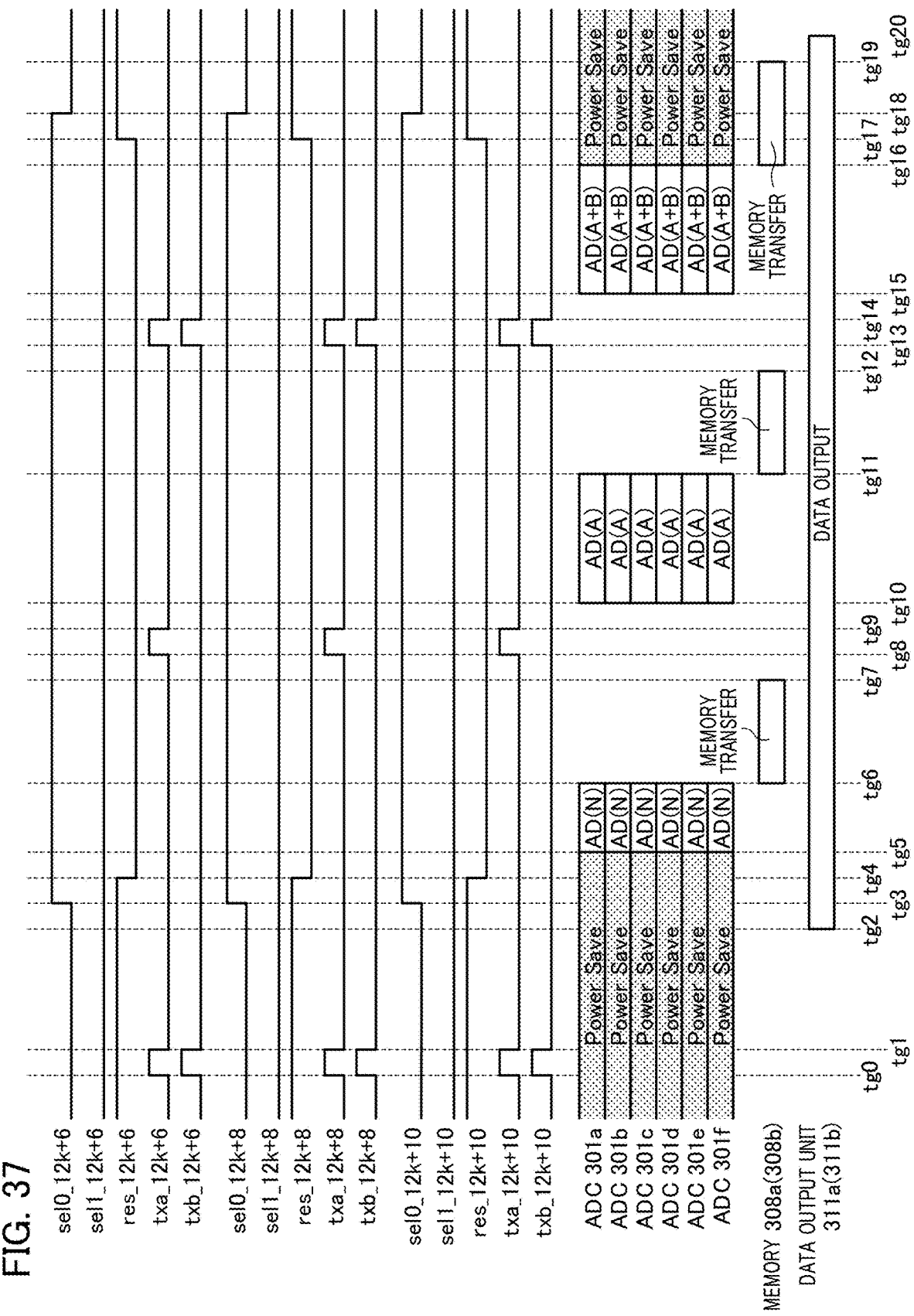
FIG. 37 illustrates the lower half of the timing chart illustrating the reading operation of the image pickup element in the moving image mode 6 of Embodiment 4.

FIG. 36 to FIG. 39 illustrates a timing chart of the operation illustrating the moving image mode 6 in Embodiment 4. FIG. 36 illustrates the upper half of the timing chart illustrating the reading operation of the image pickup element in the moving image mode 6 in Embodiment 4, and FIG. 37 illustrates the lower half of the timing chart illustrating the reading operation of the image pickup element in the moving image mode 6 in Embodiment 4.

Figure 38:
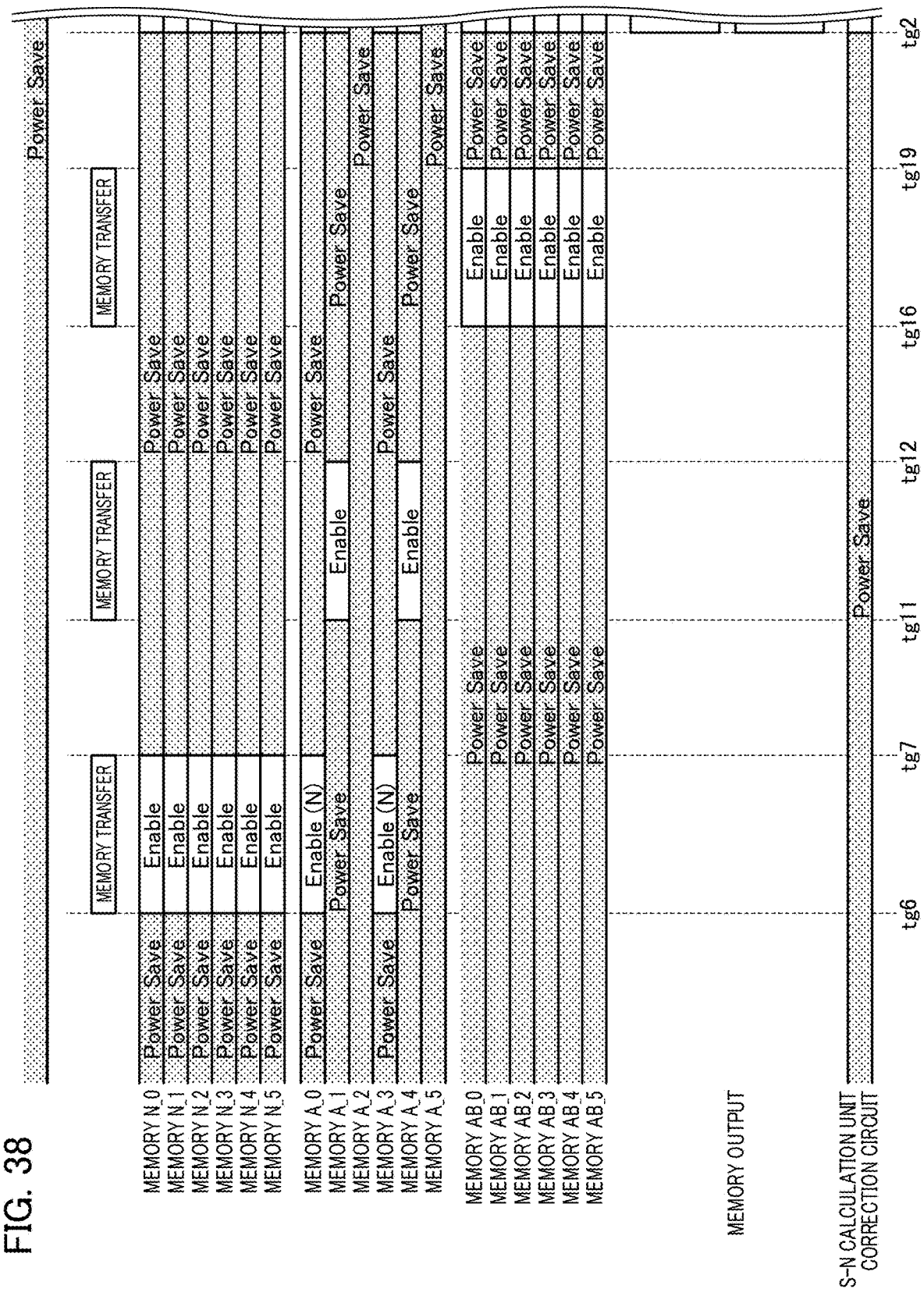
FIG. 38 illustrates the left side portion of the timing chart illustrating the writing and reading operations to and from the memory in the moving image mode 6 of Embodiment 4.
Figure 39:
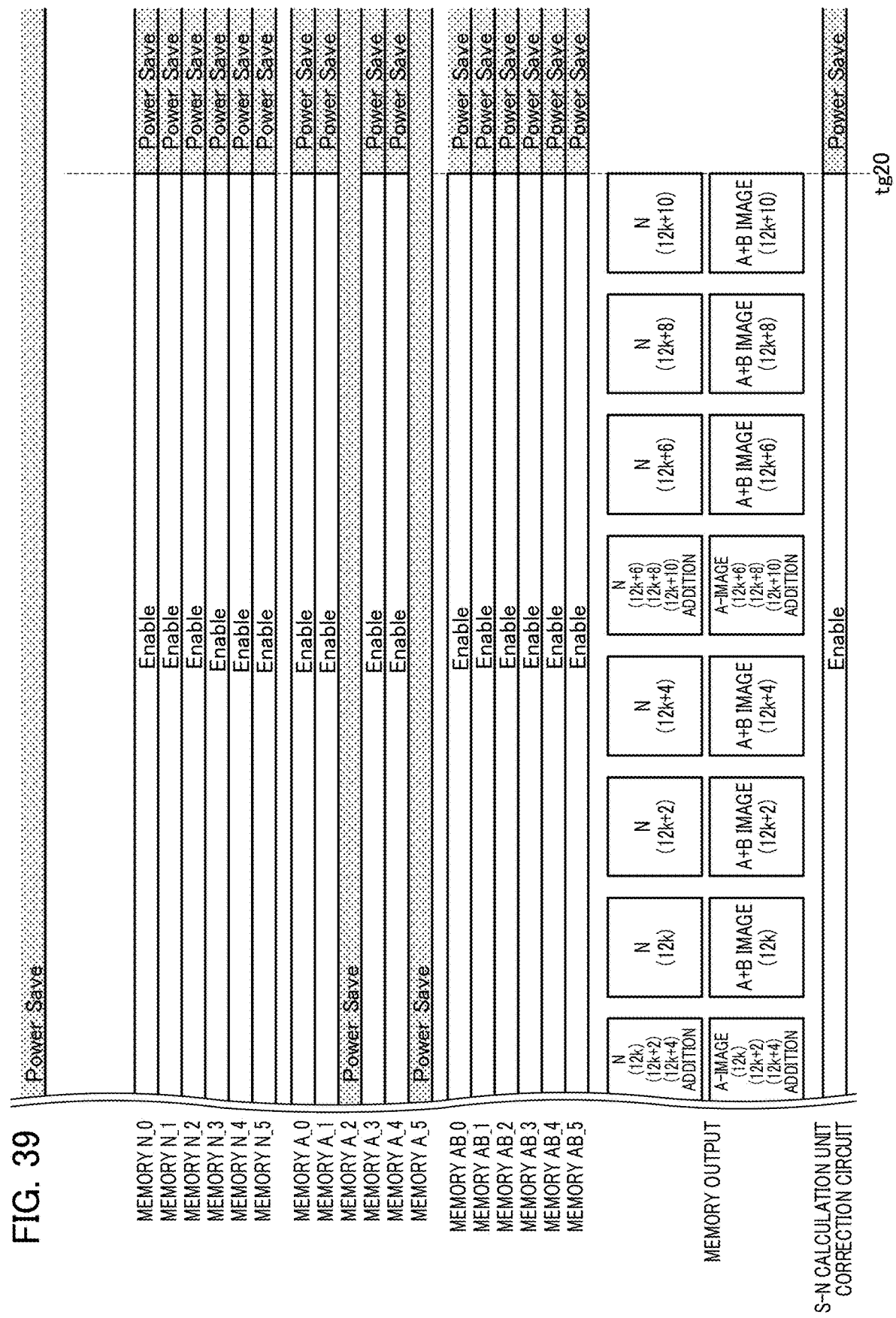
FIG. 39 illustrates the right side portion of the timing chart illustrating the writing and reading operations to and from the memory in the moving image mode 6 of Embodiment 4.

FIG. 38 illustrates the left side portion of the timing chart illustrating a writing operation and a reading operation to and from the memory in the moving image mode 6 in Embodiment 4. FIG. 39 illustrates the right side portion of the timing chart illustrating the writing operation and the reading operation to and from the memory in the moving image mode 6 in Embodiment 4.

The reading operation for 12 rows of the image signal (one horizontal scanning line) will be described below with reference to FIG. 36 to FIG. 39. It is assumed that each switch is turned on when each control signal is H, and that each switch is turned off when each control signal is L. In FIG. 36 to FIG. 39, the reading operation of the R pixel will be described as an example. The same operation is applied to the other colors, and the description thereof will be omitted.

At time tg0, control signals txa_12k to txa_12k+10 and txb_12k to txb_12k+10 become H, and the transfer switches 202a and 202b are turned on. At this time, the signals res_12k to res_12k+10 are H, and the electric charges stored in the photodiodes 201a and 201b are transferred to the power supply 208 via the transfer switches 202a and 202b and the reset switch 205, and the photodiodes 201a and 201b are reset. At time tg1, the control signals txa_12k to txa_12k+10 and txb_12k to txb_12k+10 are set to L and the accumulation of the photo-charges on the photodiodes 201a and 201b starts.

At time tg3, which is after the accumulation of the photo-charge for a predetermined time, the control signals sel0_12k to sel0_12k+10 of the selection switch 206 become H, and the source of the amplification unit 204 is connected to the column output lines 300a to 300f. At time tg4, the reset of the floating diffusion region 203 is released by setting the control signals res_12k to res_12k+10 of the reset switch 205 to L. At this time, the potential of the reset signal level corresponding to the potential of the floating diffusion region 203 is read out to the column output lines 300a to 300f via the amplification unit 204 and is input to the A/D converters 301a to 301f.

Next, at time tg5, the power saving control signals of the A/D converters 301a to 301f are negated, and the A/D converters 301a to 301f become active. The ramp signal generator 306a starts outputting a ramp signal having a signal level that changes in proportion to the elapsed time. At the same time, the counter 305a starts counting up from the reset state. The comparators in the A/D converters 301a to 301f compare the input signal with the ramp signal output from the ramp signal generator 306a. The output counter value is stored when the signal level of the input ramp signal increases with the elapsed time and exceeds the value of the input signal. This stored counter value serves as the N data (A/D conversion of the N-signal).

At time tg6, when the A/D conversion of the N-signal is completed, the N data of each column are transferred to the memory 308a, and the transfer is completed at time tg7. At this time, the N data of each column of the A/D converters 301a to 301f are respectively stored in the memories N_0 340a to N_5 340f.

At time tg8, the control signals txa_12k to txa_12k+10 become H, and the photo-charge of the photodiode 201a is independently transferred to the floating diffusion region 203. Subsequently, at time tg9, the control signals txa_12k to txa_12k+10 become L. By this operation, the electric charges stored in the photodiode 201a are transferred to the floating diffusion region 203. The voltage corresponding to the change is input to the A/D converters 301a to 301f via the amplification unit 204 and the column output lines 300a to 300f.

Next, at time tg10, the ramp signal generator 306a starts outputting the ramp signal. At the same time, the counter 305a starts counting up from the reset state. The comparators in the A/D converters 301a to 301f compare the input signal with the ramp signal output from the ramp signal generator 306a. The output counter value is stored when the signal level of the input ramp signal increases with the elapsed time and exceeds the value of the input signal. This stored counter value serves as the A-image data (A/D conversion of the A-image signal).

At time tg11, when the A/D conversion of the A-image signal is completed, the A-image data of each column are transferred to the memory 308a, and the transfer is completed at time tg12. At this time, the A-image data of each column of the A/D converters 301a to 301f are respectively stored in the memories A_0 341a to A_5 341f.

At time tg13, the control signals txa_12k to txa_12k+10 again become H. and the control signals txb_12k to txb_12k+10 also become H. Subsequently, at time tg14, the control signals txa_12k to txa_12k+10 and txb_12k to txb_12k+10 become L. By this operation, the photo-charges of both the photodiodes 201a and 201b are transferred to the floating diffusion region 203. The voltage corresponding to the change is input to the A/D converters 301a to 301f via the amplification unit 204 and the column output lines 300a to 300f.

Next, at time tg15, the power saving control signals of the A/D converters 301c to 301f are negated, and the A/D converters 301c to 301f become active. The ramp signal generator 306a starts outputting the ramp signal. At the same time, the counter 305a starts counting up from the reset state. The comparators in the A/D converters 301a to 301f compare the input signal with the ramp signal output from the ramp signal generator 306a. The output counter value is stored when the signal level of the input ramp signal increases with the elapsed time and exceeds the value of the input signal.

This stored counter value serves as the A+B image data (A/D conversion of the A+B image signal).

At time tg16, when the A/D conversion of the A+B image signal is completed, the A+B image data of each column are transferred to the memory 308a, and the transfer is completed at time tg19. At this time, the A+B image data of each column of the A/D converters 301a to 301f are respectively stored in the memories AB_0 342a to AB_5 342f.

At the time tg16, the power saving control signals of the A/D converters 301a to 301f are simultaneously asserted, and the A/D converters 301a to 301f enter a power saving state. Subsequently, at time tg17, the control signals res_12k to res_12k+10 become H, at time tg18, the control signals se0_12k to sel0_12k+10 become L. and the signal reading from the pixels for 12 rows (one horizontal scanning line) and the A/D conversion operation are completed.

In the period of time from the time tg2 to time tg20 shown in FIG. 36 and FIG. 37, the data already stored in the memory 308a (data that has been AD-converted in the previous horizontal period of time, to be described below) are output from the memory 308a and output to the outside of the image pickup element 100 via the data output unit 311a. The period of time from the time tg2 to the time tg20 described above is defined as one horizontal period of time, which is a reading unit.

FIG. 38 and FIG. 39 illustrate a timing chart of the operations from the storing of data in the memory 308a after A/D conversion of the data to the output of the data from the data output unit 311a. The timing in FIG. 38 and FIG. 39, in which the same time in FIG. 36 and FIG. 37 is used, indicates that the timing in FIG. 36 and FIG. 37 is the same as that in FIG. 38 and FIG. 39.

At the time tg6, the power saving control signals of the memories N_0 340a to N_5 340f, the memory A_0 341a, and the memory A_3 341d are negated and the memories enter an operating state, and the writing of the N data to the memories N_0 340a to N_5 340f and the writing of the added data of the N data to the memory A_0 341a and the memory A_3 341d start. When the writing is completed at the time tg7, the power saving control signal is asserted, and the memories enter a power saving state. In the power saving state, the data in the memory are held.

The N data are input to the row adding circuit 400, and the N data for each row are added and averaged for each same column. Here, the data of 12k, 12k+2, and 12k+4 rows are added, and the data of 12k+6, 12k+8, and 12k+10 rows are added. The added data are respectively written to the memory A_0 341a and the memory A_3 341d.

At the time tg11, the power saving control signals of the memory A_1 341b and the memory A_4 341e are negated, the memories enter an operating state, and writing of the A-image data to the memory A_1 341b and the memory A_4 341e starts. The A-image data are input to the row adding circuit 400, and the A-image data for each row are added and averaged for each same column. Here, the data of 12k, 12k+2, and 12k+4 rows are added, and the data of 12k+6, 12k+8, and 12k+10 rows are added. The added data are respectively written to the memory A_1 341b and the memory A_4 341e.

When the writing is completed at the time tg12, the power saving control signals are asserted, and the memories enter a power saving state. Since the data are not written to the memory A_2 341c and the memory A_5 341f, the power saving control signals remain asserted, and the memories are maintained in the power saving state.

At the time tg16, the power saving control signals of the memories AB_0 342a to AB_5 342f are negated, the memories enter an operating state, and writing of the A+B image data to the memories AB_0 342a to AB_5 342f start. When the writing is completed at the time tg19, the power saving control signals are asserted, and the memories enter a power saving state.

At the time tg2 of the next horizontal period of time, the power saving control signals of the memories N_0 340a to N_5 340f, A_0 341a, A_1 341b, A_3 341d, A_4 341e, and AB_0 342a to AB_5 342f are negated and the memories enter an operating state. For the memory A_2 341c and the memory A_5 341f, the power saving control signals remain in the asserted state, and the memories are maintained in the power saving state.

In this state, as shown in FIG. 39, the A-image data obtained by adding and averaging 12k, 12k+2, and 12k+4 rows, the A-image data obtained by adding and averaging 12k+6, k+8, and 12k+10 rows, and the A+B image data of 12k, 12k+2, 12k+4, 12k+6, 12k+8, and 12k+10 rows are output from the memory 308a by the memory control unit 343 and the output control unit 332. During this time, the S–N calculation unit 309a and the correction circuit 310a are in an operating state while the power saving control signals are negated. After the process performed by the S–N calculation unit 309a and the correction circuit 310a, the data are output from the data output unit 311a to the outside of the image pickup element 100.

When the output of the data is completed at the time tg20, all the power saving control signals for the memory 308a, the S–N calculation unit 309a, and the correction circuit 310a are asserted, and each circuit enters a power saving state. The operation from the time tg0 to the time tg20 is repeated 12 rows each by a predetermined number of horizontal scanning lines to obtain an image signal for one screen.

By the above operation, the image pickup apparatus of Embodiment 4 can reduce and an amount of data of the A-image data used for the image plane phase difference AF read out from the image pickup element to adjust the amount of data, thereby to adjust data rates of the image pickup element and a circuit that receives the data. At this time, power can be saved in some circuits related to the reduction of output of the A-image data to reduce power consumption while an amount of information used for AF is maintained by adding and averaging the A-image signal.

Although the present invention has been described in detail with reference to preferred embodiments thereof, the present invention is not limited to the above-described embodiments, and various modifications are possible based on the gist of the present invention, and these modifications are not excluded from the scope of the present invention. Note that, regarding part or all of the control in the present embodiment, a computer program that realizes the functions of the above-described embodiment may be supplied to the image pickup apparatus via a network or various storage media. A computer (for example, CPU and MPU) in the image pickup apparatus may read out and execute the program. In this case, the program and the storage medium storing the program constitute the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-5905, filed Jan. 17, 2020 which is hereby incorporated by reference wherein in its entirety.

What is claimed is:

1. An image pickup apparatus comprising:
a plurality of pixels each of which includes first and second photoelectric converters and is arranged in a matrix and connected to a plurality of column output lines;
a plurality of column circuits configured to be connected to the column output lines;
memory units configured to store signals processed by the plurality of column circuits;
at least one processor and at least one memory functioning as:
a reading unit configured to perform a first reading operation that reads a signal of the first photoelectric converter in each of the plurality of pixels to one of the column output lines and a second reading operation that reads a signal obtained by mixing the signals of the first and second photoelectric converters in each of the plurality of pixels to one of the column output lines; and
a control unit configured to save power in at least some of the column circuits from among the column circuits used in the second reading operation, during the first reading operation,
wherein the reading unit sequentially performs the first reading operation and the second reading operation for each of the plurality of pixels in the same column output lines.

2. The image pickup apparatus according to claim 1, wherein the control unit also saves power in the column circuit not used during the second reading operation, during the first reading operation.

3. The image pickup apparatus according to claim 1, wherein the number of rows of which signals are read during the first reading operation to be processed by the column circuits is smaller than the number of rows of which signals are read during the second reading operation to be processed by the column circuits.

4. The image pickup apparatus according to claim 1, further including a mode in which, during the first reading operation, signals of a plurality of rows are added and read out to the column output line.

5. The image pickup apparatus according to claim 1, wherein the at least one processor and at least one memory further functions as an adding unit configured to add signals of a plurality of rows that have been read to the column output lines during the first reading operation.

6. The image pickup apparatus according to claim 1, wherein the reading unit has a noise reading operation that reads noise signals from the pixels, and the control unit saves power in the column circuits to which power is saved during the first reading operation from the end of the noise reading operation.

7. The image pickup apparatus according to claim 1, wherein the reading unit has a noise reading operation that reads noise signals from the pixels, and the control unit does not change a power save state and a non-power save state for the column circuits from the end of the noise reading operation to the start of the second reading operation.

8. The image pickup apparatus according to claim 1, wherein the column circuit includes an amplifier.

9. The image pickup apparatus according to claim 1, wherein the column circuit includes an A/D converter.

10. The image pickup apparatus according to claim 1, wherein the column circuit includes a current source connected to the column output line.

11. The image pickup apparatus according to claim 1, wherein the image pickup apparatus further includes a corresponding memory for storing each data output from the column circuit for which power is saved, and wherein the control unit also saves power in the corresponding memory in accordance with the power-saving of the column circuit.

12. The image pickup apparatus according to claim 1, wherein the image pickup apparatus further includes a display unit configured to process the signal read by the second reading operation to display an image.

13. The image pickup apparatus according to claim 1, wherein the image pickup apparatus further includes a recording unit configured to process the signal that has been read by the second reading operation and record the image.

14. The image pickup apparatus according to claim 1, wherein the at least one processor and at least one memory further functions as a phase difference focus detecting unit configured to detect a phase difference by processing a signal that has been read by the second reading operation and a signal that has been read by the first reading operation.

15. The image pickup apparatus according to claim 1, wherein the at least one processor and at least one memory further functions as an addition unit configured to add information for distinguishing between a case in which the first reading operation is performed and a case in which the first reading operation is not performed, to a header of an image signal.

16. A control method of an image pickup apparatus, the image pickup apparatus comprising:
a plurality of pixels each of which includes first and second photoelectric converters and is arranged in a matrix and connected to a plurality of column output lines;
a plurality of column circuits configured to be connected to the column output lines, and
memory units configured to store signals processed by the plurality of column circuits;
the control method comprising:
performing a first reading operation that reads a signal of the first photoelectric converter in each of the plurality of pixels to one of the column output lines and a second reading operation that reads a signal obtained by mixing the signals of the first and second photoelectric converters in each of the plurality of pixels to one of the column output lines,
wherein the first reading operation and the second reading operation for each of the plurality of pixels in the same column output lines are sequentially performed; and
saving power in at least some of the column circuits from among the column circuits used in the second reading operation, during the first reading operation.

17. A non-transitory storage medium on which is stored a computer program for making a computer of an image pickup apparatus,
the image pickup apparatus comprising:
a plurality of pixels each of which includes first and second photoelectric converters and is arranged in a matrix and connected to a plurality of column output lines; and
a plurality of column circuits configured to be connected to the column output lines; and
memory units configured to store signals processed by the plurality of column circuits;
the computer executing:
performing a first reading operation that reads a signal of the first photoelectric converter in each of the plurality of pixels to one of the column output lines and a second reading operation that reads a signal obtained by mixing the signals of the first and second photoelectric converters in each of the plurality of pixels to one of the column output lines,
wherein the first reading operation and the second reading operation for each of the plurality of pixels in the same column ouput lines are sequentially performed; and
saving power in at least some of the column circuits from among the column circuits used in the second reading operation, during the first reading operation.

18. The image pickup apparatus according to claim 1, wherein the control unit saves power in at least some of the column circuits not used during the first reading operation from among the column circuits used in the second reading operation, during the first reading operation.

* * * * *